US006655784B2

(12) United States Patent
Kakutani

(10) Patent No.: US 6,655,784 B2
(45) Date of Patent: Dec. 2, 2003

(54) PRINTING SYSTEM, PRINT CONTROLLER, PRINTING APPARATUS, METHOD OF CONTROLLING PRINTING OPERATION, METHOD OF PRINTING, INK CARTRIDGE, INK SUPPLIER, AND RECORDING MEDIUM

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/294,789

(22) Filed: Nov. 15, 2002

(65) Prior Publication Data

US 2003/0071873 A1 Apr. 17, 2003

Related U.S. Application Data

(63) Continuation of application No. 09/539,886, filed on Mar. 31, 2000.

(30) Foreign Application Priority Data

Mar. 31, 1999 (JP) .......................................... 11-091040

(51) Int. Cl.[7] .............................. B41J 2/21; B41J 2/205
(52) U.S. Cl. ........................................... 347/43; 347/15
(58) Field of Search ........................... 347/43, 15, 100; 106/31.13

(56) References Cited

U.S. PATENT DOCUMENTS

| 5,049,898 A |   | 9/1991  | Arthur et al. ............... 347/19  |
|-------------|---|---------|--------------------------------------|
| 5,497,180 A |   | 3/1996  | Kawakami et al. ......... 347/131    |
| 5,742,306 A |   | 4/1998  | Gompertz et al. ........... 347/43   |
| 5,777,641 A | * | 7/1998  | Suzuki et al. .............. 347/15  |
| 5,795,082 A |   | 8/1998  | Shimada et al. ............ 347/43   |
| 5,825,377 A |   | 10/1998 | Gotoh et al. ............... 347/15  |
| 5,984,449 A |   | 11/1999 | Tajika et al. ............... 347/15 |
| 6,031,627 A |   | 2/2000  | Kakutani .................... 358/1.9 |
| 6,036,298 A |   | 3/2000  | Walker ....................... 347/19 |
| 6,089,691 A |   | 7/2000  | Kakutani .................... 347/15  |
| 6,099,105 A |   | 8/2000  | Kakutani .................... 347/15  |
| 6,145,961 A |   | 11/2000 | Otsuki ....................... 347/43  |
| 6,338,538 B1|   | 1/2002  | Toshiaki .................... 347/15  |
| 6,341,841 B1|   | 1/2002  | Shimada et al. ......... 400/120.09   |

FOREIGN PATENT DOCUMENTS

| EP | 0817464   | 1/1998  |
| EP | 0820187   | 1/1998  |
| EP | 0 820 189 | 1/1998  |
| EP | 0863019   | 9/1998  |
| EP | 0962323   | 12/1999 |
| JP | 3-208667  | 9/1991  |
| JP | 4-332652  | 11/1992 |
| JP | 9-30009   | 2/1997  |
| JP | 9-52376   | 2/1997  |
| JP | 9-314861  | 12/1997 |
| JP | 10-44475  | 2/1998  |
| JP | 10-224629 | 8/1998  |

* cited by examiner

Primary Examiner—Thinh Nguyen
(74) Attorney, Agent, or Firm—Oblon, Spivak, McClelland, Maier & Neustadt, P.C.

(57) ABSTRACT

A technique of the present invention uses dark yellow (DY) ink, in addition to a plurality of conventionally used basic color inks including cyan (C) ink, magenta (M) ink, and yellow (Y) ink. The technique may cause a printer to create dots with the DY ink, in place of creation of dots with the Y, C, and M inks. This arrangement enhances the degree of freedom in specification of dot on-off conditions of the respective inks, and relieves the restriction of ink duty, thereby enabling a resulting printed image to have higher picture quality.

55 Claims, 25 Drawing Sheets

Fig. 10

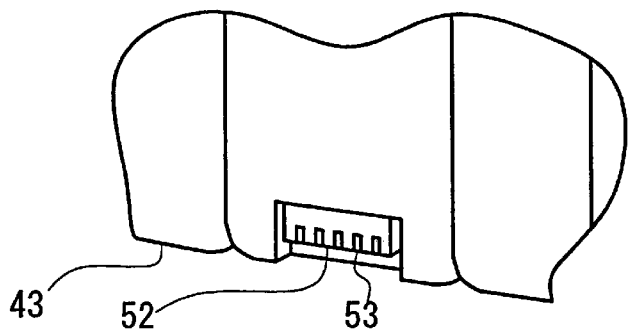

Fig. 11

|     | Contents of Information |
|-----|-------------------------|
| 601 | Data on Remaining Quantity of C Ink |
| 602 | Data on Remaining Quantity of C ink |
| 603 | Data on Remaining Quantity of M Ink |
| 604 | Data on Remaining Quantity of M ink |
| 605 | Data on Remaining Quantity of Y Ink |
| 606 | Data on Remaining Quantity of Y ink |
| 607 | Data on Remaining Quantity of LC Ink |
| 608 | Data on Remaining Quantity of LC ink |
| 609 | Data on Remaining Quantity of LM Ink |
| 610 | Data on Remaining Quantity of LM ink |
| 611 | Data on Remaining Quantity of DY Ink |
| 612 | Data on Remaining Quantity of DY ink |
| 613 | Data on time (year) of unsealing ink cartridge |
| 614 | Data on time (month) of unsealing ink cartridge |
| 615 | Version data of ink cartridge |
| 616 | Data on type of ink |
| 617 | Data on year of manufacture |
| 618 | Data on month of manufacture |
| 619 | Data on date of manufacture |
| 620 | Data on production line |
| 621 | Serial number data |
| 622 | Data on recycle |

601–612: 660
613–622: 650

| | | C | LC | M | LM | Y | K | DY |
|---|---|---|---|---|---|---|---|---|
| Dyes | Direct Blue 199 | 3.6 | 0.9 | | | | | 0.9 |
| | Acid Red 289 | | | 2.8 | 0.7 | | | 0.7 |
| | Direct Yellow 86 | | | | | 2.7 | | 2.7 |
| | Food Black 2 | | | | | | 4.8 | |
| Diethylene Glycol | | 30 | 35 | 20 | 25 | 30 | 25 | 35 |
| Surfinol 465 | | 1 | 1 | 1 | 1 | 1 | 1 | 1 |
| Water | | 65.4 | 63.1 | 76.2 | 73.3 | 66.3 | 69.2 | 59.7 |
| Viscosity (mPa·s) | | 3.0 | 3.0 | 3.0 | 3.0 | 3.0 | 3.0 | 3.0 |

(% by weight)

CYAN INK

MAGENTA INK

YELLOW INK

DARK YELLOW INK
(DY1 INK)

DARK YELLOW INK
(DY2 INK)

Fig.21A

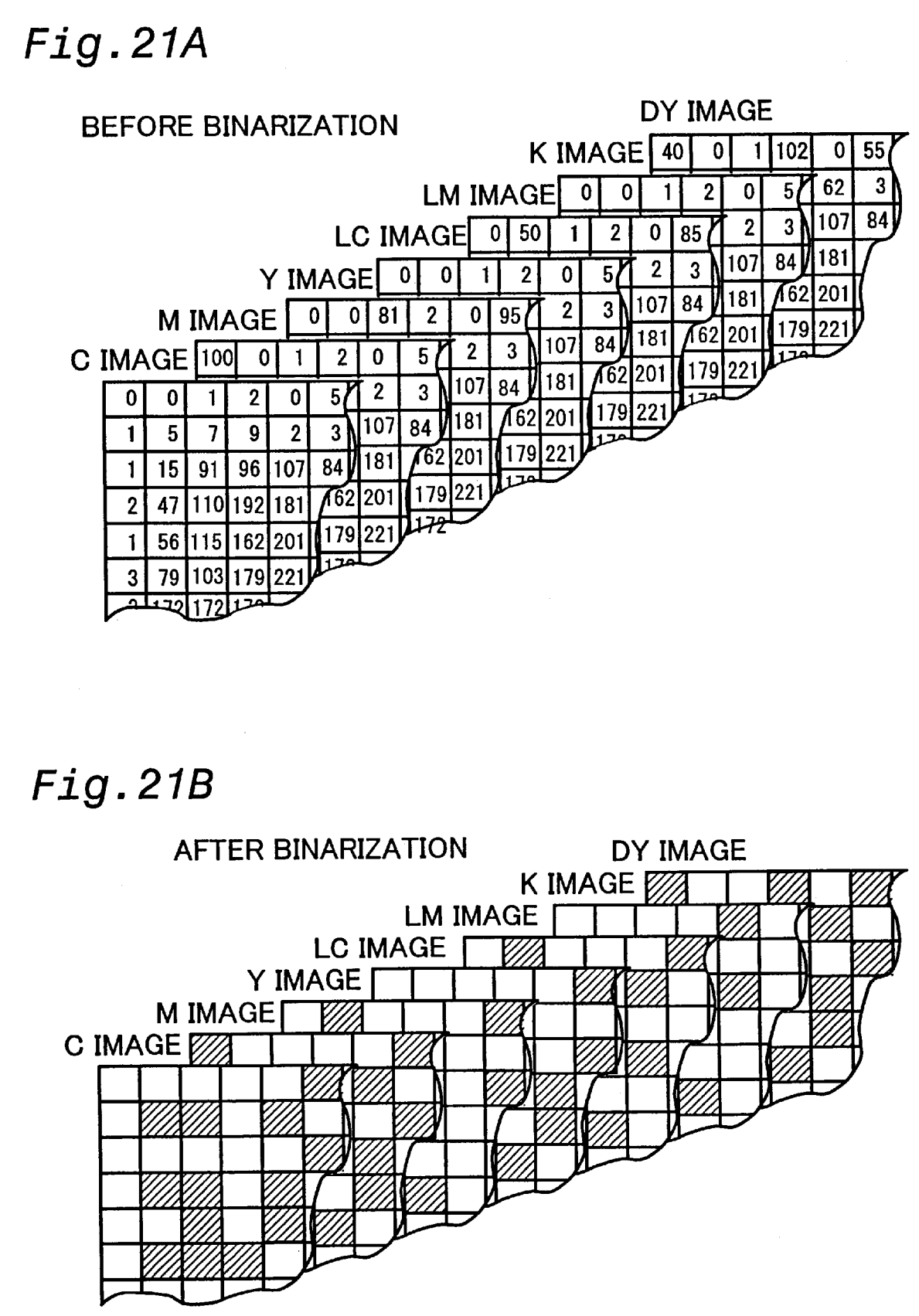

BEFORE BINARIZATION

DY IMAGE / K IMAGE / LM IMAGE / LC IMAGE / Y IMAGE / M IMAGE / C IMAGE

Fig.21B

AFTER BINARIZATION

DY IMAGE / K IMAGE / LM IMAGE / LC IMAGE / Y IMAGE / M IMAGE / C IMAGE

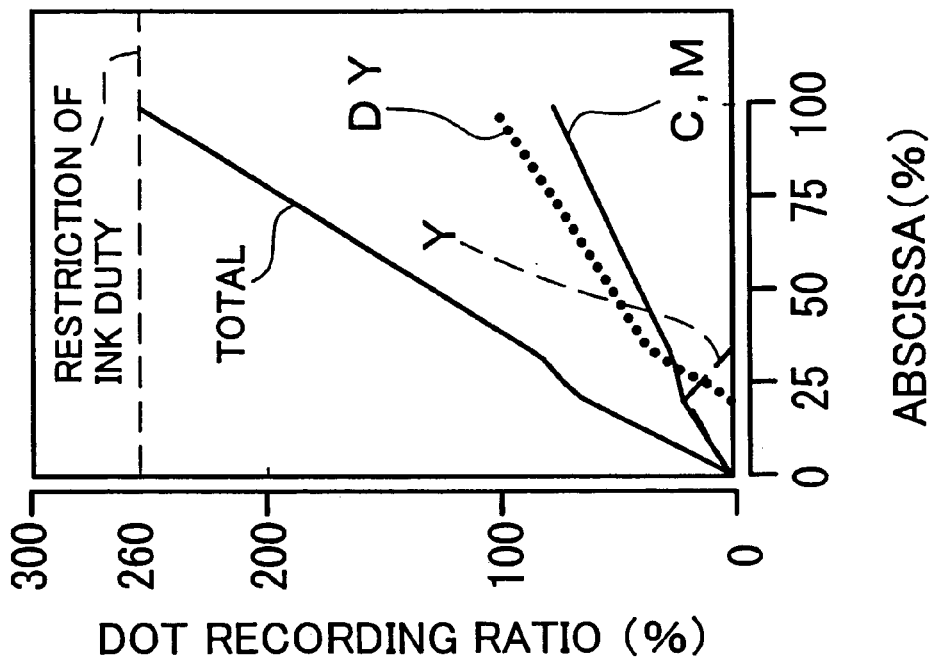
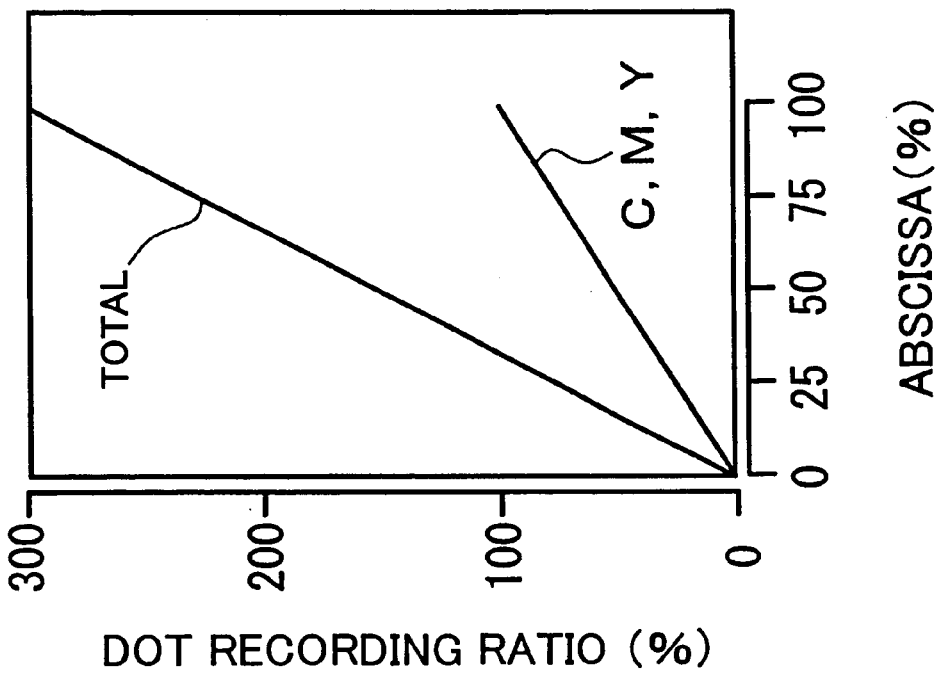

PRINTING SYSTEM, PRINT CONTROLLER, PRINTING APPARATUS, METHOD OF CONTROLLING PRINTING OPERATION, METHOD OF PRINTING, INK CARTRIDGE, INK SUPPLIER, AND RECORDING MEDIUM

This is a continuation of application Ser. No. 09/539,886 filed Mar. 31, 2000.

BACKGROUND OF THE INVENTION

1. Field of the Invention

The present invention relates to a technique of forming an adequate distribution of ink dots of respective colors on a printing medium, so as to print an image expressed in a wide range of natural colors.

2. Description of the Related Art

In a printing apparatus that ejects ink droplets of various color inks from a print head and thereby expresses an image of natural colors on a printing medium, four color inks, that is, cyan (C), magenta (M), yellow (Y), and black (K), are basically used to create ink dots and print an image. The printing apparatus regulates the hue and the lightness, which are indexes representing the color, so as to print an image expressed in a wide range of natural colors. The hue, that is, the 'color' or 'tint', such as red or blue, is regulated by changing the ratio of dots of the C, M, and Y inks ejected from the print head. The lightness is, on the other hand, regulated by changing the density of dots. Regulating the ratio and the density of dots created with the respective color inks on the printing medium enables a printed image to have a wide range of natural colors.

Some recently developed printing apparatus use light cyan (LC) ink and light magenta (LM) ink, (additionally light yellow (LY) ink in some cases) in addition to the above four basic color inks, so as to significantly improve the picture quality in an area of high lightness. In the case where an image in the area of high lightness (that is, the highlighted area) is printed with only four color inks, C, M, Y, and K, a sparse distribution the C and M dots undesirably makes these dots conspicuous and thereby lowers the picture quality of the printed image. The phenomenon of making the dots conspicuous to worsen the picture quality is expressed by the term 'poor granularity'. It is difficult to reproduce the image information with regard to a fine part with the sparsely distributed dots. This is also the reason of the poor picture quality of the resulting printed image with only the four color inks, C, M, Y, and K. The dots of the LC and LM inks (additionally LY ink in some occasions) are, on the other hand, not so conspicuous as the dots of the C and M dots and thereby do not lower the picture quality of the highlighted area. The LC and LM inks enable the dots to be formed at a higher density than the C and M inks. This accordingly enables reproduction of the image information with regard to the fine part and further improves the picture quality. Because of these reasons, the printing apparatus using the six color inks including the LC and LY inks (or the seven color inks further including the LY ink) improves the picture quality of the highlighted area.

The prior art printing apparatus including those using the light inks, however, can not sufficiently improve the picture quality in an area of low lightness (that is, the shadow area), because of the reasons discussed below. Especially the printing apparatus using the light inks have an insufficient improvement in picture quality in the shadow area, while significantly improving the picture quality in the highlighted area.

This problem is explained with an example of a gradation pattern from red to black with a gradual decrease in lightness. The color 'red' is reproduced by mixture of magenta dots and yellow dots. The lightness is lowered by addition of cyan dots or black dots. Formation of black dots on red dots makes the black dots extremely conspicuous in an area supposed to have a homogeneous color. This results in the poor granularity. The dots of cyan, which is complementary to red, are also rather conspicuous on the red dots, although the degree of conspicuousness is lower than that of the black dots. Formation of cyan dots on red dots thus also results in the rather poor granularity. As in the case of the highlighted area, the use of the light cyan ink effectively improves the granularity. From the viewpoint of the improvement in granularity, the light cyan ink is most preferable over the cyan ink and the black ink to form dots over the red dots. Addition of the cyan dots or the black dots on the red dots having a sufficiently low lightness, however, does not make the cyan dots or the black dots so conspicuous but keeps the granularity at a fair level.

There is a restriction of total quantity of ink ejected per unit area on the printing medium, and it is impossible to heighten the density of dot formation limitlessly. This restriction is referred to as the restriction of ink duty. Ejection of ink over the allowed density of dots causes blots or wrinkles on the printing medium. In order to avoid such problems, each printing medium has a preset maximum density of dots (restriction of ink duty). The total density of dots created with the respective inks should not exceed this restriction of ink duty.

When the gradation pattern from red to black is printed, it is required to add the light cyan dots or the cyan dots. The color 'red' is originally expressed by a large number of yellow dots and magenta dots as mentioned previously. Formation of even a small number of light cyan dots or cyan dots thus causes the total quantity of ink to reach the restriction of ink duty. In the course of the gradation, there is accordingly a prohibition of further addition of the light cyan dots or the cyan dots. In the practical operation, when there is some margin for the restriction of ink duty, light cyan dots are added to red dots to lower the lightness. When the total quantity of ink reaches the restriction of ink duty, even if the cyan dots may have adverse effects on the granularity of the resulting printed image, the cyan dots instead of the light cyan dots should be formed to further decrease the lightness. When the total quantity of ink again reaches the restriction of ink duty under the condition of the perfect replacement of the light cyan dots with the cyan dots, even if the black dots are conspicuous, the black dots instead of the cyan dots should be formed to further decrease the lightness. In the shadow area (the area of low lightness) having the gradation from red to black, the cyan dots and the black dots are often used irrespective of their conspicuousness, because of the restriction of ink duty. This naturally results in the poor granularity.

The above description regards the example of printing the gradation pattern from red to black. The formation pattern of ink dots should be specified under the various limitations including the improvement in granularity and the restriction of ink duty. The design of the optimum dot formation pattern accordingly requires a lot of time and labor with the trial and error.

SUMMARY OF THE INVENTION

The object of the present invention is thus to enhance the degree of freedom in specification of dot on-off conditions with regard to a plurality of different inks and thereby improve the picture quality in a specific area including a low lightness area (shadow area).

At least part of the above and the other related objects is actualized by a printing system, which includes a printer that creates dots with a plurality of different inks, so as to print an image on a printing medium, and a print controller that supplies control information to the printer, so as to control the creation of dots with the plurality of different inks. The print controller includes: a dot on-off condition specification unit that specifies dot on-off conditions with regard to a plurality of basic color inks and a dark ink based on input image data, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and a control information output unit that outputs the specification of the dot on-off conditions with regard to the plurality of basic color inks and the dark ink to the printer as the control information. The printer includes: a control information input unit that receives the specification of the dot on-off conditions with regard to the plurality of basic color inks and the dark ink, which is output from the control information output unit, as the control information; and a dot formation unit that creates dots with the plurality of basic color inks and the dark ink, based on the input control information.

The present invention is also directed to a method of printing, which corresponds to the printing system discussed above. The present invention accordingly provides a method of creating dots with a plurality of different inks, so as to print an image on a printing medium. The method includes the steps of: specifying dot on-off conditions with regard to a plurality of basic color inks and a dark ink based on input image data, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and creating dots with the plurality of basic color inks and the dark ink, based on the specification of the dot on-off conditions with regard to the plurality of basic color inks and the dark ink, so as to print an image.

In the printing system and the corresponding method of the present invention, the dot on-off conditions with regard to the plurality of basic color inks and the dark ink are specified, based on the input image data. Here the plurality of basic color inks are combined with one another to create ink dots and thereby express achromatic color. The dark ink includes one basic color ink selected out of the plurality of basic color inks as a primary component and another ink having a specific hue different from the hue of the selected basic color ink. The dark ink has a lower lightness than that of the selected basic color ink. The dark ink may alternatively have a different ink composition from that of the selected basic color ink but equivalent spectroscopic characteristics to those of the selected basic color ink. When the selected basic color ink is yellow ink, for example, the dark ink may be obtained by adding adequate quantities of cyan and magenta dyes to the yellow ink or by adding an adequate quantity of black dye to the yellow ink. The technique of the present invention creates dots with the plurality of basic color inks and the dark ink on the printing medium, based on the specification of dot on-off conditions with regard to the respective inks, so as to print an image. This arrangement enables dots to be created with the dark ink having the characteristics discussed above, as well as with the plurality of basic color inks. This enhances the degree of freedom in specification of dot on-off conditions and thereby improves the picture quality of a resulting printed image. Specifying the dot on-off conditions with regard to not only the basic color inks but the dark ink results in improving the picture quality, because of the functions discussed below.

As mentioned above, the dark ink includes one basic color ink selected out of the plurality of basic color inks as a primary component and another ink having a specific hue different from the hue of the selected basic color ink, and has a lower lightness than that of the selected basic color ink. A certain color conventionally expressed by a combination of the plurality of basic color inks may be expressible by only the dark ink or by a combination of the dark ink with small quantities of one or plural basic color inks. In such cases, expression of the certain color by the combination of the dark ink with one or plural basic color inks requires a less total quantity of inks, compared with the expression of the certain color by the combination of the plurality of basic color inks. The use of the dark ink thus improves the picture quality, which is worsened by the restriction of ink duty. For example, the use of the dark ink desirably keeps the fair granularity in a shadow area, where the granularity is readily worsened by the restriction of ink duty.

A print controller of the present invention is applicable to such a printing system. The present invention is accordingly directed to a print controller that supplies control information to a printer, which creates dots with a plurality of different inks, in order to control the creation of dots with the plurality of different inks. The printer creates dots with a plurality of basic color inks as well as with a dark ink, wherein the plurality of basic color inks are combined with one another to express achromatic color, and the dark ink has a main wavelength region of light absorption substantially identical with that of one basic color ink selected out of the plurality of basic color inks but a lower lightness than that of the selected basic color ink. The print controller includes: a dot on-off condition specification unit that specifies dot on-off conditions with regard to the plurality of basic color inks and the dark ink, based on input image data; and a control information output unit that outputs the specification of the dot on-off conditions with regard to the plurality of basic color inks and the dark ink to the printer as the control information.

The present invention is further directed to a method of controlling a printing operation, which corresponds to the print controller discussed above. The present invention accordingly provides a method of supplying control information to a printer, which creates dots with a plurality of different inks on a printing medium, in order to control the creation of dots with the plurality of different inks and thereby controlling a printing operation of the printer. The method includes the steps of: (a) specifying dot on-off conditions with regard to a plurality of basic color inks and a dark ink based on input image data, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and (b) outputting the specification of the dot on-off conditions with regard to the plurality of basic color inks and the dark ink to the printer as the control information, so as to control the printing operation of the printer.

In the print controller and the corresponding method of controlling the printing operation, the dot on-off conditions with regard to the plurality of basic color inks and the dark ink are specified, based on the input image data. The specification of the dot on-off conditions is supplied to the printer as the control information to control creation of dots with the plurality of basic color inks and the dark ink.

The technique of the present invention provides the plurality of basic color inks and the dark ink in the printer, which creates dots with a plurality of different inks on a printing medium, and supplies the control information to the printer. This arrangement enables creation of ink dots with the plurality of different inks including the dark ink, thus printing an image of high picture quality.

In accordance with one preferable application of the print controller and the corresponding method of controlling the printing operation, a color conversion table is provided to store mappings of tints used to express a color image to combinations of the plurality of basic color inks and the dark ink to represent the tints. In this application, the dot on-off conditions with regard to the plurality of basic color inks and the dark ink are specified by referring to the color conversion table.

The method of referring to the color conversion table enables the dot on-off conditions of the respective inks to be specified quickly and accurately.

In accordance with another preferable application of the print controller, the dot on-off conditions with regard to the plurality of basic color inks and the dark ink are specified, based on a preset proportion regarding dots of the plurality of basic color inks and dots of the dark ink.

When the dot on-off conditions are specified with regard to the dark ink as well as the plurality of basic color inks, the proportion of the dots with the respective inks may take a variety of values. The arrangement of specifying the dot on-off conditions based on the proportion set equal to an appropriate value enables an image of high picture quality to be printed.

In accordance with still another preferable application of the print controller, the dark ink has lower lightness and saturation than those of one basic color ink selected out of the plurality of basic color inks. The dark ink is obtained, for example, by adding the dye of another ink to the selected basic color ink.

The use of the dark ink enhances the degree of freedom in specification of the dot on-off conditions and thereby improves the picture quality of the resulting printed image. The use of the dark ink, which is obtained by adding at least one dye of another ink to lower the lightness and the saturation, may enable a specific color conventionally expressed by a combination of the plurality of basic color inks to be expressed by only the dark ink or by a combination of the dark ink with small quantities of one or plural basic color inks. The expression of the specific color by the combination of the dark ink with the basic color inks reduces the total quantity of inks and thus improves the picture quality, which is worsened by the restriction of ink duty.

The dark ink may alternatively have a main wavelength region for most strongly absorbing a ray in a visible range, which is substantially identical with that of one basic color ink selected out of the plurality of basic color inks, and a greater integral of light absorptivity in a wavelength region of the visible range than that of the selected basic color ink.

The use of the dark ink enhances the degree of freedom in specification of the dot on-off conditions and thereby improves the picture quality of the resulting printed image.

The main wavelength region for most strongly absorbing a ray in a visible range is approximately equal to a range of 600 nm to 700 nm to absorb a red ray in the case of cyan ink, equal to a range of 500 nm to 600 nm to absorb a green ray in the case of magenta ink, and equal to a range of 400 nm to 500 nm to absorb a blue ray in the case of yellow ink. Since the absorptivity of light gently varies, the half-width (that is, the wavelength region having the absorptivity that is half the maximum absorptivity) may be adopted in the case where there is a difficulty in identifying the wavelength region.

The dark ink may have the main wavelength region, which is mostly included in a wavelength region of 400 nm to 500 nm, and a smaller light absorptivity in the vicinity of 700 nm than a mean light absorptivity in a wavelength region of 600 nm to 700 nm.

It is known that the sensitivity of the vision of human eye to the color gradually lowers in a wavelength range of about 650 nm and is significantly low in the vicinity of 700 nm. Irrespective of a large variation in spectroscopic characteristics of the ink in the vicinity of the wavelength of 700 nm, there is no significantly difference in hue recognized by the vision of the human eye. Namely the spectroscopic characteristics of the ink have a large degree of freedom in the vicinity of the wavelength of 700 nm. The ink having a favorable hue is thus prepared by utilizing this large degree of freedom. The dark ink having the favorable hue has the smaller light absorptivity in the vicinity of 700 nm than the mean light absorptivity in the wavelength region of 600 nm to 700 nm. The main wavelength region that is mostly included in the wavelength region of 400 nm to 500 nm is substantially opposite to the range in the vicinity of 700 nm having the large degree of freedom across the visible range. This facilitate the design of the ink.

The dark ink may have the main wavelength region, which is mostly included in a wavelength region of 400 nm to 500 nm, and a greater light absorptivity in the vicinity of 700 nm than a mean light absorptivity in a wavelength region of 600 nm to 700 nm. The greater light absorptivity in the vicinity of 700 nm than the mean light absorptivity in the wavelength region of 600 nm to 700 nm enables the dark ink to have a more preferable hue, because of the reason discussed above.

The dark ink, whose dot on-off conditions are specified by the print controller of the present invention may have:

(A) a characteristic wavelength region for strongly absorbing a ray in a visible range to mainly determine the hue of the dark ink, which is substantially identical with a characteristic wavelength region of one basic color ink selected out of the plurality of basic color inks;

(B) a mean value of light absorptivity that is greater than or substantially identical with a mean value of light absorptivity of the selected basic color ink in the characteristic wavelength region of the dark ink; and (C) a mean value of light absorptivity that is greater than a mean value of light absorptivity of the selected basic color ink in a wavelength region of visible light except the characteristic wavelength region of the dark ink.

The dark ink satisfying the above condition (A) has a hue close to the hue of the corresponding basic color ink, so that a specific color conventionally expressed by a combination of the plurality of basic color inks is, in many cases, expressible by a combination of the dark ink with one or plural basic color inks. Expression of the specific color by the combination of the dark ink satisfying the above conditions (B) and (C) with one or plural basic color inks requires the less total quantity of inks than expression of the specific color by the combination of the plurality of basic color inks. The use of the dark ink satisfying all the above conditions (A) through (C) thus reduces the total quantity of ink consumption in many cases. This arrangement effectively prevents the poor granularity and improves the picture quality, which is worsened by the restriction of ink duty as discussed previously.

The dark ink may have the characteristic wavelength region, which is mostly included in a wavelength region of 400 nm to 500 nm, and a smaller light absorptivity in the vicinity of 700 nm than a mean light absorptivity in a wavelength region of 600 nm to 700 nm.

As described above, even when the light absorptivity in the vicinity of 700 nm varies, the hue of the ink recognizable by the vision of the human eye does not have any significant variation. It is accordingly expected that the spectroscopic characteristics of the ink have a large degree of freedom in the vicinity of the wavelength of 700 nm. The smaller light absorptivity in the vicinity of 700 nm than the mean light absorptivity in the wavelength region of 600 nm to 700 nm enables the dark ink to have a more favorable hue. Setting the characteristic wavelength region of the dark ink to be substantially opposite to the range in the vicinity of 700 nm having the large degree of freedom across the visible range facilitates the design of the ink.

The dark ink may have the characteristic wavelength region, which is mostly included in a wavelength region of 400 nm to 500 nm, and a greater light absorptivity in the vicinity of 700 nm than a mean light absorptivity in a wavelength region of 600 nm to 700 nm.

As described previously, there is a large degree of freedom in setting the light absorptivity in the vicinity of the wavelength of 700 nm. The greater light absorptivity in the vicinity of 700 nm than the mean light absorptivity in the wavelength region of 600 nm to 700 nm may enable the dark ink to have a more favorable hue.

The dark ink, whose dot on-off conditions are specified by the print controller of the present invention, may have a hue in a specific hue range interposed between a red hue zone and a green hue zone on a Munsell hue circle, and have a lower lightness than that of a basic color ink out of the plurality of basic color inks, which has a hue in the specific hue range.

The specific hue range interposed between the red hue zone and the green hue zone on the Munsell hue circle roughly corresponds to the hue of yellow. The color of yellow has a relatively high lightness. Dots of the dark yellow ink having the lower lightness than that of the yellow ink are still not conspicuous. Creating dots with such a dark ink thus significantly improves the picture quality of the resulting printed image.

The dark ink may have a hue in the specific hue range that includes a yellow hue zone and extends to a boundary between the yellow hue zone and the green hue zone on the Munsell hue circle. The ink in this specific hue range has the hue of greenish yellow. Creating dots with such a dark ink significantly improves the picture quality of the resulting printed image having the little greenish hue.

The dark ink may have a hue in the specific hue range that includes a yellow hue zone and extends to a boundary between the yellow hue zone and the red hue zone on the Munsell hue circle, and a smaller saturation than that of flesh color. The ink in the specific hue range that includes the yellow hue zone and extends to the boundary between the yellow hue zone and the red hue zone on the Munsell hue circle has the hue of reddish yellow. Creating dots with such a dark ink significantly improves the picture quality of the resulting printed image having the little reddish hue. The color that is included in the specific hue range and has a relatively large saturation is close to the 'flesh color'. When the ink having the hue of reddish yellow is used as the dark ink, it is preferable that the ink has a smaller saturation than that of flesh color. The dark ink of smaller saturation significantly improves the picture quality of the resulting printed image. It is accordingly preferable that the dark ink has a hue in the specific hue range that includes the yellow hue zone and extends to the boundary between the yellow hue zone and the red hue zone on the Munsell hue circle, and a smaller saturation than that of flesh color.

The dark ink may have a hue included in a specific range of 10R to 10GY on a Munsell hue circle, and a lower lightness than that of a basic color ink out of the plurality of basic color inks, which has a hue in the specific range.

The ink in the specific range roughly has the hue of yellow. Creating dots with such a dark ink significantly improves the picture quality of the resulting printed image.

The dark ink may have a saturation of smaller than 3.5C on a Munsell chroma when the hue of the dark ink is in a range of 2.5YR to 7.5YR on the Munsell hue circle.

The ink having the hue in the range of 2.5YR to 7.5YR on the Munsell hue circle and the saturation of greater than 3.5C on the Munsell chroma has the tint close to the flesh color. When an image having the greenish hue is printed, the use of the dark ink having a smaller saturation than that of 'flesh color' has better effects on improvement of the picture quality. It is accordingly preferable that the dark ink has a saturation of smaller than 3.5C on the Munsell chroma when the hue of the dark ink is in the range of 2.5YR to 7.5YR on the Munsell hue circle.

The hue of the dark ink may be in a range of 10YR to 10GY on the Munsell hue circle. The ink in this range has the hue of greenish yellow. Creating dots with such a dark ink significantly improves the picture quality of the resulting printed image having the little greenish hue.

The dark ink may have the hue in a range of 10Y to 10R on the Munsell hue circle and a saturation of smaller than 3.5C on a Munsell chroma. The ink having the hue in the range of 10Y to 10R on the Munsell hue circle and the saturation of greater than 3.5C on the Munsell chroma has the tint close to the flesh color. When an image having the reddish hue is printed, the use of the dark ink having a smaller saturation than that of 'flesh color' has better effects on improvement of the picture quality. It is accordingly preferable that the dark ink has the hue in a range of 10Y to 10R on the Munsell hue circle and a saturation of smaller than 3.5C on the Munsell chroma.

In accordance with one preferable application of the print controller that specifies the dot on-off conditions of the respective inks based on the image data, the technique specifies the dot on-off conditions with regard to the plurality of basic color inks and the dark ink, as well as with regard to at least one light ink, which has a hue substantially identical with that of at least one basic color ink selected out of the plurality of basic color inks but a lower density than that of the at least one basic color ink. The results of the specification are output to the printer as the control information to control the creation of dots with the plurality of different inks. The printer creates dots with the plurality of basic color inks, the dark ink, and the at least one light ink on a printing medium, according to the control information.

As described previously, the printing apparatus using the light ink remarkably improves the picture quality in the highlighted area but has less effects on improvement of the picture quality in the shadow area, because of the restriction of ink duty. Additionally using the dark ink improves the picture quality in the shadow area and thus attains the improvement in picture quality in the whole image.

In accordance with one preferable application of the print controller that specifies the dot on-off conditions of the respective inks based on the image data, the technique outputs the control information to control the creation of dots to a printer that creates at least two variable-size dots having different sizes with the respective inks. The technique specifies the dot on-off conditions as well as the sizes of the dots to be formed by the printer with regard to the plurality of different inks and supplies the results of the specification to the printer. The printer creates the adequate size dots with the plurality of different inks, based on the control information.

Varying the size of the ink dot by the printer that enables creation of at least two variable-size dots having different sizes significantly improves the picture quality of the resulting printed image. In this application, using the dark ink enhances the degree of freedom in specification of the dot on-off conditions and improves the picture quality, which is worsened by the restriction of ink duty.

In accordance with one preferable application of the print controller that specifies the dot on-off conditions of the respective inks based on the image data and the corresponding method of controlling the printing operation, the technique specifies the dot on-off conditions with regard to the plurality of basic color inks, which include at least yellow ink, as well as with the dark yellow ink, which has a main wavelength region of light absorption substantially identical with that of the yellow ink but a lower lightness than that of the yellow ink. The results of the specification are output to a printer that enables creation of dots with the plurality of basic color inks and the dark yellow ink. The printer receives the specification of the dot on-off conditions and creates dots with the plurality of basic color inks including at least the yellow ink and with the dark yellow ink, so as to print an image.

The yellow ink has a relatively high lightness. Even the dark yellow ink, which is darker than the yellow ink, still has a high lightness, so that dots of the dark yellow ink are relatively inconspicuous. Creation of dots with the dark yellow ink thus significantly improves the picture quality of the resulting printed image.

In accordance with one preferable application of the print controller of the present invention, the dot on-off conditions are specified with regard to at least the cyan ink, the magenta ink, and the yellow ink as the plurality of basic color inks. In this case, the dark ink may have a hue that is closest to the hue of the yellow ink among the cyan ink, the magenta ink, and the yellow ink. Specification of the dot on-off conditions with regard to the dark ink is carried out to enable dots with the dark ink to be created together with dots of at least one of the basic color inks when an image to be printed has hues varying from red to green on a Munsell hue circle.

The image having hues varying from red to green on the Munsell hue circle is printed by adequately creating dots of the magenta ink or dots of the cyan ink together with the dots of the yellow ink. The technique of this application enables the image having such hues to be alternatively printed by adequately creating dots of the dark ink together with the dots of the basic color ink. This arrangement effectively enhances the degree of freedom in specification of the dot on-off conditions with regard to each color ink, thereby improving the picture quality of the resulting printed image.

In accordance with one preferable application of the print controller of the present invention, the dot on-off conditions are specified with regard to at least the cyan ink, the magenta ink, and the yellow ink as the plurality of basic color inks. In this case, the dark ink may have a hue that is closest to the hue of the yellow ink among the cyan ink, the magenta ink, and the yellow ink. Specification of the dot on-off conditions with regard to the dark ink is carried out to enable dots with the dark ink to be created prior to creation of dots with either one of the cyan ink and the magenta ink when an image to be printed has hues varying from yellow to black.

Dots of the magenta ink or the cyan ink are rather conspicuous in an yellow image, unless the yellow image has a sufficiently low lightness. When an image to be printed has hues varying from yellow to black, creation of dots with the dark ink prior to creation of dots with the magenta ink or the cyan ink lowers the lightness of the image and makes the dots of the magenta ink or the cyan ink sufficiently inconspicuous. The hue of the dark ink is closest to the hue of the yellow ink. Creation of dots with the dark ink in the yellow image prior to creation of dots with the magenta ink or the cyan ink accordingly does not make the dots of the dark ink conspicuous to lower the picture quality. Using the dark ink having the above characteristics thus preferably improves the picture quality of the resulting printed image. The dots of the light cyan ink, which has the lower density than that of the cyan ink, and the dots of the light magenta ink, which has the lower density than that of the magenta ink, are not so conspicuous in an image having a relatively high lightness. Dots of the dark ink may thus be created in an overlapping manner on the dots of the light cyan ink or on the dots of the light magenta ink. In the case of a variable-dot printer, small-size dots are not so conspicuous even when they are created in an image having a relatively high lightness. Like in the case of the light ink, dots of the dark ink may thus be created in an overlapping manner on the small-size dots of the cyan ink or on the small-size dots of the magenta ink.

In accordance with one preferable application of the print controller of the present invention, the dot on-off conditions are specified with regard to at least the cyan ink, the magenta ink, and the yellow ink as the plurality of basic color inks. In this case, the dark ink may have a hue that is closest to the hue of the yellow ink among the cyan ink, the magenta ink, and the yellow ink, and a lower lightness than that of the yellow ink. Specification of the dot on-off conditions with regard to the dark ink is carried out to enable dots with the dark ink to be created prior to creation of dots with either one of the cyan ink and the magenta ink when an image to be printed has hues varying from color of the either one of the cyan ink and the magenta ink to black.

Dots of the cyan ink in a magenta image or dots of the magenta ink in a cyan image are rather conspicuous, unless the image has a sufficiently low lightness. When an image to be printed has hues varying from magenta to black or hues varying from cyan to black, creation of dots with the dark ink prior to creation of dots with the magenta ink or the cyan ink desirably lowers the lightness of the image and makes the dots of the magenta ink or the cyan ink sufficiently inconspicuous. The dark ink has the hue closest to the hue of the yellow ink. Like the dots of the yellow ink, dots of the dark ink are thus relatively inconspicuous in both the magenta image and the cyan image. Creation of dots with the dark ink prior to creation of dots with the magenta ink or the cyan ink accordingly does not make the dots of the dark ink conspicuous to lower the picture quality. Using the dark ink having the above characteristics thus preferably improves the picture quality of the resulting printed image. The dots of the light cyan ink and the dots of the light magenta ink are not so conspicuous in an image having a relatively high lightness. Dots of the dark ink may thus be created in an overlapping manner on the dots of the light cyan ink or on the dots of the light magenta ink. In the case of a variable-dot printer, small-size dots are not so conspicuous even when they are created in an image having a relatively high lightness. Like in the case of the light ink, dots of the dark ink may thus be created in an overlapping manner on the small-size dots of the cyan ink or on the small-size dots of the magenta ink.

In accordance with one preferable application of the print controller of the present invention, the dot on-off conditions are specified with regard to at least the cyan ink, the magenta ink, and the yellow ink as the plurality of basic color inks. In this case, the dark ink may have a hue that is closest to the hue of the yellow ink among the cyan ink, the magenta ink, and the yellow ink, and a lower lightness than that of the yellow ink. Specification of the dot on-off conditions with regard to the dark ink is carried out to enable dots with the dark ink to be created after creation of dots with the yellow ink when an image to be printed has hues varying from color of either one of the cyan ink and the magenta ink to black.

Dots of the cyan ink in a magenta image or dots of the magenta ink in a cyan image are rather conspicuous, unless the image has a sufficiently low lightness. Creating yellow dots in such images lowers the lightness of the image to some extent. The dots of the cyan ink or the magenta ink may, however, be still rather conspicuous in these images. This technique creates dots with the dark ink subsequent to creation of dots with the yellow ink. This further lowers the lightness of the image and makes the dots of the magenta ink or the cyan ink sufficiently inconspicuous. The dark ink has the hue closest to the hue of the yellow ink. Like the dots of the yellow ink, dots of the dark ink are thus relatively inconspicuous in both the magenta image and the cyan image. Using the dark ink having the above characteristics thus preferably improves the picture quality of the resulting printed image.

In accordance with another preferable application of the print controller of the present invention, the dot on-off conditions are specified with regard to the plurality of basic color inks including at least the cyan ink, the magenta ink, and the yellow ink, as well as with regard to the light ink, which has a hue substantially identical with the hue of the cyan ink or the magenta ink but a lower density than that of the cyan ink or the magenta ink. In this case, the dark ink may have a hue that is closest to the hue of the yellow ink among the cyan ink, the magenta ink, and the yellow ink. Specification of the dot on-off conditions with regard to the dark ink is carried out to enable dots with the dark ink to be created after creation of dots with the light ink when an image to be printed has hues varying from yellow to black.

Dots of the magenta ink or the cyan ink are rather conspicuous in an yellow image, unless the yellow image has a sufficiently low lightness. When an image to be printed has hues varying from yellow to black, formation of dots with the light ink desirably lowers the lightness of the image. Formation of dots with the dark ink in addition to with the light ink further lowers the lightness of the image and thereby makes the dots of the magenta ink and the cyan ink more inconspicuous. The hue of the dark ink is closest to the hue of the yellow ink. The dots of the dark ink are thus inconspicuous in the yellow image and do not lower the picture quality. Using the dark ink having the above characteristics thus preferably improves the picture quality of the resulting printed image.

The light ink, whose dot on-off conditions are specified by the print controller, may be light cyan ink having a hue substantially identical with that of the cyan ink but a lower density than that of the cyan ink or light magenta ink having a hue substantially identical with that of the magenta ink but a lower density than that of the magenta ink. Dots of the dark ink may be created after creation of dots with these light inks. More specifically dots of the dark ink may be created after creation of dots with both the light cyan ink and the light magenta ink.

Creating dots with these light inks lowers the lightness in an yellow image. Creating dots with the dark ink further lowers the lightness in the yellow image. This makes the dots of the cyan ink and the magenta ink more inconspicuous and improves the picture quality of the resulting printed image.

In accordance with one preferable application of the print controller that specifies the dot on-off conditions of the respective inks based on the image data and the corresponding method of controlling the printing operation, the technique specifies dot on-off conditions with regard to a plurality of basic color inks, which include at least cyan ink, magenta ink, and yellow ink, as well as with dark yellow ink, which has a main wavelength region of light absorption substantially identical with that of the yellow ink but a lower lightness than that of the yellow ink. The results of the specification are output to a printer that enables creation of dots with the plurality of basic color inks and the dark yellow ink. The printer receives the specification of the dot on-off conditions and creates dots with the plurality of basic color inks including at least the cyan ink, the magenta ink, and the yellow ink and with the dark yellow ink, so as to print an image.

The yellow ink has a relatively high lightness. Even the dark yellow ink, which is darker than the yellow ink, still has a higher lightness than those of the cyan ink and the magenta ink. Dots of the dark yellow ink are accordingly not so conspicuous as dots of the cyan ink or the magenta ink. Using the dark yellow ink in addition to the cyan ink, magenta ink, and the yellow ink to create dots and print an image thus significantly improves the picture quality of the resulting printed image.

The printing apparatus of the present invention applicable to the printing system discussed above may have another arrangement. The present invention is accordingly directed to a printing apparatus that has a print head to create dots with a plurality of different inks on a printing medium, receives control information to control the creation of dots with the plurality of different inks, and actually creates dots with the plurality of different inks, based on the input control information, so as to print an image. The printing apparatus includes: a basic color ink supply unit that supplies a plurality of basic color inks to the print head, the plurality of basic color inks being combined with one another to express achromatic color; a dark ink supply unit that supplies a dark ink to the print head, the dark ink having a main wavelength region of light absorption substantially identical with that of one basic color ink selected out of the plurality of basic color inks but a lower lightness than that of the selected basic color ink; a control information input unit that receives the control information with regard to dots of the plurality of basic color inks and the dark ink; and a dot formation unit that drives the print head based on the input control information, so as to create dots with the plurality of basic color inks and the dark ink.

The present invention is also directed to a method of printing, which corresponds to the printing apparatus of the above configuration. The present invention thus provides a method of receiving control information to control creation of dots with a plurality of different inks and driving a print head, which creates dots with the plurality of different inks on a printing medium, based on the control information, so as to print an image. The method includes the steps of: (a) supplying a plurality of basic color inks and a dark ink to the print head, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; (b) receiving the control information with regard to dots of the plurality of basic color inks and the dark ink; and (c) driving the print head based on the input control information to create dots with the plurality of basic color inks and the dark ink, thereby printing an image.

In the printing apparatus of the present invention and the corresponding method of printing, the print head is driven according to the input control information for controlling creation of dots with regard to the plurality of basic color inks and the dark ink. Dots with the plurality of basic color inks and the dark ink are then created on the printing medium to print an image.

The use of the dark ink in addition to the plurality of basic color inks enhances the degree of freedom in specification of dot on-off conditions and thus enables the adequate specification of the dot on-off conditions. The supplies of the plurality of basic color inks and the dark ink are fed to the print head, and the print head is then driven according to the results of the specification of the dot on-off conditions. This arrangement enables the dots to be adequately formed with the respective inks on a printing medium, so as to print an image of high picture quality.

In accordance with one preferable application of the present invention, the printing apparatus creates dots with at least cyan ink, magenta ink, and yellow ink as the dots with the plurality of basic color inks.

The creation of dots with at least the cyan ink, the magenta ink, and the yellow ink enables expression of a practically sufficient number of hues. The use of the dark ink in addition to these various color inks enhances the degree of freedom in specification of dot on-off conditions and thereby improves the picture quality of the resulting printed image.

In accordance with another preferable application of the present invention, the printing apparatus creates dots with at least black ink in addition to the cyan ink, the magenta ink, and the yellow ink. The printing apparatus also creates dots with dark yellow ink, which has a main wavelength region of light absorption substantially identical with that of the yellow ink but a lower lightness than that of the yellow ink.

Creation of dots with the black ink in addition to the cyan ink, the magenta ink, and the yellow ink further improves the picture quality of the resulting printed image. The use of the dark yellow ink in addition to these inks enhances the degree of freedom in specification of the dot on-off conditions and thereby improves the picture quality of the resulting printed image.

In accordance with another preferable application of the present invention, the printing apparatus creates dots with at least cyan ink, magenta ink, and yellow ink as the plurality of basic color inks, as well as with the dark ink and at least one light ink, which has a hue substantially identical with that of at least one basic color ink selected out of the plurality of basic color inks but a lower density than that of the at least one basic color ink.

Creation of dots with the variety of color inks including the light ink improves the picture quality of the resulting printed image. The use of the dark ink in addition to these various color inks enhances the degree of freedom in specification of the dot on-off conditions and thereby further improves the picture quality of the resulting printed image.

In accordance with sill another preferable application of the present invention, the printing apparatus creates at least two variable-size dots having different sizes with regard to at least cyan ink, magenta ink, and yellow ink as the plurality of basic color inks.

Creation of the at least two variable-size dots with regard to the respective inks improves the picture quality of the resulting printed image. The use of the dark ink in addition to these inks enhances the degree of freedom in specification of the dot on-off conditions and thereby further improves the picture quality of the resulting printed image.

In accordance with another preferable application of the present invention, the printing apparatus has an ink reservoir unit, in which the plurality of basic color inks and the dark ink are kept independently.

In the printing apparatus having the ink reservoir unit for independently keeping the plurality of basic color inks and the dark ink, supplies of the respective inks from the ink reservoir unit to the print head cause dots of the plurality of basic color inks and dots of the dark ink to be created on the printing medium. This results in printing an image of high picture quality. The arrangement of keeping the respective inks independently means that the respective inks should be accommodated in a non-miscible manner. These inks may be kept together in one ink reservoir unit or may be kept separately in different ink reservoir unit.

In this printing apparatus, the ink reservoir unit may keep a greater quantity of the dark ink than a quantity of the one basic color ink corresponding to the dark ink.

When natural images, such as landscapes and portraits, are printed, a greater quantity of the dark ink is generally consumed than the quantity of the basic color ink having the closest hue to that of the dark ink. The ink reservoir unit keeping the greater quantity of the dark ink than the quantity of the corresponding basic color ink thus favorably causes the quantities of the respective inks kept in the ink reservoir unit to be close to the actual quantities of ink consumption.

In accordance with one preferable application of the printing apparatus of the present invention and the corresponding method of printing, the print head is driven according to the input control information to create dots with the respective inks, wherein the control information controls creation of dots with the plurality of basic color inks, which include at least cyan ink, magenta ink, and yellow ink, as well as with dark yellow ink, which has a main wavelength region of light absorption substantially identical with that of the yellow ink but a lower lightness than that of the yellow ink.

In the printing apparatus of this arrangement and the corresponding method of printing, dots are created with the dark yellow ink as well as with the cyan ink, the magenta ink, and the yellow ink. This arrangement enhances the degree of freedom in specification of dot on-off conditions and thereby improves the picture quality of the resulting printed image.

In accordance with one preferable application of the present invention, the printing apparatus has an ink reservoir unit that keeps at least the cyan ink, the magenta ink, the yellow ink, and the dark yellow ink independently. The ink reservoir unit keeps a greater quantity of the dark yellow ink than a quantity of the yellow ink.

When natural images, such as landscapes and portraits, are printed, a greater quantity of the dark yellow ink is generally consumed than the quantity of the yellow ink. The ink reservoir unit keeping the greater quantity of the dark yellow ink than the quantity of the yellow ink thus favorably causes the quantities of the respective inks kept in the ink reservoir unit to be close to the actual quantities of ink consumption.

The technique of the present invention may be implemented by a computer, which reads a specific program that actualizes the functions of the printing system, the print controller, or the printing apparatus of the present invention discussed above. One application of the present invention is a recording medium, in which a specific program for attaining the functions of the printing system of the present invention is recorded. The present invention is thus directed to a recording medium, in which a specific program is recorded in a computer readable manner. The specific program actualizes a method of creating dots with a plurality of different inks, so as to print an image on a printing medium. The specific program causes a computer to attain the functions of: specifying dot on-off conditions with regard to a plurality of basic color inks and a dark ink based on input image data, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and controlling creation of dots with the plurality of basic color inks and the dark ink, based on the specification of the dot-on-off conditions with regard to the plurality of basic color inks and the dark ink.

Another application of the present invention is a recording medium, in which a specific program for attaining the functions of the print controller of the present invention is recorded. The present invention is thus directed to another recording medium, in which a specific program is recorded in a computer readable manner. The specific program actualizes a method of supplying control information to a printer, which creates dots with a plurality of different inks on a printing medium, in order to control the creation of dots with the plurality of different inks and thereby controlling a printing operation of the printer. The specific program causes a computer to attain the functions of: specifying dot on-off conditions with regard to a plurality of basic color inks and a dark ink based on input image data, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and outputting the specification of the dot on-off conditions with regard to the plurality of basic color inks and the dark ink to the printer as the control information, so as to control the printing operation of the printer.

Still another application of the present invention is a recording medium, in which a specific program for attaining the functions of the printing apparatus of the present invention is recorded. The present invention is thus directed to a recording medium, in which a specific program is recorded in a computer readable manner. The specific program actualizes a method of receiving control information to control creation of dots with a plurality of different inks and driving a print head, which creates dots with the plurality of different inks on a printing medium, based on the control information, so as to print an image. The specific program causes a computer to attain the functions of: receiving the control information to control creation of dots with a plurality of basic color inks and a dark ink, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and driving the print head based on the input control information to create dots with the plurality of basic color inks and the dark ink, thereby printing an image.

The computer reads any one of the specific programs recorded in the recording media to actualize the respective functions. Creation of dots with the dark ink as well as with the plurality of basic color inks improves the picture quality of the resulting printed image.

In accordance with one preferable application of the present invention, the specific program recorded in the recording medium for attaining the functions of the print controller further causes the computer to attain the function of storing in advance mappings of tints used to express a color image to combinations of the plurality of basic color inks and the dark ink to represent the tints. In this structure, the dot on-off conditions with regard to the plurality of basic color inks and the dark ink are specified, based on the mappings stored in advance. This arrangement ensures the quick and accurate specification of the dot on-off conditions.

The plurality of basic color inks generally include the cyan ink, the magenta ink, and the yellow ink. It is preferable that the dark ink has a hue close to the hue of the yellow ink, which has the highest lightness among these basic color inks. There is accordingly another possible application of the recording medium, in which a specific program for attaining the functions of the print controller is recorded. The present invention is thus directed to a recording medium, in which a specific program is recorded in a computer readable manner. The specific program actualizes a method of supplying control information to a printer, which creates dots with a plurality of different inks on a printing medium, in order to control the creation of dots with the plurality of different inks and thereby controlling a printing operation of the printer. The specific program causes a computer to attain the functions of: specifying dot on-off conditions with regard to a plurality of basic color inks and dark yellow ink based on input image data, the plurality of basic color inks including at least cyan ink, magenta ink, and yellow ink, the dark yellow ink having a main wavelength region of light absorption substantially identical with that of the yellow ink but a lower lightness than that of the yellow ink; and outputting the specification of the dot on-off conditions with regard to the plurality of basic color inks and the dark yellow ink to the printer as the control information, so as to control the printing operation of the printer.

There is also another possible application of the recording medium, in which a specific program for attaining the functions of the printing apparatus is recorded. The present invention is thus directed to a recording medium, in which a specific program is recorded in a computer readable manner. The specific program actualizes a method of receiving control information to control creation of dots with a plurality of different inks and driving a print head, which creates dots with the plurality of different inks on a printing medium, based on the control information, so as to print an image. The specific program causes a computer to attain the functions of: receiving the control information to control creation of dots with a plurality of basic color inks and dark yellow ink, the plurality of basic color inks including at least cyan ink, magenta ink, and yellow ink, the dark yellow ink having a main wavelength region of light absorption substantially identical with that of the yellow ink but a lower lightness than that of the yellow ink; and driving the print head based on the input control information to create dots with the plurality of basic color inks and the dark yellow ink, thereby printing an image.

The computer reads the specific program recorded in the recording medium to actualize the respective functions, so as to create dots with at least the cyan ink, the magenta ink, the yellow ink, and the dark yellow ink. This arrangement enables an image of high picture quality to be printed.

In the printing apparatus of the present invention, the dark ink is supplied by the dark ink supply unit. Other possible applications of the present invention are accordingly ink cartridges, in which the dark is kept. The present invention is thus directed to an ink cartridge detachably attached to a printing apparatus, which prints an image with a plurality of basic color inks, wherein the plurality of basic color inks are combined with one another to express achromatic color. The ink cartridge keeps therein at least one ink to be supplied to the printing apparatus. The ink cartridge has an ink reservoir that keeps therein a dark ink, the dark ink having a main wavelength region of light absorption substantially identical with that of one basic color ink selected out of the plurality of basic color inks but a lower lightness than that of the selected basic color ink.

Attachment of this ink cartridge to the printing apparatus enables the printing apparatus to create dots with the dark ink. As described previously, this arrangement enhances the degree of freedom in specification of the dot on-off conditions and improves the picture quality of the resulting printed image.

In accordance with one preferable application of the present invention, the dark ink kept in the ink cartridge has lower lightness and saturation than those of one basic color ink selected out of the plurality of basic color inks.

In accordance with another preferable application of the present invention, the dark ink kept in the ink cartridge has a main wavelength region for most strongly absorbing a ray in a visible range, which is substantially identical with that of one basic color ink selected out of the plurality of basic color inks, and a greater integral of light absorptivity in a wavelength region of the visible range than that of the selected basic color ink.

In accordance with still another preferable application of the present invention, the dark ink kept in the ink cartridge has:

(A) a characteristic wavelength region for strongly absorbing a ray in a visible range to mainly determine the hue of the dark ink, which is substantially identical with a characteristic wavelength region of one basic color ink selected out of the plurality of basic color inks;

(B) a mean value of light absorptivity that is greater than or substantially identical with a mean value of light absorptivity of the selected basic color ink in the characteristic wavelength region of the dark ink; and (C) a mean value of light absorptivity that is greater than a mean value of light absorptivity of the selected basic color ink in a wavelength region of visible light except the characteristic wavelength region of the dark ink.

Attachment of the ink cartridge, in which any one of these dark inks is kept, to the printing apparatus enables the printing apparatus to create dots with the dark ink. This arrangement improves the picture quality of the resulting printed image.

In accordance with one preferable application of the present invention, the ink cartridge further keeps therein one basic color ink selected out of the plurality of basic color inks. In accordance with another preferable application of the present invention, the ink cartridge further keeps therein black ink, which is achromatic and has a low lightness. In accordance with still another preferable application of the present invention, the ink cartridge further keeps therein at least one light ink, which has a hue substantially identical with that of at least one basic color ink selected out of the plurality of basic color inks but a lower density than that of the at least one basic color ink.

The arrangement of keeping any of these inks in addition to the dark ink in the same ink cartridge saves the total space required for the ink cartridges, compared with separate ink cartridges that independently keep one of these inks therein.

In accordance with another preferable application of the present invention, the ink cartridge further keeps therein one basic color ink selected out of the plurality of basic color inks and at least one light ink, which has a hue substantially identical with that of at least one basic color ink selected out of the plurality of basic color inks but a lower density than that of the at least one basic color ink. The arrangement of keeping these inks together in addition to the dark ink in the same ink cartridge further saves the total space required for the ink cartridges. These color inks including the dark ink are mainly consumed in the process of printing a color image, whereas the black ink is mainly consumed in the process of printing a black and white image, for example, a document. The arrangement keeps these color inks, which are mainly consumed to print a color image, together in the same ink cartridge, separate from the black ink. This arrangement desirably enables only the ink cartridge keeping inks mainly consumed to be replaced according to the image to be printed.

The ink cartridge of the present invention may keep therein an ink having the following characteristics as the dark ink:

(A) a characteristic wavelength region that is mostly in a wavelength range of 400 nm to 500 nm, the characteristic wavelength region strongly absorbing a ray in a visible range to mainly determine the hue of the dark yellow ink; and (B) a mean value of absorptivity of the ray in the visible range except the characteristic wavelength region, which ranges from 10% to 60%.

The ink cartridge of the present invention may alternatively keep therein an ink having the following characteristics as the dark ink:

(A) a hue included in a specific range of 10R to 10GY on a Munsell hue circle; and (B) a saturation of smaller than 3.5C on a Munsell chroma.

Attachment of the ink cartridge, in which any of these inks is kept, to the printing apparatus enables the printing apparatus to create dots with the dark ink. This arrangement improves the picture quality of the resulting printed image.

The present invention is directed to an ink cartridge that keeps therein yellow ink and dark yellow ink, which has a lower lightness than that of the yellow ink. The present invention is also directed to an ink cartridge that keeps therein dark yellow ink and black ink. The present invention is further directed to an ink cartridge that keeps therein yellow ink, dark yellow ink, cyan ink, light cyan ink, magenta ink, and light magenta ink.

The arrangement of keeping these inks together in the same ink cartridge saves the total space required for the ink cartridges, compared with separate ink cartridges that independently keep one of these inks therein.

In accordance with one preferable application of the ink cartridge, the capacity of the dark yellow ink may be set to be greater than the capacity of the yellow ink. When a natural image, such as a landscape or a portrait, is printed, the consumption of the dark yellow ink tends to be greater than the consumption of the yellow ink. The greater capacity of the dark yellow ink than that of the yellow ink thus enables these two inks to be used up at substantially the same time. This arrangement desirably reduces the waste of ink by a replacement of the ink cartridge, in which one ink is used up but a large quantity of the other ink still remains.

The present invention is also directed to an ink cartridge that keeps therein dark yellow ink, light cyan ink and light magenta ink. The arrangement of keeping these inks together in the same ink cartridge saves the total space required for the ink cartridges, compared with separate ink cartridges that independently keep one of these inks therein. When a natural image, such as a landscape or a portrait, is printed, these inks are often consumed more than the other inks. The arrangement of keeping the dark yellow ink the light cyan ink, and the light magenta ink in the same ink cartridge enables only this ink cartridge to be replaced according to the image to be printed.

In accordance with one preferable application of the present invention, the ink cartridge further has a storage device that stores information regarding a quantity of each ink kept therein in a readable, writable, and volatile manner.

Storing the information regarding the quantity of each ink kept in the ink cartridge ensures the printing operation based on the information with regard to the accurate remaining quantity of ink. This arrangement effectively prevents the ink from being used up in the course of printing.

The storage device included in the ink cartridge may have an ink quantity information storage area, which is accessed to be written first by the printing apparatus and in which the information regarding the quantity of each ink kept in the ink cartridge is stored.

The area written first is, for example, a head area in the storage device or any area in the storage device accessible to be written first by the printing apparatus. Storing the information regarding the quantity of each ink in this area shortens the time required for writing the information. This arrangement effectively prevents the information to be written from being destroyed by cutting off the power supply of the printing apparatus in the course of the writing operation.

When the dark ink kept in the ink cartridge is used up, an ink supplier is used to feed a supply of the dark ink to the ink cartridge, so as to continue creation of dots with the dark ink and print an image of high quality. Another application of the present invention is accordingly an ink supplier. The present invention is thus directed to an ink supplier that feeds a supply of ink to an ink cartridge, wherein the ink cartridge is detachably attached to a printing apparatus and keeps therein at least one ink used by the printing apparatus. The ink supplier includes a sealed ink reservoir that keeps an ink in a sealing manner, and an ink supply unit that feeds a supply of the sealed ink to the ink cartridge. The ink sealed in the sealed ink reservoir has the following characteristics:

(A) a characteristic wavelength region that is mostly included in a wavelength range of 400 nm to 500 nm, the characteristic wavelength region strongly absorbing a ray in a visible range to mainly determine the hue of the ink; and (B) a mean value of absorptivity of the ray in the visible range except the characteristic wavelength region, which ranges from 10% to 60%.

The ink supplier has the sealed ink reservoir that keeps an ink in a sealing manner, and the ink supply unit that feeds a supply of the sealed ink to the ink cartridge. The ink having the above characteristics (A) and (B) is sealed in the sealed ink reservoir. The characteristic wavelength region of the ink, which mainly determines the hue of the ink, is mostly included in the wavelength range of 400 nm to 500 nm. This means that the ink roughly has the hue of yellow. The ink has the mean value of absorptivity of the ray in the visible range except the characteristic wavelength region, which ranges from 10% to 60%. This means that the ink has a low lightness. The ink having the characteristics (A) and (B) is accordingly replaceable with the dark ink. In the event that the dark ink kept in the ink cartridge is used up, supply of the ink from the ink supplier to the ink cartridge enables continuous creation of dots with the dark ink to print an image of high picture quality.

The ink sealed in the ink supplier may alternatively have the following characteristics:

(A) a hue included in a specific range of 10R to 10GY on a Munsell hue circle; and (B) a saturation of smaller than 3.5C on a Munsell chroma.

This ink may also be used as the dark ink. A supply of this ink sealed in the ink supplier to the ink cartridge enables creation of dots with the dark ink.

The technique of the present invention may be implemented by a program code that is stored in a computer to attain the functions of the printing system, the print controller, or the printing apparatus of the present invention discussed above. The computer then executes the respective functions written in the program code. A first possible application of the present invention is thus a program code, in which a method of creating dots with a plurality of different inks so as to print an image on a printing medium is written in a computer readable manner. The method actualizes the functions of: specifying dot on-off conditions with regard to a plurality of basic color inks and a dark ink based on input image data, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and controlling creation of dots with the plurality of basic color inks and the dark ink, based on the specification of the dot-on-off conditions with regard to the plurality of basic color inks and the dark ink.

A second possible application of the present invention is a program code, in which a method of supplying control information to a printer, which creates dots with a plurality of different inks on a printing medium, in order to control the creation of dots with the plurality of different inks and thereby controlling a printing operation of the printer is written in a computer readable manner. The method actualizes the functions of: specifying dot on-off conditions with regard to a plurality of basic color inks and a dark ink based on input image data, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and outputting the specification of the dot on-off conditions with regard to the plurality of basic color inks and the dark ink to the printer as the control information, so as to control the printing operation of the printer.

A third possible application of the present invention is a program code, in which a method of receiving control information to control creation of dots with a plurality of different inks and driving a print head, which creates dots with the plurality of different inks on a printing medium, based on the control information, so as to print an image is written in a computer readable manner. The method actualizes the functions of: receiving the control information to control creation of dots with a plurality of basic color inks and a dark ink, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and driving the print head based on the input control information to create dots with the plurality of basic color inks and the dark ink, thereby printing an image.

Any of the print controllers and the printing apparatuses of the present invention discussed above may provide a plurality of dark inks and uses a most suitable dark ink or the plurality of dark inks simultaneously according to an image to be printed. The present invention may accordingly have other possible applications discussed below. A fourth possible application of the present invention is thus a print controller that supplies control information to a printer, which creates dots with a plurality of different inks, in order to control the creation of dots with the plurality of different inks. The printer creates dots with a plurality of basic color inks as well as with a plurality of dark inks, wherein the plurality of basic color inks are combined with one another to express achromatic color, and each of the dark inks has a main wavelength region of light absorption substantially identical with that of one basic color ink selected out of the plurality of basic color inks but a lower lightness than that of the selected basic color ink. The print controller includes: a dot on-off condition specification unit that specifies dot on-off conditions with regard to the plurality of basic color inks and the plurality of dark inks, based on input image data; and a control information output unit that outputs the specification of the dot on-off conditions with regard to the plurality of basic color inks and the plurality of dark inks to the printer as the control information.

A fifth possible application of the present invention is a printing apparatus that has a print head to create dots with a plurality of different inks on a printing medium, receives control information to control the creation of dots with the plurality of different inks, and actually creates dots with the plurality of different inks, based on the input control information, so as to print an image. The printing apparatus includes: a basic color ink supply unit that supplies a plurality of basic color inks to the print head, wherein the plurality of basic color inks are combined with one another to express achromatic color; a dark ink supply unit that supplies a plurality of dark inks to the print head, wherein each of the dark inks has a main wavelength region of light absorption substantially identical with that of one basic color ink selected out of the plurality of basic color inks but a lower lightness than that of the selected basic color ink; a control information input unit that receives the control information with regard to dots of the plurality of basic color inks and the plurality of dark inks; and a dot formation unit that drives the print head based on the input control information, so as to create dots with the plurality of basic color inks and the plurality of dark inks.

These and other objects, features, aspects, and advantages of the present invention will become more apparent from the following detailed description of the preferred embodiment with the accompanying drawings.

BRIEF DESCRIPTION OF THE DRAWINGS

FIG. 10 is an enlarged view illustrating a storage element mounted on the side face of the ink cartridge;

FIG. 11 shows the contents of data stored in the storage element of the ink cartridge;

FIGS. 21A and 21B show a binarization process;

FIGS. 29A and 29B show results of simulative computation of the dot recording ratio with regard to each color ink in the case of printing a gradation pattern from white to black with the color printer using only the three color inks C, M, and Y.

DESCRIPTION OF THE PREFERRED EMBODIMENT

Figure 1:
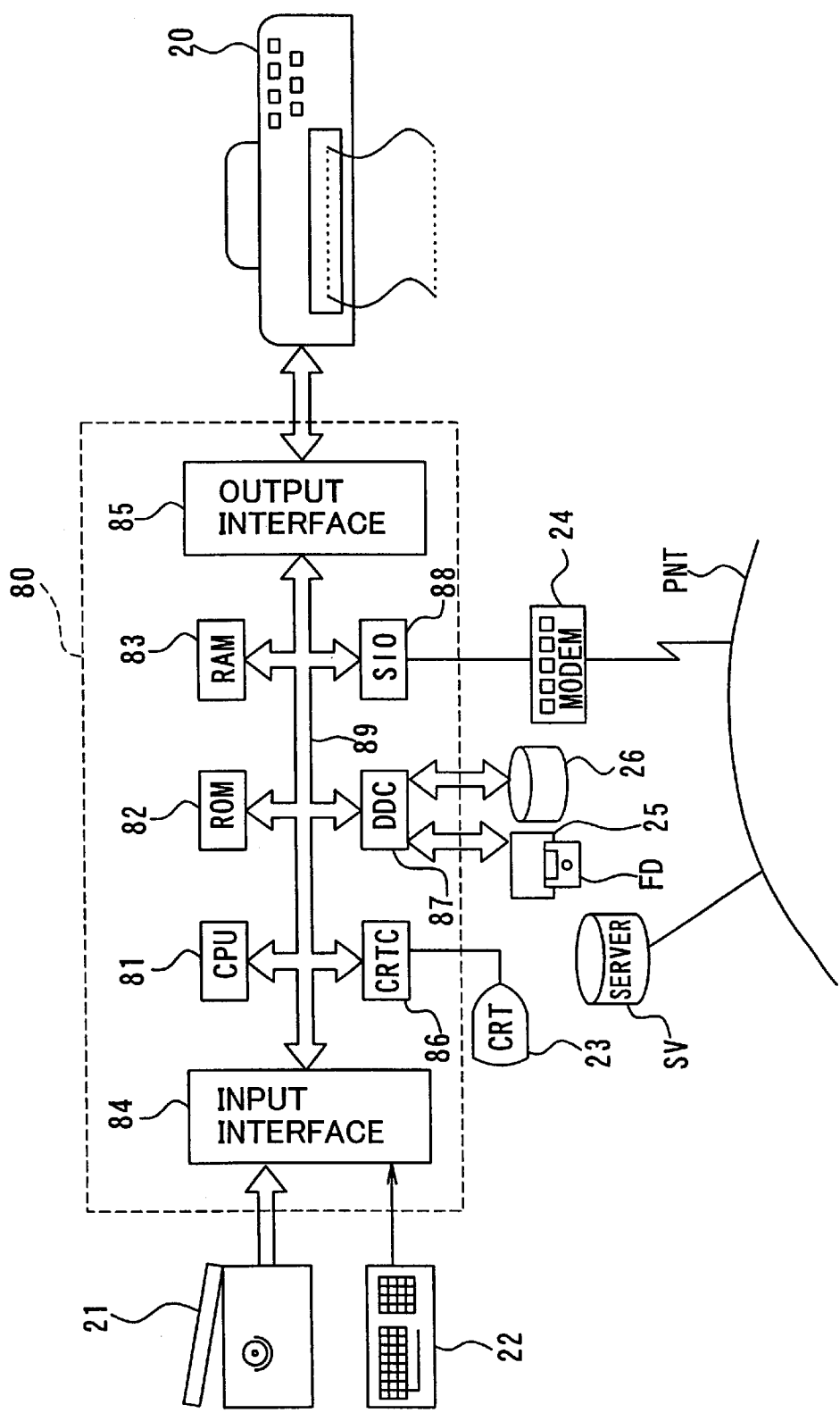
FIG. 1 is a block diagram schematically illustrating the structure of a printing system including a print controller and a color printer in one embodiment according to the present invention.
Figure 2:
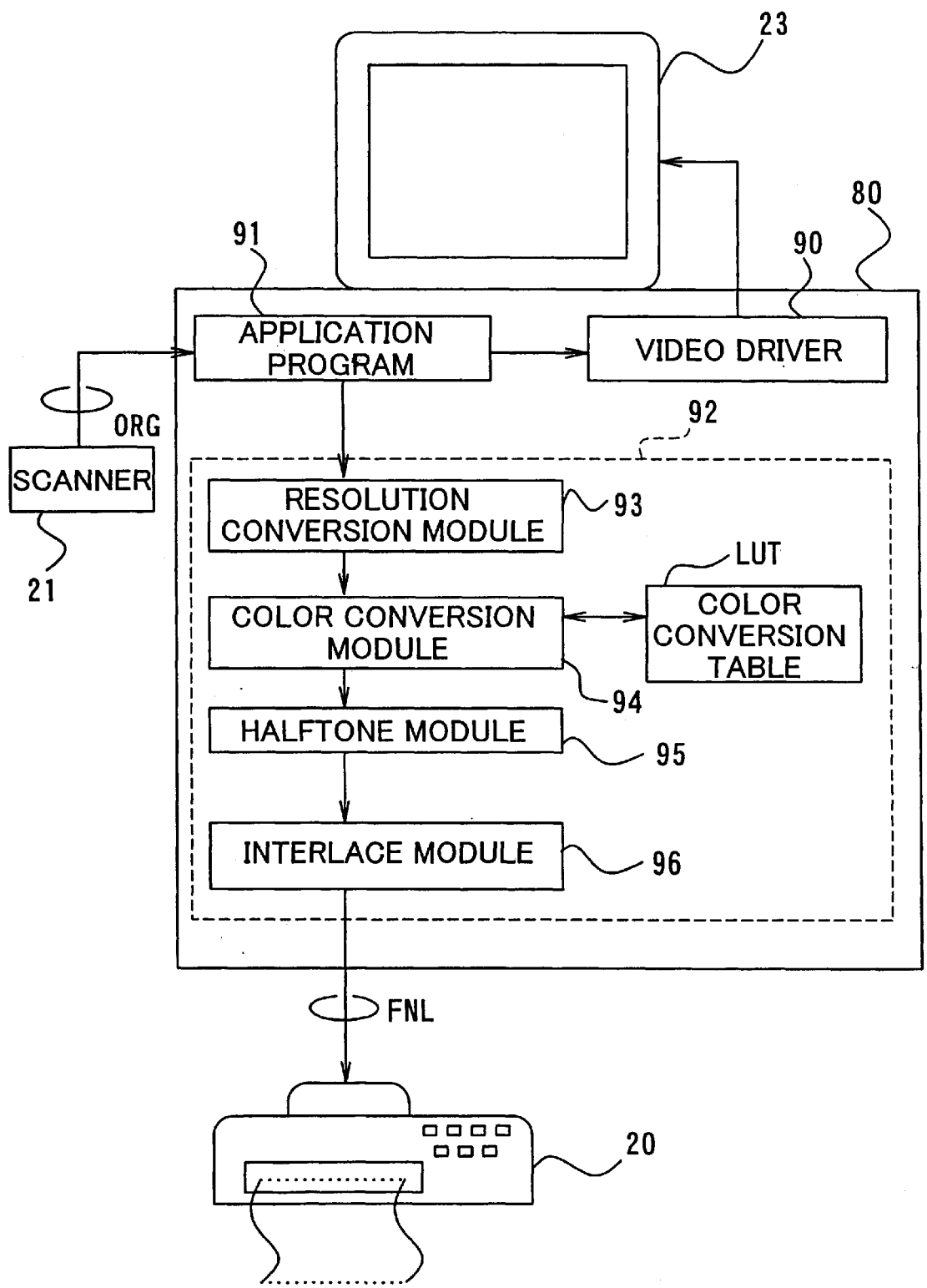
FIG. 2 is a block diagram illustrating a software configuration of the printing system of the embodiment.

One mode for carrying out the present invention is described below in the following sequence as a preferred embodiment:
A. Structure of Apparatus
A-1. General Structure
A-2. Structure of Ink Cartridge
A-3. Dark Yellow Ink
B. Image Processing
B-1. Process of Converting Resolution
B-2. Color Conversion Process
B-3. Process of Converting Number of Tones
B-4. Binarization by Error Diffusion Method
B-5. Binarization by Systematic Dither Method
B-6. Interlace Process
C. Results of Simulations
C-1. Gradation Pattern from Red to Black
C-2. Gradation Pattern from Magenta to Black
C-3. Gradation Pattern from White to Black
C-4. Application to Printer with Four Color Inks
C-5. Application to Printer with Three Color Inks
A. Structure of Apparatus
A-1. General Structure FIG. 1 is a block diagram schematically illustrating the structure of a printing system including a print controller and a printing apparatus in one embodiment according to the present invention. FIG. 2 is a block diagram illustrating a software configuration of the printing system of the embodiment. The printing system includes a computer 80 connected to a color printer 20 and a color scanner 21. The computer 80 reads and executes predetermined programs to function, in combination with the color printer 20 and the color scanner 21, as the printing system as a whole. The color scanner 21 converts a color original, that is, an object to be printed, into color image data ORG, which are in a processible form by the computer 80 and input into the computer 80. The computer 80 carries out required image processing and further converts the color image data ORG into image data FNL, which are in a printable form by the printer 20 and input into the color printer 20. The image data processible by the computer 80 include those representing images read by the color scanner 21 with or without subsequent processing, as well as those representing images generated by a variety of application programs 91 on the computer 80. The color printer 20 creates dots of various color inks on a sheet of printing paper based on the input image data FNL. The series of this procedure enables a resulting color image corresponding to the color image data output from the computer 80 to be printed on the printing paper.

The computer 80 includes a CPU 81 that carries out a variety of operations, a ROM 82, a RAM 83, an input interface 84, an output interface 85, a CRT controller (CRTC) 86, a disk controller (DDC) 87, and a serial input-output interface (SIO) 88, which are mutually connected via a bus 89 to allow transmission of data. The CRTC 86 controls output of signals to a color display CRT 23. The DDC 87 controls data transmission to and from a flexible disk drive 25, a hard disk 26, and a CD-ROM drive (not shown). A variety of programs loaded to the RAM 83 and executed by the CPU 81 and a variety of programs provided in the form of device drivers are stored in the ROM 82 and the hard disk 26. Connection of the SIO 88 with a public telephone network PNT via a modem 24 enables required data and programs to be downloaded to the hard disk 26 from a serer SV on an external network.

A supply of power to the computer 80 activates the operating system stored in the ROM 82 and the hard disk 26 and a variety of application programs 91 under the control of the operating system.

The color printer 20 of this embodiment is a color ink jet printer that forms dots of seven different color inks, that is, cyan, light cyan, magenta, light magenta, yellow, dark yellow, and black inks, on a sheet of printing paper and thereby prints a color image. The ink jet printer applied in this embodiment uses piezoelectric elements PE to eject ink as discussed later. The printer may, however, have a print head that ejects ink by another technique, for example, by means of bubbles that are generated in an ink conduit by a supply of electricity to a heater disposed in the ink conduit.

In color printers driven by other principles, for example, laser printers and thermal transfer printers, there is no fear of tearing or rumpling the printing medium. Application of a large quantity of ink on the printing medium may, however, cause problems of ink blot and peel-off. The technique of the embodiment discussed below may thus be applicable to such color printers.

Referring to FIG. 2, in the computer 80, all the application programs 91 work under the control of the operating system. A video driver 90 and a printer driver 92 are incorporated in the operating system, and image data output from each application program 91 are output to the color printer 20 via the printer driver 92. The application program 91 that processes an input image, for example, by retouch causes the input image taken from the color scanner 21 to be displayed on the CRT 23 via the video driver 90. This enables the user to carry out the required image processing while checking the displayed image on the CRT 23.

When the application program 91 issues a print instruction, the printer driver 92 of the computer 80 receives image data from the application program 91 and carries out predetermined image processing to convert the input image data to image data FNL that are printable by the printer 20.

As shown conceptually in FIG. 2, the image processing carried out in the printer driver 92 is mainly classified into four modules, that is, a resolution conversion module 93, a color conversion module 94, a halftone module 95, and an interlace module 96. The details of the image processing carried out by each module will be discussed later. The image data received by the printer driver 92 are subjected to the image processing performed by the respective modules and are output as the final image data FNL to the color printer 20. The color printer 20 of this embodiment does not carry out the image processing but simply creates dots according to the input image data FNL. A modified application may, however, cause the color printer 20 to carry out part of the image processing.

Figure 3:
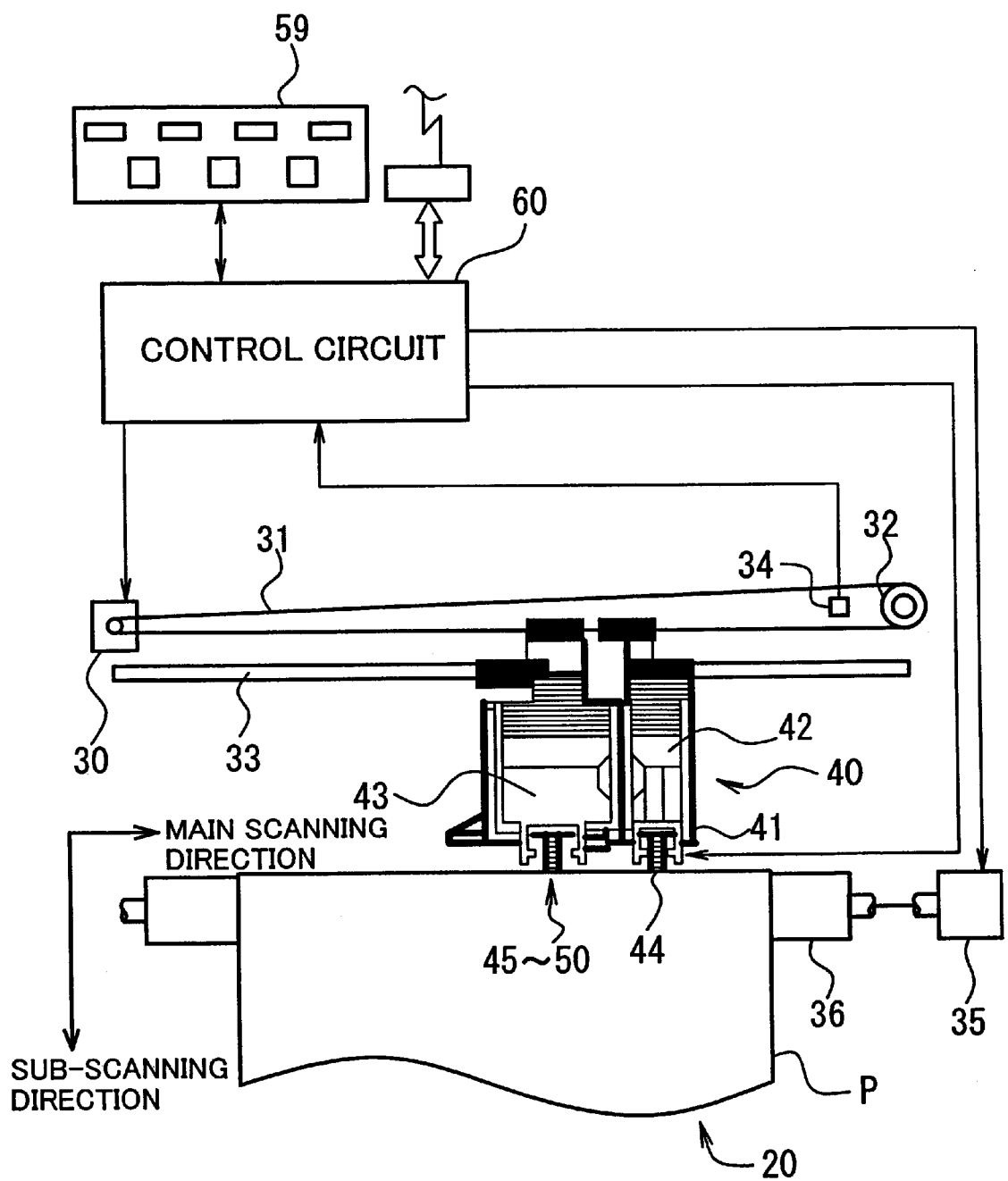
FIG. 3 schematically illustrates the structure of the color printer of the embodiment.

FIG. 3 schematically illustrates the structure of the color printer 20 in this embodiment. The color printer 20 has a mechanism of driving a print head 41 mounted on a carriage 40 to implement ink ejection and dot creation, a mechanism of moving the carriage 40 forward and backward along an axis of a platen 36 by means of a carriage motor 30, a mechanism of feeding a sheet of printing paper P by means of a sheet feed motor 35, and a control circuit 60. The mechanism of reciprocating the carriage 40 along the axis of the platen 36 includes a sliding shaft 33 that slidably holds the carriage 40 arranged in parallel with the axis of the platen 36, a pulley 32 that is linked with the carriage motor 30 via an endless drive belt 31 spanned therebetween, and a position sensor 34 that detects the position of the origin of the carriage 40. The mechanism of feeding the printing paper P includes the platen 36, the sheet feed motor 35 that rotates the platen 36, a sheet-feed assist roller (not shown), and a gear train (not shown) that transmits the rotation of the sheet feed motor 35 to the platen 36 and the sheet-feed assist roller. The control circuit 60 transmits signals to and from a control panel 59 of the printer 20 and adequately controls the operations of the sheet feed motor 35, the carriage motor 30, and the print head 41. The sheet of printing paper P fed to the color printer 20 is held between the platen 36 and the sheet-feed assist roller and fed by a predetermined length according to a rotational angle of the platen 36.

Ink cartridges 42 and 43 are detachably attached to the carriage 40. In one example, the ink cartridge 42 has only black (K) ink kept therein, whereas the ink cartridge 43 has a total of six different color inks, three basic color inks, that is, cyan (C), magenta (M), and yellow (Y) inks, as well as three additional color inks, that is, light cyan (LC), light magenta (LM), and dark yellow (DY) inks, kept therein. Namely the color printer 20 has dark ink in addition to the standard ink with regard to yellow, and light ink in addition to the standard ink with regard to cyan and magenta.

The combination of these inks may be changed. For example, the dark yellow (DY) ink, the light cyan (LC) ink, and the light magenta (LM) ink may be kept in one ink cartridge. In another example, only the dark yellow (DY) ink may be kept in a separate ink cartridge. The structures of these ink cartridges will be discussed in detail later.

The ink cartridge 43 has a storage element 52 (see FIG. 6), in which pieces of information, for example, with regard to the remaining quantities of the respective inks, are stored. The storage element 52 has an EEPROM. The computer 80 writes and reads the data regarding the remaining quantities of inks into and from the storage element 52 via the control circuit 60 of the color printer 20. The details of the process of reading and writing the data regarding the remaining quantities of inks will be discussed later.

The print head 41 disposed on the lower portion of the carriage 40 has ink ejection heads 44, 45, 46, 47, 48, 49, 50 that respectively correspond to the K, C, LC, M, LM, Y, and DY inks. Ink supply conduits (not shown) are formed for the respective inks in the bottom of the carriage 40. When the ink cartridges 42 and 43 are attached to the carriage 40, the respective inks kept in the ink cartridges 42 and 43 are supplied to the ink ejection heads 44 through 50 via the corresponding ink supply conduits. The supply of ink fed to each of the ink ejection heads 44 through 50 is ejected from the print head 41 to create dots on the printing paper P according to the technique discussed below.

Figure 4A:
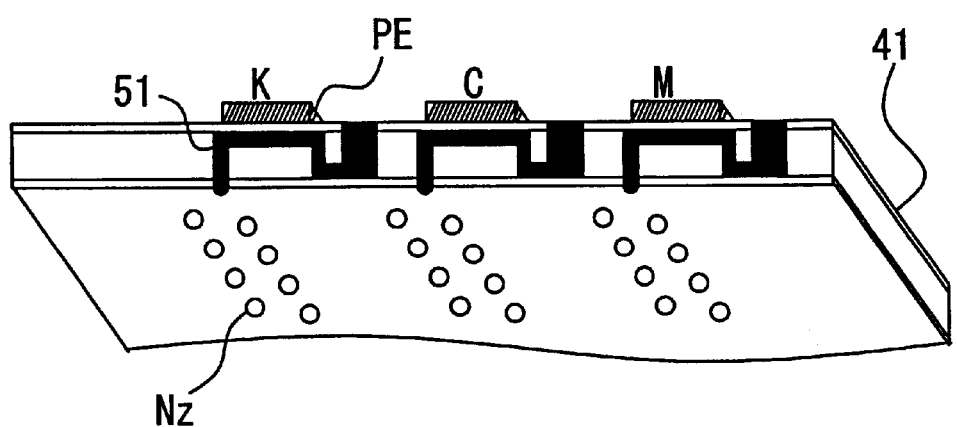
FIGS. 4A and 4B show the principle of dot formation in the color printer of the embodiment.
Figure 4B:
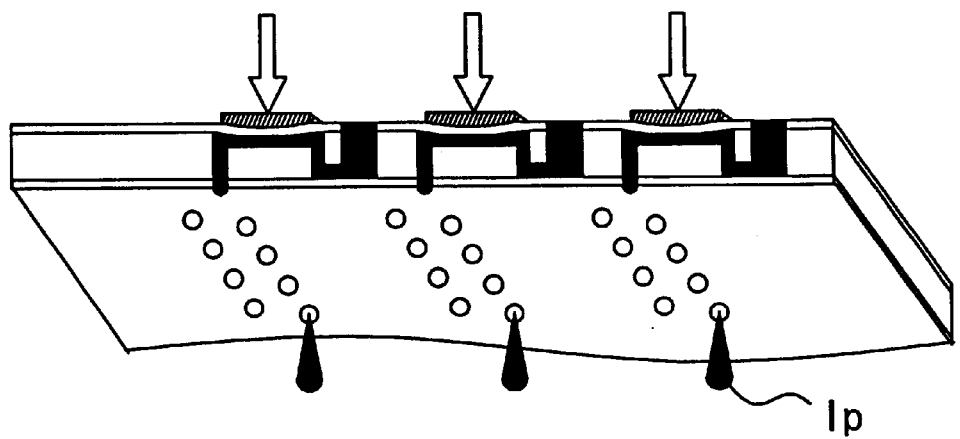

FIG. 4A shows the internal structure of the print head 41. Forty eight nozzles Nz are formed in each of the ink ejection heads 44 through 50 corresponding to the respective colors. Each nozzle has an ink conduit 51 and a piezoelectric element PE arranged on the ink conduit 51. As is known by those skilled in the art, the piezoelectric element PE deforms its crystal structure by application of a voltage and implements an extremely high-speed conversion of electrical energy into mechanical energy. In this embodiment, when a preset voltage is applied between electrodes on either end of the piezoelectric elements PE for a predetermined time period, the piezoelectric element PE is expanded for the predetermined time period to deform one side wall of the ink conduit 51 as shown in FIG. 4B. The volume of the ink conduit 51 is reduced according to the expansion of the piezoelectric element PE. A certain quantity of ink corresponding to the reduction is ejected as an ink particle Ip from the nozzle Nz at a high speed. The ink particle Ip soaks into the printing paper P set on the platen 36 and creates a dot on the printing paper P.

Figure 5A:
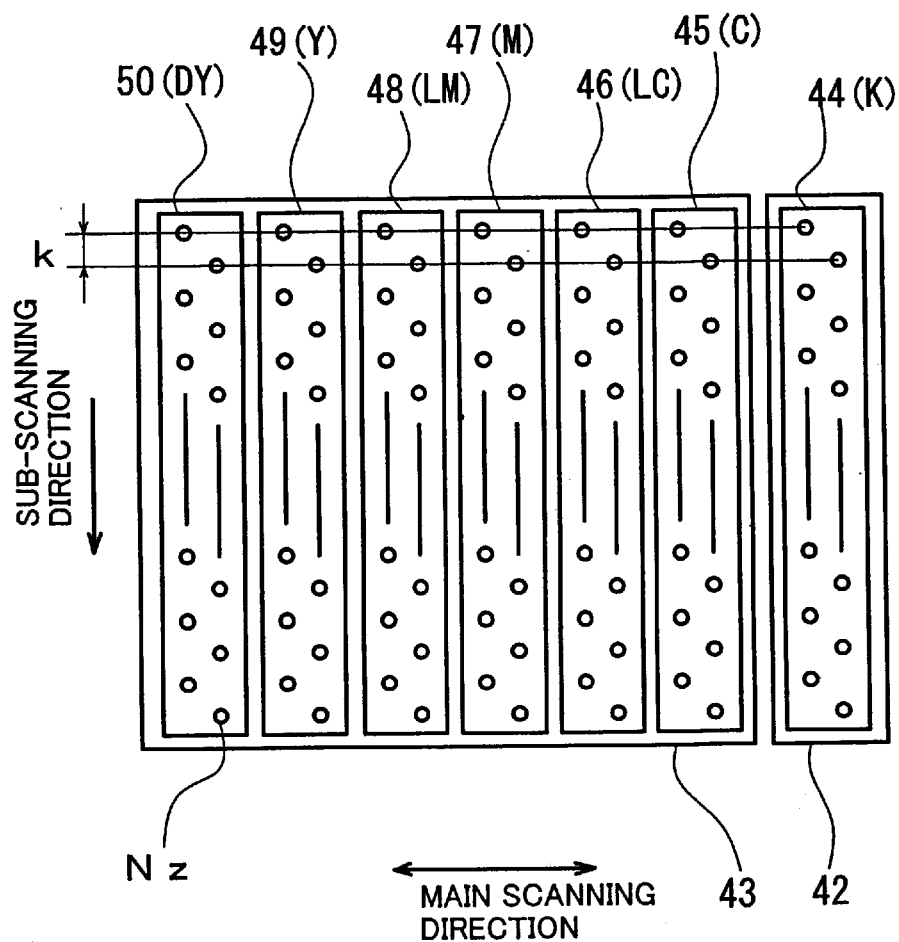
FIGS. 5A and 5B show arrangements of nozzles in the color printer of the embodiment.
Figure 5B:
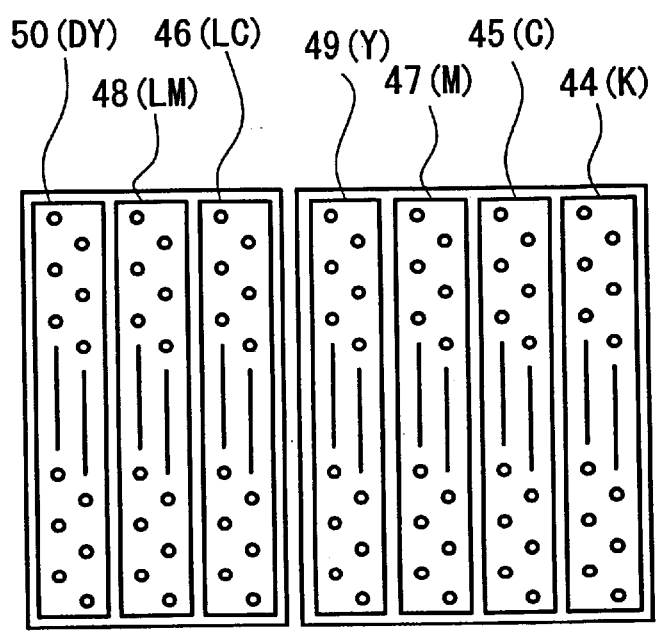

FIGS. 5A and 5B show possible arrangements of ink jet nozzles Nz on the ink ejection heads 44 through 50. In the example of FIG. 5A, only the black (K) ink is kept in the ink cartridge 42, whereas the six different color inks, that is, cyan (C), magenta (M), yellow (Y), light cyan (LC), light magenta (LM), and dark yellow (DY) inks, are kept in the ink cartridge 43. Accommodation of a plurality of different inks in one ink cartridge desirably reduces the required number of ink cartridges and the total space required for attachment of the ink cartridges. In another example as shown in FIG. 5B, the DY ink may be kept with the LC and LM inks in the same ink cartridge. In still other examples, the DY ink may be kept with the C, M, and Y inks or with the K ink.

As shown in FIG. 5A, seven nozzle arrays, from which the respective color inks are ejected, are formed in the bottom faces of the respective ink ejection heads 44 through 50. Each nozzle array includes forty eight nozzles Nz arranged in zigzag at a preset nozzle pitch k. The forty eight nozzles Nz included in each nozzle array may be arranged in alignment, instead of in zigzag. The zigzag arrangement shown in FIG. 5A, however, has an advantage that the nozzle array can be designed to have a small nozzle pitch k.

Referring to FIG. 5A, the ink ejection heads 44 through 50 of the respective colors are shifted in position in the moving direction of the carriage 40. Since the nozzles included in each ink ejection head are arranged in zigzag, the nozzles are also shifted in position in the moving direction of the carriage 40. The control circuit 60 of the color printer 20 drives the respective ink ejection heads 44 through 50 at suitable head drive timings by taking into account the positional differences of the nozzles in the course of moving the carriage 40 and driving the nozzles.

Figure 6:
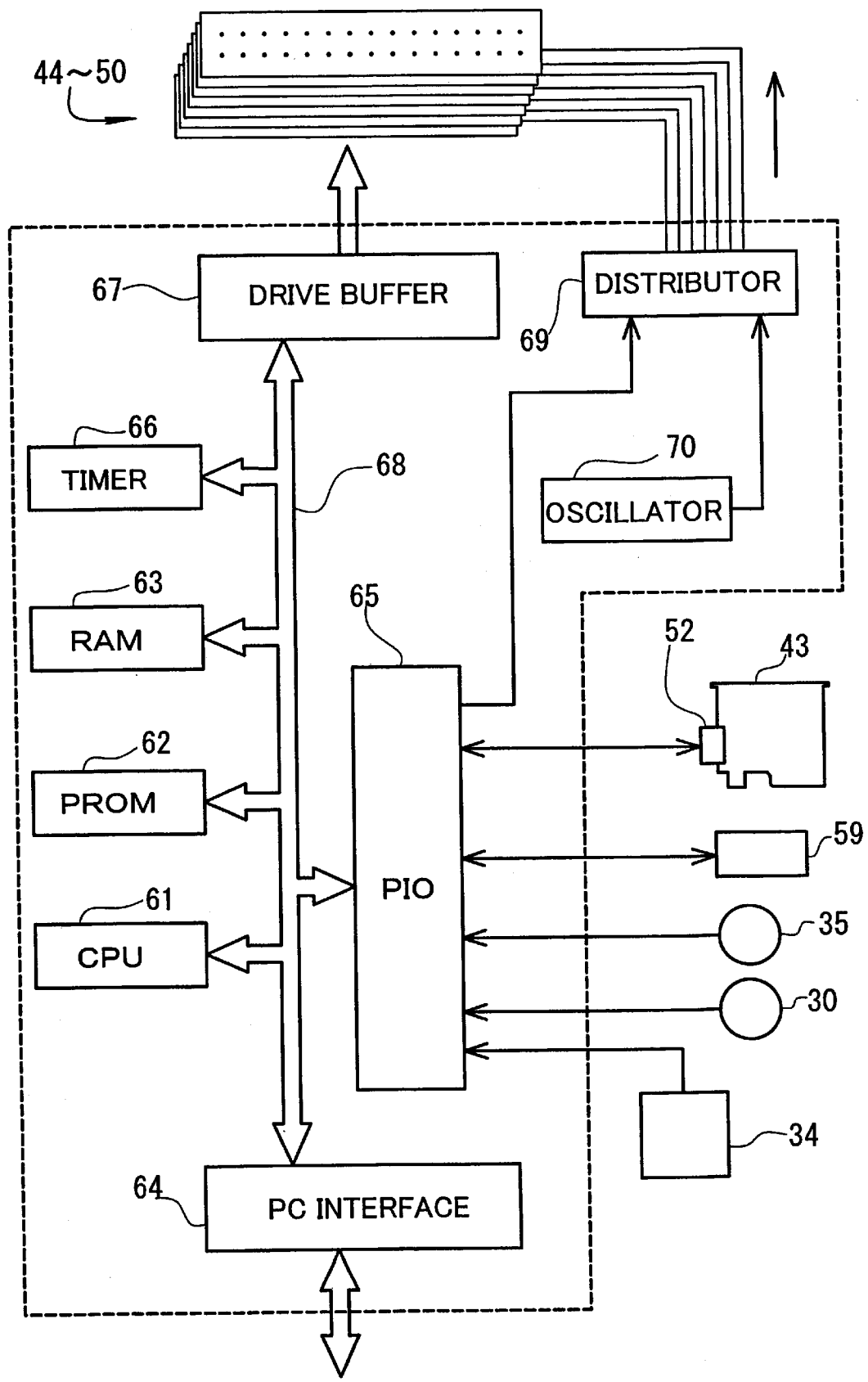
FIG. 6 shows the internal structure of the print controller of the embodiment.

FIG. 6 illustrates the internal structure of the control circuit 60 in the color printer 20. The control circuit 60 includes a CPU 61, a PROM 62, a RAM 63, a PC interface 64 that transmits data to and from the computer 80, a peripheral equipment input-output unit (PIO) 65 that transmits data to and from the sheet feed motor 35, the carriage motor 30, and other elements, a timer 66, and a drive buffer 67. The data regarding the remaining quantities of inks or the quantities of consumption of inks are read from or written into the storage element 52 incorporated in the ink cartridge 43 via the PIO 65. The drive buffer 67 functions to supply dot on/off signals to the ink ejection heads 44 through 50. These elements are mutually connected via a bus 68 to allow transmission of data. The control circuit 60 further includes an oscillator 70 that outputs driving waveforms at selected frequencies and a distributor 69 that distributes the outputs from the oscillator 70 to the ink ejection heads 44 through 50 at specified timings.

The control circuit 60 constructed as shown in FIG. 6 receives the image data FNL output from the computer 80 and temporarily stores the dot on/off signals in the RAM 63. The CPU 61 outputs the dot data to the drive buffer 67 at preset timings synchronously with the operations of the sheet feed motor 35 and the carriage motor 30.

Figure 7:
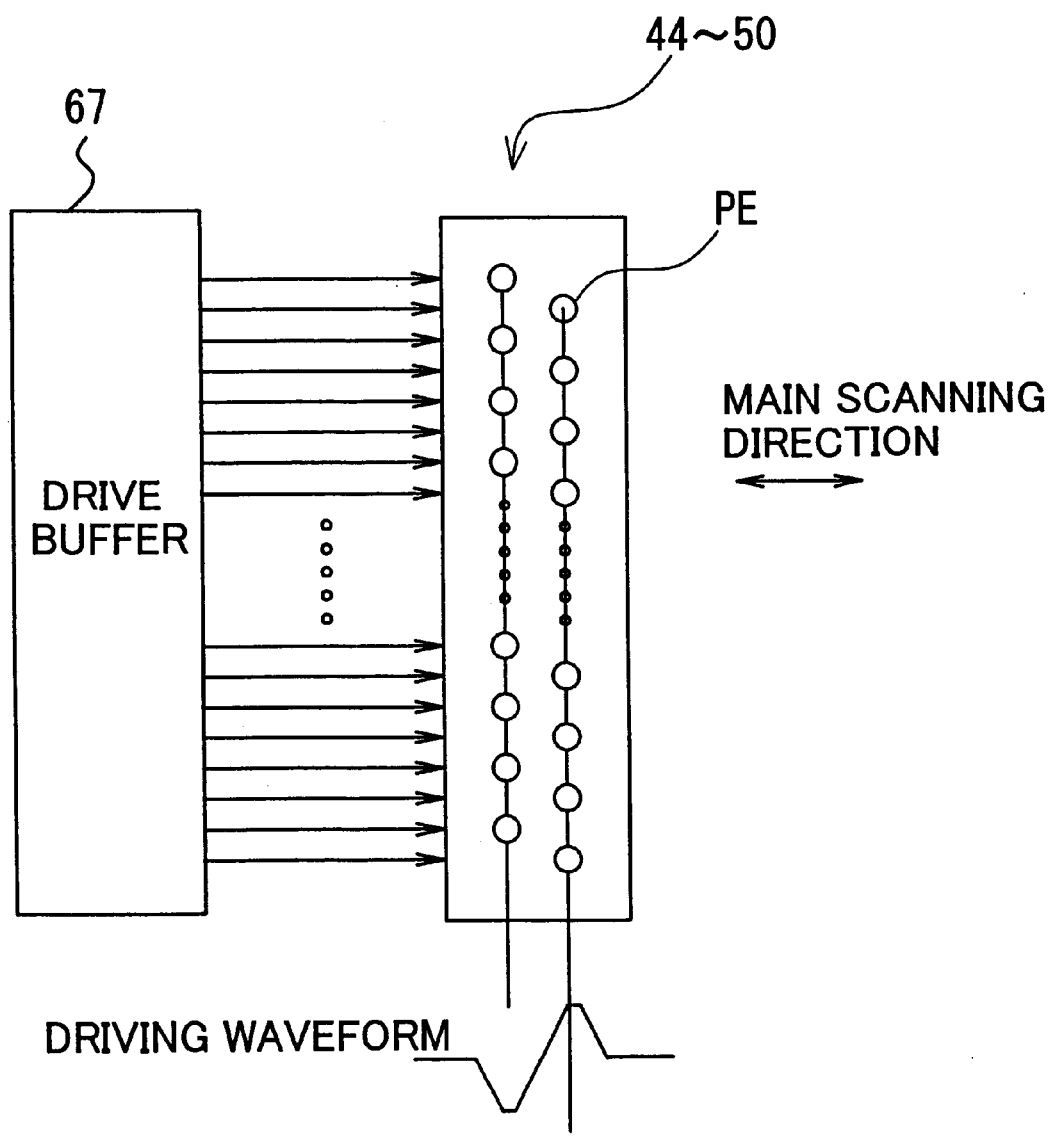
FIG. 7 shows a process of receiving data output from a print head to a drive buffer and creating dots in the printing system of the embodiment.

The following describes a mechanism of creating dots in response to the dot on/off signals output from the CPU 61 to the drive buffer 67. FIG. 7 illustrates connection of one nozzle array in the ink ejection heads 44 through 50. The nozzle array in each of the ink ejection heads 44 through 50 is included in a circuit, in which the drive buffer 67 works as the source and the distributor 69 as the sink. The piezoelectric elements PE corresponding to the nozzles Nz included in the nozzle array have one electrodes respectively connected to the respective output terminals of the drive buffer 67 and the other electrodes collectively connected to the output terminal of the distributor 69. The driving waveforms of the oscillator 70 are output from the distributor 69 as shown in FIG. 7. When the CPU 61 outputs the dot on/off signals of the respective nozzles to the drive buffer 67, only the piezoelectric elements PE receiving the ON signal are driven in response to the output driving waveforms. The ink particles Ip are thus ejected from the nozzles corresponding to the piezoelectric elements PE that have received the ON signal from the drive buffer 67.

The color printer 20 having the hardware configuration discussed above drives the carriage motor 30 to move the ink ejection heads 44 through 50 of the respective colors relative to the printing paper P in the main scanning direction, and drives the sheet feed motor 35 to shift the printing paper P in a sub-scanning direction. Under the control of the control circuit 60, the print head 41 is driven at adequate timings while the main scans and sub-scans of the carriage 40 are repeated. The color printer 20 accordingly prints a color image on the printing paper P.

A-2. Structure of Ink Cartridge

Figure 8A:
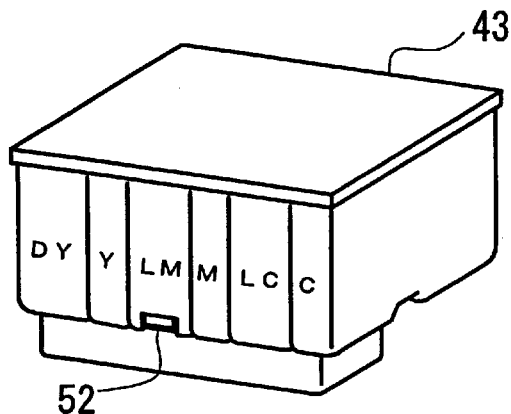
FIGS. 8A through 8F are perspective views showing ink cartridges attachable to the color printer of the embodiment.

FIG. 8A shows the appearance of the ink cartridge 43 attached to the color printer 20 of this embodiment. As mentioned previously, the ink cartridge 43 has the total of six different color inks, that is, cyan (C), light cyan (LC), magenta (M), light magenta (LM), yellow (Y), and dark yellow (DY) inks, kept therein. Accommodation of a plurality of different inks in one ink cartridge desirably reduces the required number of ink cartridges and the total space required for the attachment of ink cartridges. The ink cartridge 43 has the storage element 52 including the EEPROM, in which various pieces of information are stored as discussed later.

The quantities of the respective color inks kept in the ink cartridge 43 are determined according to the expected quantities of use of the respective color inks, so as to satisfy the following relations. The quantity of the DY ink is set greater than the quantity of the Y ink. The quantity of the LC ink is set greater than the quantity of the C ink. The quantity of the LM ink is set greater than the quantity of the M ink. The arrangement of setting the quantities of inks kept in one ink cartridge according to the expected quantities of use of the respective inks enables all the color inks to be used up at substantially the same time. Namely this arrangement reduces the waste of ink.

Figure 9A:
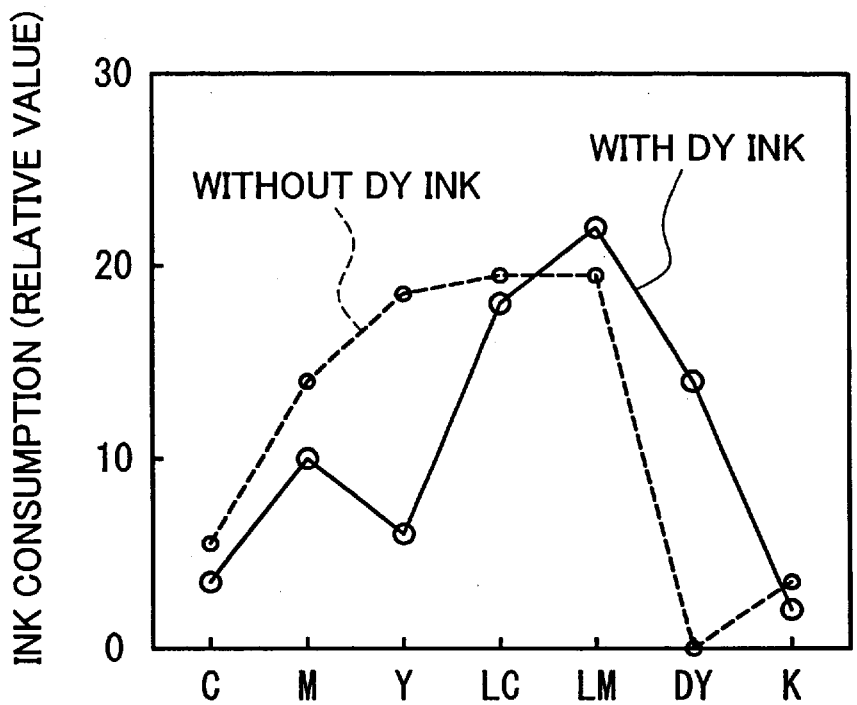
FIGS. 9A and 9B are graphs showing observed quantities of ink consumption when natural images are printed with the color printer of the embodiment.
Figure 9B:
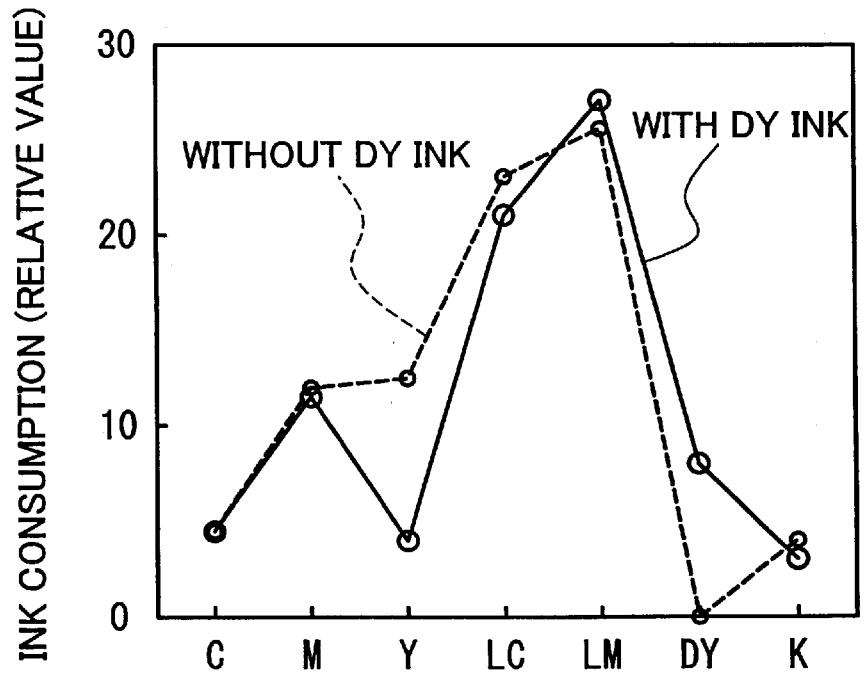

FIGS. 9A and 9B are graphs showing observed quantities of ink consumption when natural images, such as landscapes and portraits, are printed with the color printer 20 of the embodiment. The consumed quantities of the respective color inks are varied to some extent by a variety of settings in the color printer 20 as described later. The expected quantities of use of the respective color inks can, however, be roughly specified by such observed values.

FIG. 9A shows the mean consumed quantities of the respective color inks with regard to typical nine images including landscapes and portraits. In the graphs of FIGS. 9A and 9B, the consumed quantity of each color ink is shown as a relative value to a predetermined reference value. FIG. 9B shows the consumed quantities of the respective color inks when an N1 sample image is printed out of high definition color digital standard image data (ISO/JIS-SCID). The high definition color digital standard image data are supplied in the form of CMY image data, so that the input image data are converted to RGB image data and output to the color printer 20 for printing.

The curves of dotted line in both FIGS. 9A and 9B represent the observed quantities of ink consumption with the color printer that does not use the DY ink but uses only six inks, C, LC, M, LM, Y, and K. Since the natural images generally have a large fraction of medium tones, the greater quantities of the lighter inks, that is, the LC, LM, and Y inks, are used to print the natural images. The DY ink has a color that is similar to a mixture of the Y, LC, and LM inks as described later. The similar images can thus be printed by creating dots of the DY ink, instead of creating dots of the Y ink, the LC ink, and the LM ink. The curves of solid line in both FIGS. 9A and 9B represent the observed quantities of ink consumption when the DY ink as well as the other inks are used to print an image. The ratio of replacement of the Y dots, the LC dots, and the LM dots with the DY dots may be varied according to the composition of the DY ink and the usage of the DY dots as discussed later. The rough tendency is, however, understood from the measurement results shown in FIGS. 9A and 9B.

As clearly understood from the measurement results of FIGS. 9A and 9B, when a natural image is printed using the DY dots, the consumption of the DY ink tends to be greater than that of the Y ink (see the curves of solid line in FIGS. 9A and 9B). As mentioned previously, a large number of the Y dots, the LC dots, and the LM dots are created to print a natural image without using the DY dots (see the curves of dotted line in FIGS. 9A and 9B). The use of the DY ink enables a large portion of the Y dots, the LC dots, and the LM dots to be replaceable with the DY dots. In the measurement results of FIGS. 9A and 9B, the consumption of the DY ink is approximately double the consumption of the Y ink.

As in the case without the DY dots, in the case with the DY dots, the consumption of the LC ink tends to be greater than that of the C ink and the consumption of the LM ink tends to be greater than that of the M ink. Formation of the DY dots enables reduction of the number of the LC dots and the LM dots and thereby ensures a certain margin for the restriction of ink duty. The C dots and the M dots are accordingly replaced with the more inconspicuous LC dots and the LM dots. This results in reducing the number of the C dots and the M dots, while not significantly varying the total number of the LC dots and the LM dots. In the case with the DY dots, the consumption of the LC ink is thus greater than the consumption of the C ink, and the consumption of the LM ink is greater than the consumption of the M ink.

As shown in FIG. 8, the ink cartridge 43 of the embodiment has a greater capacity of the DY ink than that of the Y ink, a greater capacity of the LC ink than that of the C ink, and a greater capacity of the LM ink than that of the M ink. Namely the quantities of inks kept in the ink cartridge 43 substantially correspond to the observed quantities of consumption of the respective color inks shown in FIGS. 9A and 9B. This effectively prevents the waste of inks kept in the ink cartridge.

As described previously, in the color printer 20 of the embodiment, the K ink is kept in the ink cartridge 42, whereas the six color inks other than the K ink are kept in the ink cartridge 43. The combination of the color inks kept in the ink cartridge is, however, not restricted to this embodiment, but may be any one of the combinations shown in FIGS. 8B through 8F. In the examples of FIGS. 8B through 8F, the storage element 52 is omitted from the illustration. This does not mean that only the ink cartridge 43 shown in FIG. 8A has the storage element 52 but the other ink cartridges do not have the storage element 52.

Figure 8B:
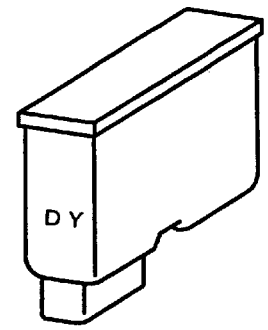

In the case where only the DY ink alone is kept in an ink cartridge as shown in FIG. 8B, there is no necessity of replacing the ink cartridge until the DY ink is completely used up. This arrangement perfectly prevents any waste of the DY ink. Since the consumption of-the DY ink is greater than the consumption of the Y ink, it is preferable to set the capacity of the DY ink greater than the capacity of the Y ink. This prevents the frequent replacement of the ink cartridge of the DY ink. The ink cartridge with the only DY ink alone kept therein is attachable to the color printer having a monochromatic ink cartridge, for example, an ink cartridge for black ink. Using a special printer driver for the DY ink available alone or with the ink cartridge of the DY ink enables creation of the DY dots even in the color printer that has been designed without any consideration of the DY ink. Creation of the DY dots enables an image of high picture quality to be printed, because of the reasons discussed later.

Figure 8C:
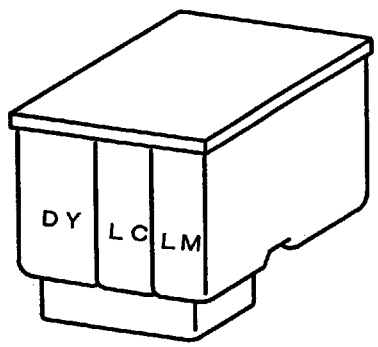

In another example shown in FIG. 8C, the three color inks, DY, LC, and LM inks, are kept in one ink cartridge, whereas the other four color inks C, M, Y, and K may be kept together in another ink cartridge or only the K ink alone may be kept in another ink cartridge separately from still another ink cartridge of the C, M, and Y inks. The arrangement of keeping the three color inks, DY, LC, and LM inks, which are used in large quantities to print natural images as shown in FIGS. 9A and 9B, together in one ink cartridge separately from the other color inks preferably prevents the waste of the C, M, and Y inks when only the DY, LC, and LM inks are used up by printing a large number of natural images. The arrangement of keeping the K ink alone in one ink cartridge separately from the C, M, and Y inks also preferably prevents the waste of the C, M, and Y inks when only the black ink is used up by printing a large number of black and white images, such as documents.

Figure 8D:
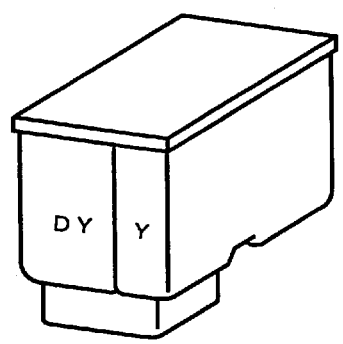
Figure 8E:
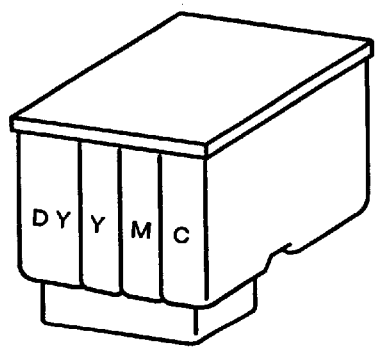
Figure 8F:
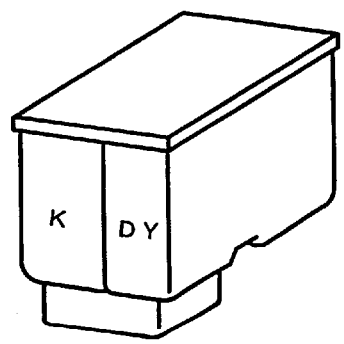

As shown in the examples of FIGS. 8D through 8F, the DY ink may be kept together with one or a plurality of other inks in one ink cartridge. This arrangement desirably saves the total space required for the ink cartridges.

A special printer driver exclusively designed for the DY ink may be attached to any one the ink cartridges including the DY ink as shown in FIGS. 8A through 8F. For example, when there are a plurality of different DY inks, the special printer driver attached to the ink cartridge is used corresponding to the DY ink.

As explicitly shown in FIG. 8A, the storage element 52 for storing data, for example, with regard to the quantities of consumption of the respective color inks is mounted on the side face of the ink cartridge 43. As described previously with FIG. 6, the color printer 20 can read and write a variety of data from and into the storage element 52. The following briefly describes the functions of the storage element 52 mounted on the ink cartridge 43.

FIG. 10 is an enlarged view illustrating the storage element 52 mounted on the side face of the ink cartridge 43. The storage element 52 has a plurality of connection terminals 53. The ink cartridge 43 is attached to the carriage 40 of the color printer 20. The inner face of the carriage 40 that is in direct contact with the ink cartridge 43 has a plurality of connectors (not shown) that are connected with the connection terminals 53 of the storage element 52. When the ink cartridge 43 is attached to the carriage 40 of the color printer 20, the plurality of connection terminals 53 are electrically connected with the plurality of connectors on the carriage 40 to allow the data transmission between the color printer 20 and the storage element 52.

FIG. 11 shows the data structure of the EEPROM incorporated in the storage element 52. The numerals in the left column of FIG. 11 denote the addresses in the storage element 52 seen from the color printer 20, and the right column of FIG. 11 shows the contents of the information registered at the respective addresses. The storage element 52 includes a first storage area 660 and a second storage area 650. The color printer 20 enables both the reading and writing operations of data from and into the first storage area 660, whereas enabling only the reading operation of data from the second storage area 650. Data on the remaining quantities of the respective color inks are stored in the first storage area 660. Other data that are not required updating nor frequently read, for example, the data on the year, month, and date of manufacture of the ink cartridge, are stored in the second storage area 650. The first storage area 660 is allocated to a region of lower addresses than those to the second storage area 650. The allocation of the first storage area 660, which data are frequently read from and written in, to the region of the lower addresses ensures the quick data reading and writing operations by the sequential access. This arrangement enables application of an inexpensive EEPROM for the expendable ink cartridges.

As shown in FIG. 11, the data on the remaining quantities of the C, M, Y, LC, LM, and DY inks are stored in the first storage area 660. The remaining quantities of the respective color inks are registered in a duplicated manner. The duplicate storage functions as the back-up when the data are destroyed, for example, by an accidental power breakdown in the course of writing data. The remaining quantities of inks are stored with regard to all the inks kept in the ink cartridge. In the case where only the DY ink is kept in the ink cartridge, for example, only the remaining quantity of the DY ink is stored in the first storage area 660.

The second storage area 650 stores the data on the time (year and month) of unsealing the ink cartridge, the version data of the ink cartridge, the data on the type of ink, for example, pigments or dyes, the data on the year, month, and date of manufacture of the ink cartridge, the data on the production line, the serial number data of the ink cartridge, and the data showing whether the ink cartridge is new or recycled.

The computer 80 reads the data from the storage element 52 at predetermined timings, for example, at the time of power supply to the color printer 20, and writes the data on the remaining quantities of the respective inks into the storage element 52 at predetermined timings, for example, at the time of completion of the printing operation or at the time of power cut to the color printer 20. This arrangement enables the printer driver 92 to accurately obtain the type of ink currently used and the remaining quantity of each ink. The color printer 20 of the embodiment thus enables appropriate printing operations and effectively prevents ink from being used up in the course of the printing operation.

A-3. Dark Yellow Ink

Figures 12, 13:
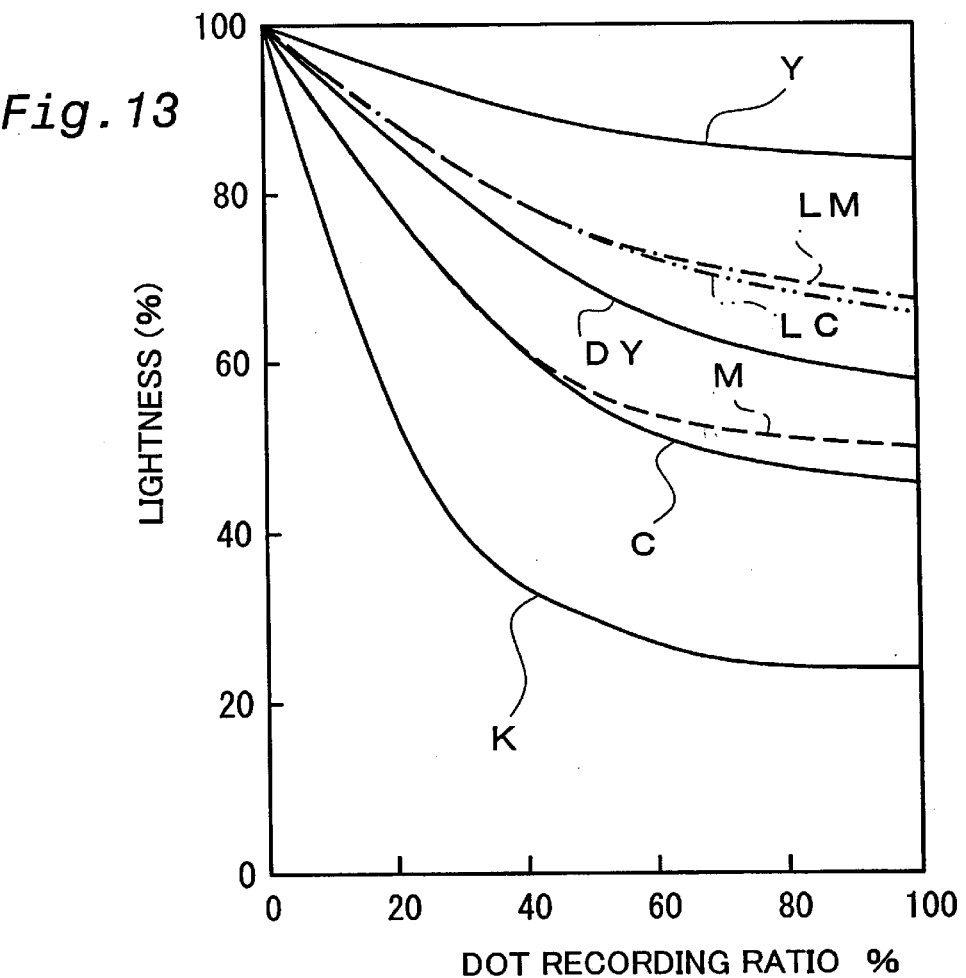
FIG. 12 shows an example of ink compositions used in the color printer of the embodiment.
FIG. 13 is a graph showing the curves of lightness with regard to the respective inks having the compositions shown in FIG. 12.

FIG. 12 shows an example of ink compositions used in the color printer 20 of the embodiment. Each color ink is a mixed solution obtained by adding adequate quantities of each color dye and diethylene glycol for the adjustment of the viscosity to an aqueous solution of Surfinol. The dark yellow ink used in this embodiment is prepared by adding substantially equivalent quantities of Direct Blue 199, which is the dye of the cyan ink, and Acid Red 289, which is the dye of the magenta ink, to Direct Yellow 86, which is the dye of the yellow ink. The composition of the dark yellow ink is, however, not restricted to this example. The dark yellow ink may contain the varying ratio or quantities of Direct Blue 199 and Acid Red 289 or may be prepared by adding a small quantity of Food Black 2, which is the dye of the black ink, to Direct Yellow 86. The dark yellow ink may also have a less content of Direct Yellow 86 by adding greater quantities of Direct Blue 199 and Acid Red 289 or by adding a greater quantity of Food Black 2. The dye of the yellow component used for the dark yellow ink may be identical with or different from the dye used for the yellow ink. The yellow dyes, such as Direct Yellow 132 and Acid Yellow 23, may be used in place of Direct Yellow 86, which is the yellow dye used for the yellow ink.

As clearly understood from the above explanation, the dark yellow ink may have the following definition based on the ability of reproducing colors in the color printer. The dark yellow ink has a lower lightness than that of the yellow ink. Dots of the dark yellow ink can not express achromatic gray color alone, but can represent the achromatic color in combination with dots of the cyan ink and dots of the magenta ink. In this embodiment, the viscosity of each color ink is adjusted to be approximately 3 mPa·s. The same control procedure can thus be applied for the piezoelectric elements PE allocated to any ink.

Figure 14A:
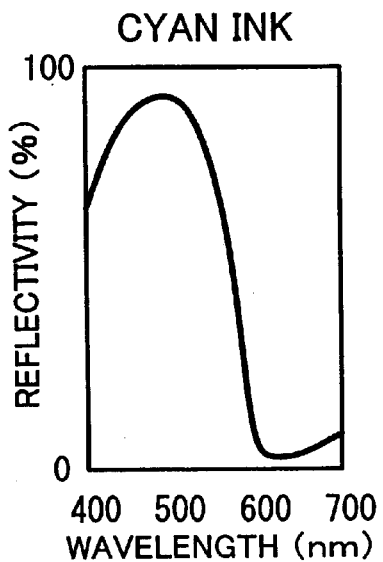
FIGS. 14A through 14E are graphs conceptually showing the spectroscopic characteristics of the respective color inks used in the color printer of the embodiment.
Figure 14B:
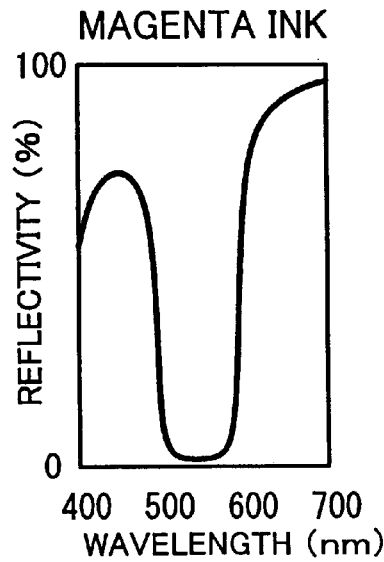
Figure 14C:
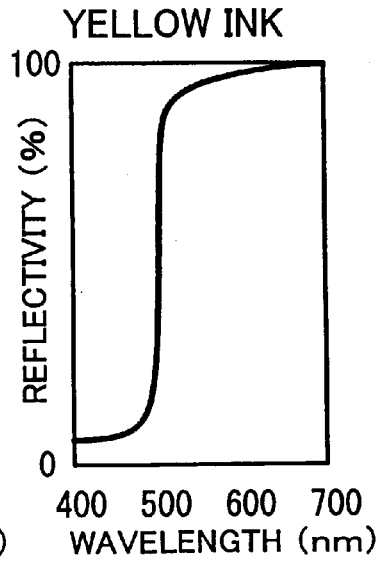

FIGS. 14A through 14E are graphs conceptually showing the variations in reflectivity against the wavelength of light with regard to the color inks used in this embodiment. Referring to FIGS. 14A through 14C, the cyan (C) ink characteristically absorbs light in the wavelength region of 600 nm to 700 nm, the magenta (M) ink characteristically absorbs light in the wavelength region of 500 nm to 600 nm, and the yellow (Y) ink characteristically absorbs light in the wavelength region of 400 nm to 500 nm.

Figure 14D:
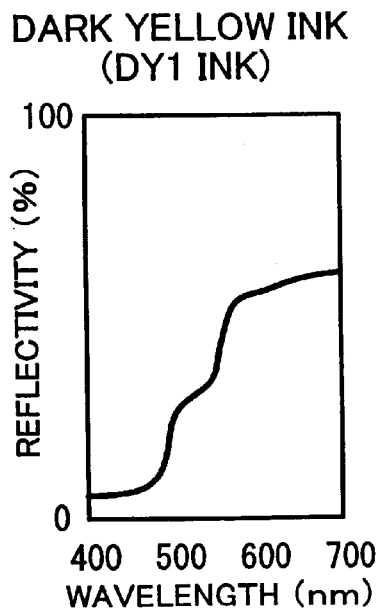
Figure 14E:
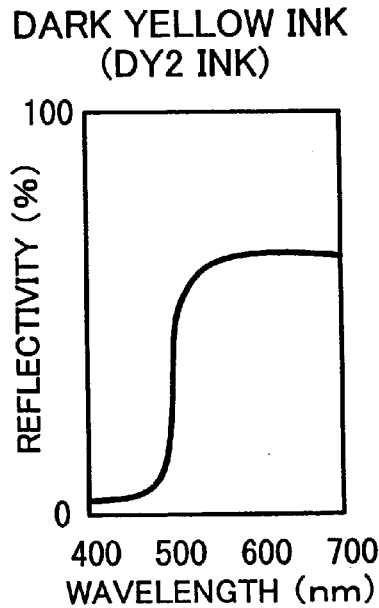

The graphs of FIGS. 14D and 14E conceptually show the variations in reflectivity against the wavelength of light with regard to different dark yellow (DY) inks. DY1 ink shown in FIG. 14D corresponds to the DY ink having the composition shown in FIG. 12, and DY2 ink shown in FIG. 14E corresponds to the DY ink prepared by adding Food Black 2 to Direct Yellow 86. Since the DY1 ink contains small quantities of the dyes of the cyan ink and the magenta ink in addition to the dye of the yellow ink (see FIG. 12), the DY1 ink mainly absorbs the ray of the wavelength region characteristic of the yellow ink and also slightly absorbs the rays of the wavelength regions characteristic of the cyan ink and the magenta ink. Varying the quantities of addition of Direct Blue 199 and Acid Red 289 changes the absorption the rays of the wavelength regions characteristics of the cyan ink and the magenta ink. Since the DY2 ink contains a small quantity of the dye of the black ink in addition to the dye of the yellow ink, the DY2 ink mainly absorbs the ray of the wavelength region characteristics of the yellow ink and also increases absorption over the wavelength region of 500 nm to 700 nm. Varying the quantity of addition of Food Black 2 changes the absorption in the wavelength region of 500 nm to 700 nm. The graphs of FIGS. 14D and 14E exaggerate the difference in characteristics of light absorption between the DY1 ink and the DY2 ink. The actual difference in characteristics of light absorption between the DY1 ink and the DY2 ink is not so clear as that illustrated here.

The comparison between the reflectivity of the DY1 ink or the DY2 ink and the reflectivity of the Y ink shown in FIG. 14C clearly shows that the reflectivity of the DY1 ink or the DY2 ink is lowered in the wavelength region of visible rays. This means that both the DY1 ink and the DY2 ink have lower lightness than that of the Y ink. The change in characteristics of light absorption with a variation in quantities of the dyes added to the dye of the yellow component has certain effects as discussed later.

FIG. 13 is a graph showing the curves of lightness with regard to the respective inks having the compositions shown in FIG. 12. The dot recording ratio plotted as abscissa in the graph of FIG. 13 is an index representing the percent of dots formed per unit area. For example, the dot recording ratio of 100% represents the state in which dots are formed in all the pixels. The dot recording ratio of 50% represents the state in which dots are formed in half the pixels. The dot recording ratio of 0% represents the state in which no dots are formed in any pixels. The dot recording ratio is explained in detail later. The lightness plotted as ordinate in the graph of FIG. 13 represents the brightness of the image relative to the background color of the printing paper. The lightness of 100% represents the background color of the printing paper. The brightness of the image decreases with a decrease in lightness. Any ink has the lightness of 100% at the dot recording ratio of 0%. The lightness decreases with an increase in dot recording ratio, that is, with formation of more dots. Comparison of the brightness between the images at a fixed dot recording ratio shows the difference in lightness between the respective color inks.

The results of the measurement shown in FIG. 13 show that the DY ink having the composition shown in FIG. 12 (corresponding to the DY1 ink shown in FIG. 14D) is darker than the Y ink, the LC ink, and the LM ink but brighter than the C ink, the M ink and the K ink.

Figure 15:
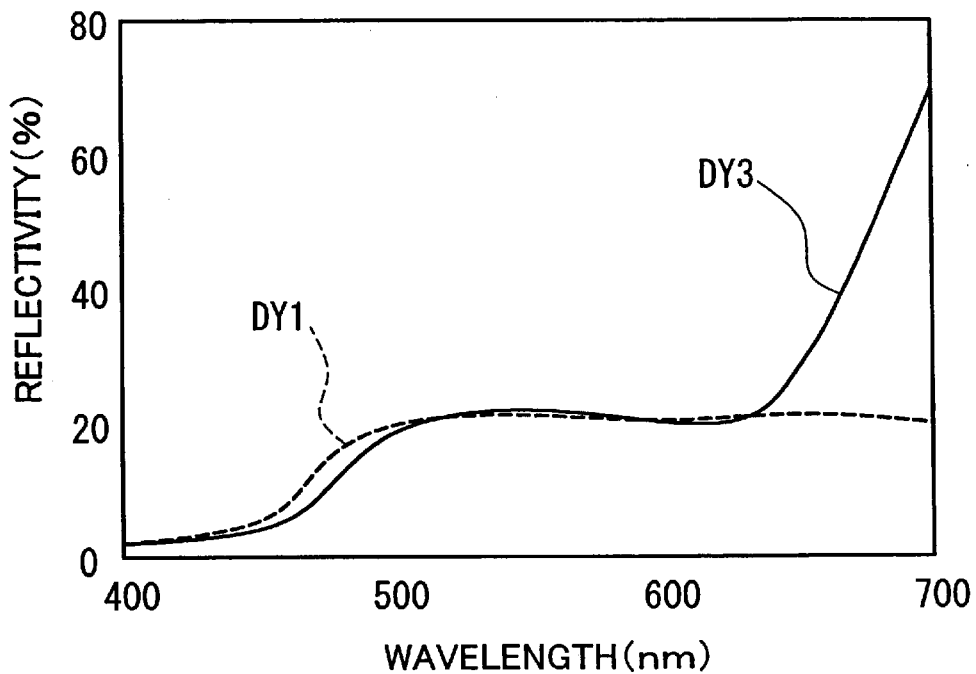
FIG. 15 is a graph showing the spectroscopic characteristics of dark yellow ink that is designed by utilizing the degree of freedom in spectroscopic settings in a wavelength region of longer than 650 nm.

The DY ink may have any composition as shown in the examples of FIGS. 14D and 14E. FIG. 15 is a graph showing the observed curve of reflectivity against the wavelength of light with regard to DY ink prepared according to a different principle from those of the DY1 ink and the DY2 ink (hereinafter referred to as the DY3 ink). For the purpose of reference, the curve of reflectivity with regard to the DY1 ink is also plotted by the dotted line. As shown in the graph of FIG. 15, like the reflectivity of DY1 ink, the reflectivity of the DY3 ink has a characteristic area of small reflectivity (that is, the area characteristically absorbing light) in the wavelength region of 400 nm to 500 nm. This is characteristic of the yellow ink. The reflectivity of the DY3 ink rises in a wavelength region of longer than about 650 nm. It is known that the sensitivity of human eye to the color is abruptly lowered in the wavelength region of longer than about 650 nm. Although the DY1 ink and the DY3 ink have significantly different behaviors on reflectivity in the wavelength region of longer than 650 nm as shown in FIG. 15, they are recognized as substantially the same color by the vision of the human eye. This means that there is a significant degree of freedom in setting of the light reflectivity in the wavelength region of longer than 650 nm. It is not easy to specify the composition of the respective dyes or pigments in the ink for the ideal spectroscopic characteristics. The DY ink having the ideal hue is, however, easily obtained by utilizing the degree of freedom in reflectivity in the wavelength region of longer than 650 nm. As is well known, the sensitivity of human eye to the color is lowered in the wavelength region of shorter than 400 nm, as well as in the wavelength region of longer than 650 nm. The ink can thus be designed by utilizing the degree of freedom in reflectivity in the short wavelength region.

Figure 16:
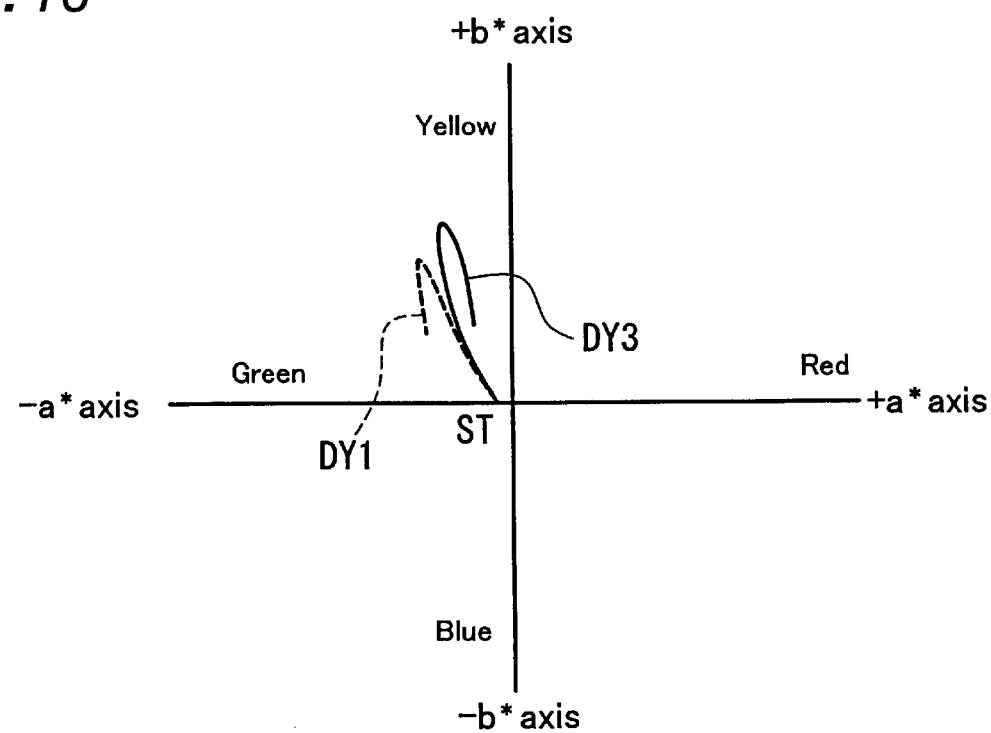
FIG. 16 shows expression of colors with dots of dark yellow ink on a sheet of printing paper.

The following describes, with FIG. 16, the phenomenon that the properties of the DY ink can be regulated to some extent by utilizing the degree of freedom in reflectivity in the wavelength region of longer than 650 nm. FIG. 16 shows the observed colors expressed on the printing paper under the condition of a gradual increase in recording density of dots (dot recording ratio) formed with the DY ink on the printing paper. The abscissa represents the a* axis in the L*a*b* colorimetric system, and the ordinate represents the b* axis. The area of positive values (+) along the a* axis substantially corresponds to the red color, whereas the area of negative values (−) along the a* axis substantially corresponds to the green color. The area of positive values (+) along the b* axis substantially corresponds to the yellow color, whereas the area of negative values (−) along the b* axis substantially corresponds to the blue color. The position shown by ST in the graph of FIG. 16 shows the coordinates representing the background color of the printing paper.

In the case where dots are formed with the DY1 ink shown in FIG. 15 on the printing paper, the color expressed on the printing paper follows a locus shown by the dotted line with an increase in dot recording ratio. Namely the hue becomes slightly greenish with an increase in dot recording ratio. In the case where dots are formed with the DY2 ink, on the other hand, the hue does not become greenish with an increase in dot recording ratio. The minute characteristics of the ink as shown in FIG. 16 can be regulated by utilizing the wavelength region of longer than 650 nm, where the sensitive of human eye to the color is lowered to give a sufficient degree of freedom in design of the ink. As described later in detail, the use of the DY ink having the hue becoming greenish with an increase in dot recording ratio significantly improves an image having the hue of green and low lightness. In a similar manner, the use of the DY ink having the hue becoming reddish with an increase in dot recording ratio significantly improves an image having the hue of red and low lightness. The ink having the hue in a range of 10R to 10GY on a Munsell hue circle is applicable for the DY ink. In the example of the DY3 ink shown in FIG. 15, the reflectivity of light is increased in the wavelength region of longer than 650 nm by utilizing the degree of freedom in design of the ink in this wavelength region. The ink may alternatively be designed to lower the reflectivity of light in this wavelength region.

Figure 17:
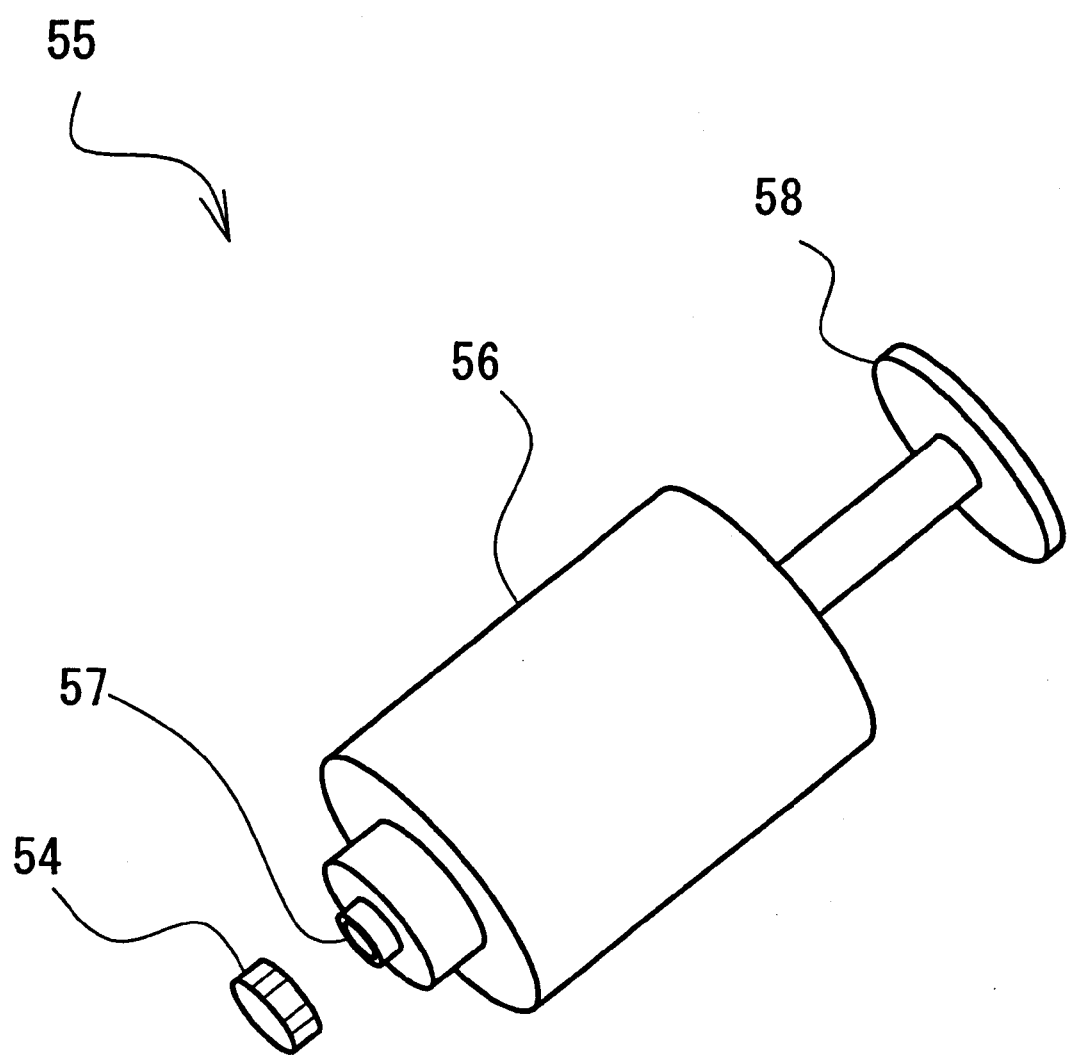
FIG. 17 schematically illustrates the appearance of an ink supplier used to feed a supply of ink to the ink cartridge.

FIG. 17 shows the structure of an ink supplier 55 for feeding a supply of ink to an ink cartridge. The ink supplier 55 includes a sealed vessel 56, in which ink is sealed, a filler inlet 57, through which a supply of ink is fed, and a piston 58 to press the sealed ink out. The dark ink discussed above is sealed in the sealed vessel 56 to be not exposed to the atmosphere. This protects the ink in the ink supplier 55 from a change in properties. When a supply of ink is fed to the ink cartridge, a cap 54 mounted on an end of the filler inlet 57 of the ink supplier 55 is removed, and the filler inlet 57 is stuck to an ink supply inlet (not shown) formed in the bottom face of the ink cartridge. The piston 58 is then pressed down to slowly press the ink out of the sealed vessel 56, so as to feed a supply of ink to the ink cartridge.

B. Image Processing

Figure 18:
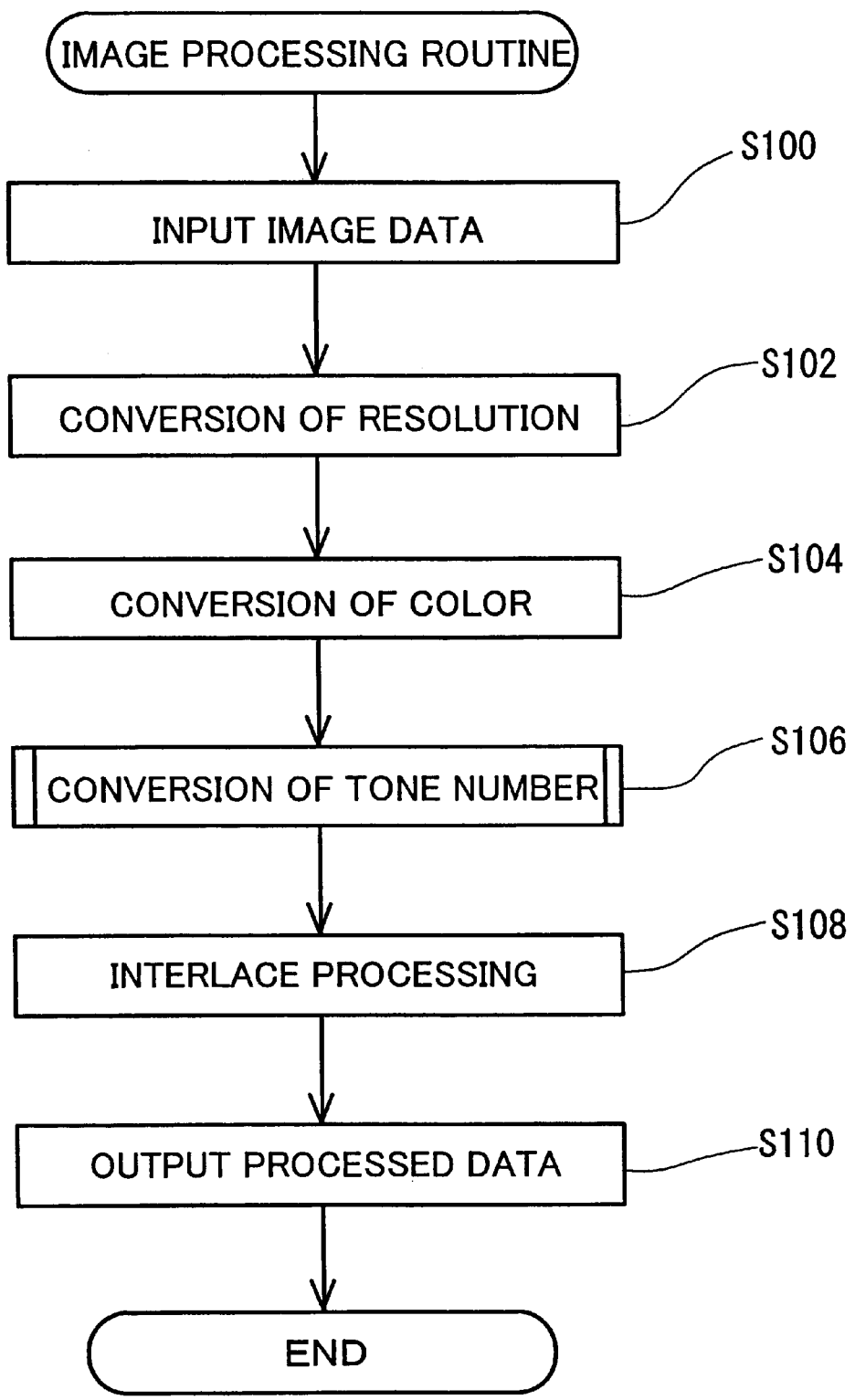
FIG. 18 is a flowchart showing an image processing routine executed in the embodiment.

The color printer 20 forms dots of the respective color inks including the DY ink discussed above, so as to print a color image. In order to enable the color printer 20 to create dots of the respective color inks, the computer 80 should carry out predetermined image processing with regard to image data ORG representing a color original image and output the processed image data FNL to the color printer 20. The image processing is executed by the printer driver 92 of the computer 80. FIG. 18 is a flowchart showing an image processing routine executed by the printer driver 92.

When the program enters the image processing routine of FIG. 18, the CPU 81 in the computer 80 first receives image data to be processed at step S100. As described previously with FIG. 2, the image data are generated by the application program 91 and transmitted to the printer driver 92. In the application program 91, the color image data are expressed as a combination of three color images, red (R), green (G), and blue (B). The image of each color is expressed as a set of pixels individually having tone values. In the case of 8-bit image data, each pixel may take one of 256 tone values in a range of 0 to 255.

B-1. Process of Converting Resolution

When receiving the image data output from the application program 91, the CPU 81 carries out a process of converting resolution at step S102. As mentioned above, the input image is expressed as a set of pixels. The length on a printing medium corresponding to one pixel depends upon the size of an image to be processed on the printing medium. The number of dots printable per unit length by the printer (hereinafter referred to as the printer resolution) has been set for each model of the printer. For convenience of the image processing, it is required to make the resolution of the image coincident with the printer resolution. In the case where the resolution of the image is lower than the printer resolution, linear interpolation is performed to generate a new piece of image data between two adjacent pieces of existing data. In the case where the resolution of the image is higher than the printer resolution, on the contrary, the resolution is lowered by skipping some pieces of image data at a preset rate. The process of step S102 makes the resolution of the image coincident with the printer resolution in this manner.

B-2. Color Conversion Process

After completion of the resolution conversion process, the CPU 81 carries out a color conversion process at step S104. As described previously, the application program 91 expresses a color image as tone image data of three colors, red (R), green (G), and blue (B). The color printer 20, on the other hand, expresses a color image, in principle, by subtractive mixture of three color stimuli, cyan (C), magenta (M), and yellow (Y). In order to print a color image, it is accordingly required to convert the expression of a color image with the three colors R, G, and B to the expression of a color image with the three colors C, M, and Y. The process of step S104 carries out such color conversion. The actual process of this embodiment carries out the color conversion not to the three basic colors C, M, and Y but to the total of seven colors including K, LC, LM, DY. For the clarity of explanation, however, it is assumed that the process carries out the color conversion to the three basic colors C, M, and Y. The color conversion process changes the tone image data of R, G, and B respectively having the 256 tone values to tone image data of C, M, and Y respectively having the 256 tone values.

Figure 19:
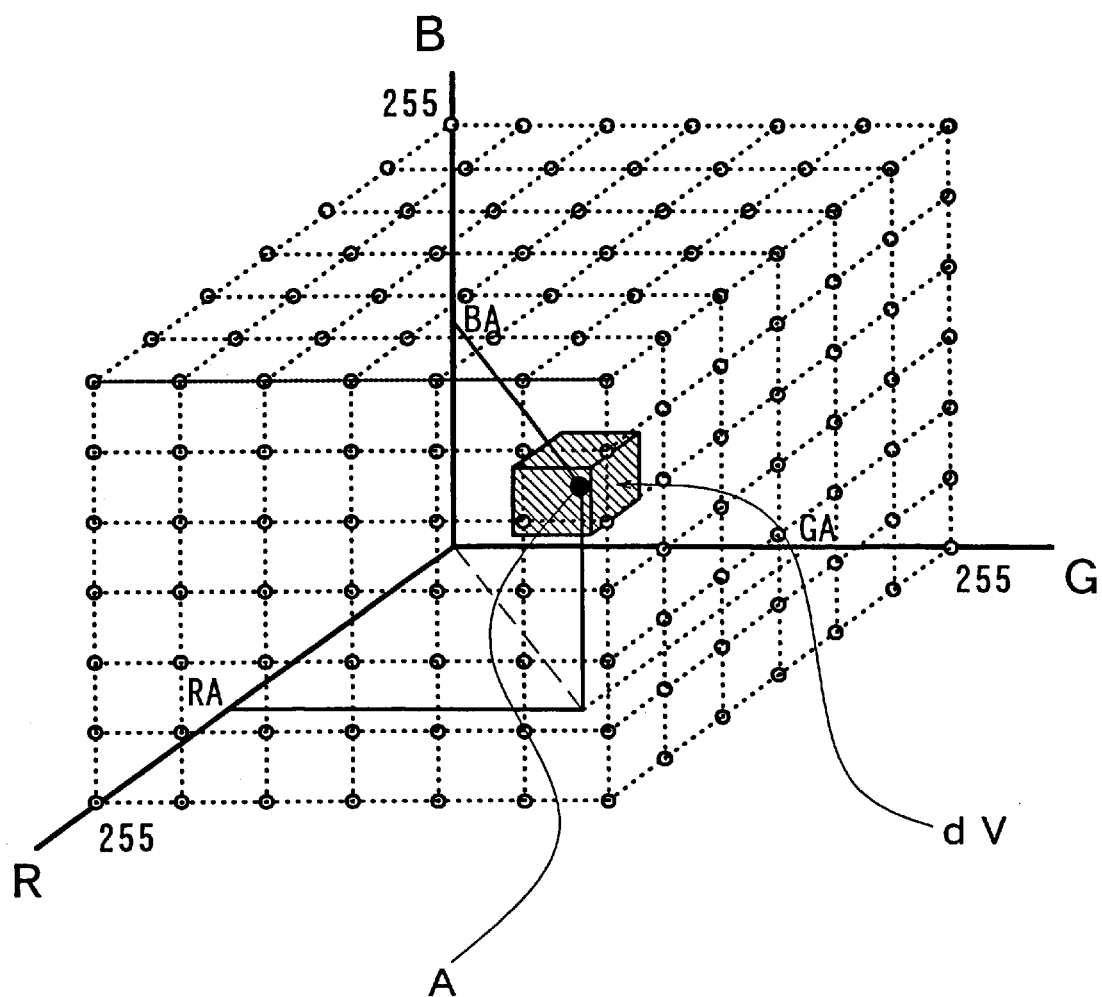
FIG. 19 shows a conversion table used in the embodiment.

In the actual procedure, the CPU 81 refers to a conversion table as shown in FIG. 19, so as to convert the R, G, and B tone values into the C, M, and Y tone values. As shown in FIG. 19, the conversion table is a three-dimensional mathematical table (color solid) having the tone values of R, G, and B as axes. In this embodiment, each axis takes the values in the range of 0 to 255. A space defined by the mutually perpendicular R, G, and B axis is referred to as the color space. The conversion table divides the color solid into a number of small cubes. Each cube has vertexes, at each of which a corresponding set of the C, M, and Y tone values is registered.

The color conversion is carried out in the following manner by referring to the conversion table. For example, it is assumed that a color defined by RA, GA, and BA as the tone values of R, G, and B is to be expressed by the tone values of C, M, and Y. The process finds a small cube (dV) including a point A having the coordinates (RA,GA,BA) in the color space. The process then carries out interpolation with sets of the C, M, and Y tone values registered at the respective vertexes of the cube (dV), so as to calculate the C, M, and Y tone values of the point A.

In this manner, the conversion table allocates a set of the C, M, and Y tone values to each coordinate included in the color solid of R, G, and B tone values. When tone values of the K (black), LC (light cyan), LM (light magenta), and DY (dark yellow) are registered, in addition to the tone values of the C, M, and Y, in the conversion table, a set of the C, M, Y, K, LC, LM, and DY tone values is allocated to each coordinate included in the color solid of R, G, and B tone values. In accordance with another possible application, intermediate sets of C, M, and Y tone values, sets of C, M, Y, and K values, or sets of C, M, Y, K, LC, and LM tone values may be stored in the conversion table. The process calculates the final tone values of C, M, Y, K, LC, LM, and DY from the intermediate values stored in the conversion table.

Figure 20A:
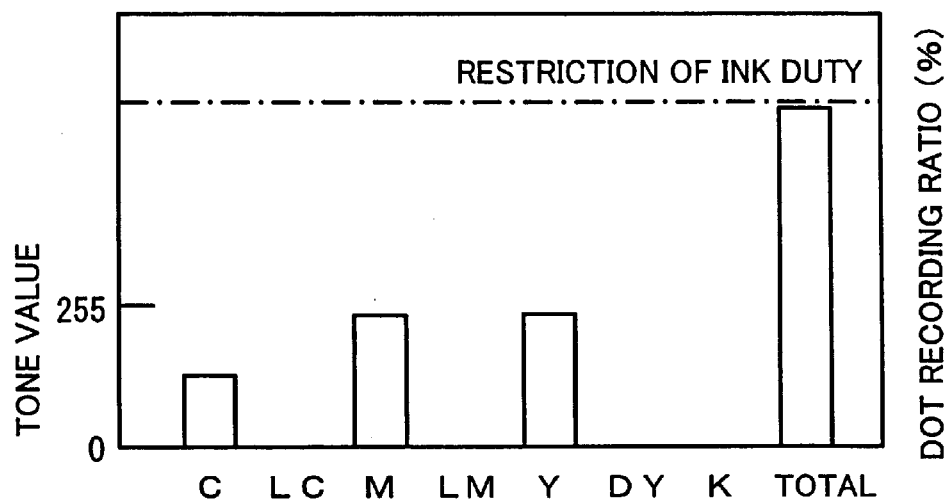
FIGS. 20A and 20B conceptually show a method of determining the rate of formation of dark ink dots in the embodiment.
Figure 20B:
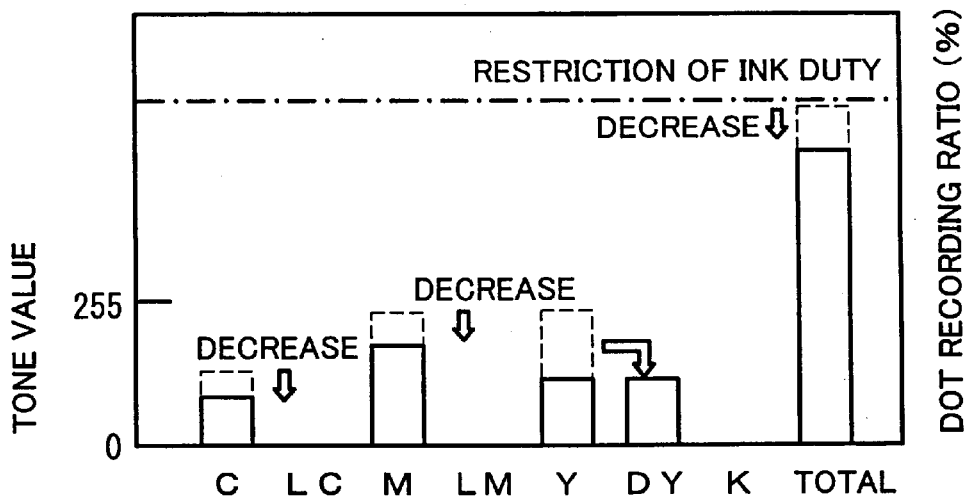

FIGS. 20A and 20B conceptually show a method of calculating tone values of seven colors C, M, Y, K, LC, LM, and DY from the tone values of six colors C, M, Y, K, LC, and LM in a shadow area (area having low lightness). FIG. 20A shows an example in the shadow area of dark red. The tone values of LC and LM are extremely small, while the tone values of C, M, and Y are large in the shadow area as shown in FIG. 20A. The tone value of each color corresponds to the density of dots formed with the color ink on the printing medium.

FIG. 20B shows a case in which half the tone value of Y is replaced with the tone value of DY. As explained previously with FIG. 2, the DY ink has certain contents of the dyes of the cyan ink and the magenta ink. The tone values of C and M are accordingly reduced by the products of the DY tone value and the rates of content of the respective dyes. As shown in FIG. 20B, the reduction results in producing a margin for the restriction of ink duty.

In order to increase the darkness of the dark red from the state shown in FIG. 20A, it is required to decrease the tone values of C, M, and Y and increase the tone value of K (that is, create K dots). As described previously, however, creation of K dots results in the poor granularity unless the K dots are formed in very dark red. When there is a certain margin for the restriction of ink duty as shown in FIG. 20B, the dark red can be further darkened by increasing the tone value of LC or C. This prevents the poor granularity due to creation of K dots. The margin for the restriction of ink duty is enhanced by increasing the rate of replacement of the Y tone value with the DY tone value or by increasing the contents of the dyes of the cyan ink and the magenta ink included in the DY ink, as described later.

In most cases, the color correction process is carried out simultaneously with the color conversion process. The color correction process corrects the tone values of R, G, and B, in order to eliminate the effects of different sensitivity characteristics of image scanners that read color images. Alternatively the color correction process corrects the tone values of C, M, and Y, in order to eliminate the difference in color reproduction properties between the printing apparatuses. The color correction enables accurate colors to be reproduced irrespective of the difference between the image scanners or the printing apparatuses.

B-3. Process of Converting Number of Tones

After the completion of the color conversion process, the CPU 81 carries out a process of converting the number of tones at step S106. The image data after the color conversion represents an image of 256 tones with regard to the seven colors C, M, Y, K, LC, LM, and DY. The printer, on the other hand, creates dots on the printing paper to reproduce an image, and generally has only two levels, that is, the dot-on state and the dot-off state. There are variable dot printers and other multi-level printers that can print multi-level dots including intermediate states, for example, by varying the size of dots to be created. These printers, however, still have a relatively small number of expressible tones. It is thus required to convert the image having 256 tones into an image having an extremely small number of tones expressible by the printer. This is the process of converting the number of tones. FIGS. 21A and 21B show a process of binarization to convert the number of tones. FIG. 21A shows image data after the color conversion but before the binarization, and FIG. 21B shows image data after the binarization. The image data before the binarization have any one of 256 tones in each pixel. The image data after the binarization have either one of two values in each pixel, that is, the dot-on level (the value '1') and the dot-off level (the value '0'). In order to show the distribution of dots clearly, in the image data of FIG. 21B, pixels having the value '1' are hatched and pixels having the value '0' are open.

The structure of this embodiment determines the dot on-off conditions with regard to the seven colors C, M, Y, K, LC, LM, and DY. There are a variety of methods applicable for the determination, all of which naturally have some advantages and disadvantages. The color printer 20 of the embodiment causes the user to select an appropriate method for the determination. There are typically two methods, the error diffusion method and the systematic dither method. The error diffusion method ensures the high picture quality, whereas the systematic dither method enables the high-speed processing. The following briefly describes the outlines of the error diffusion method and the systematic dither method.

B-4. Binarization by Error Diffusion Method

Figure 22:
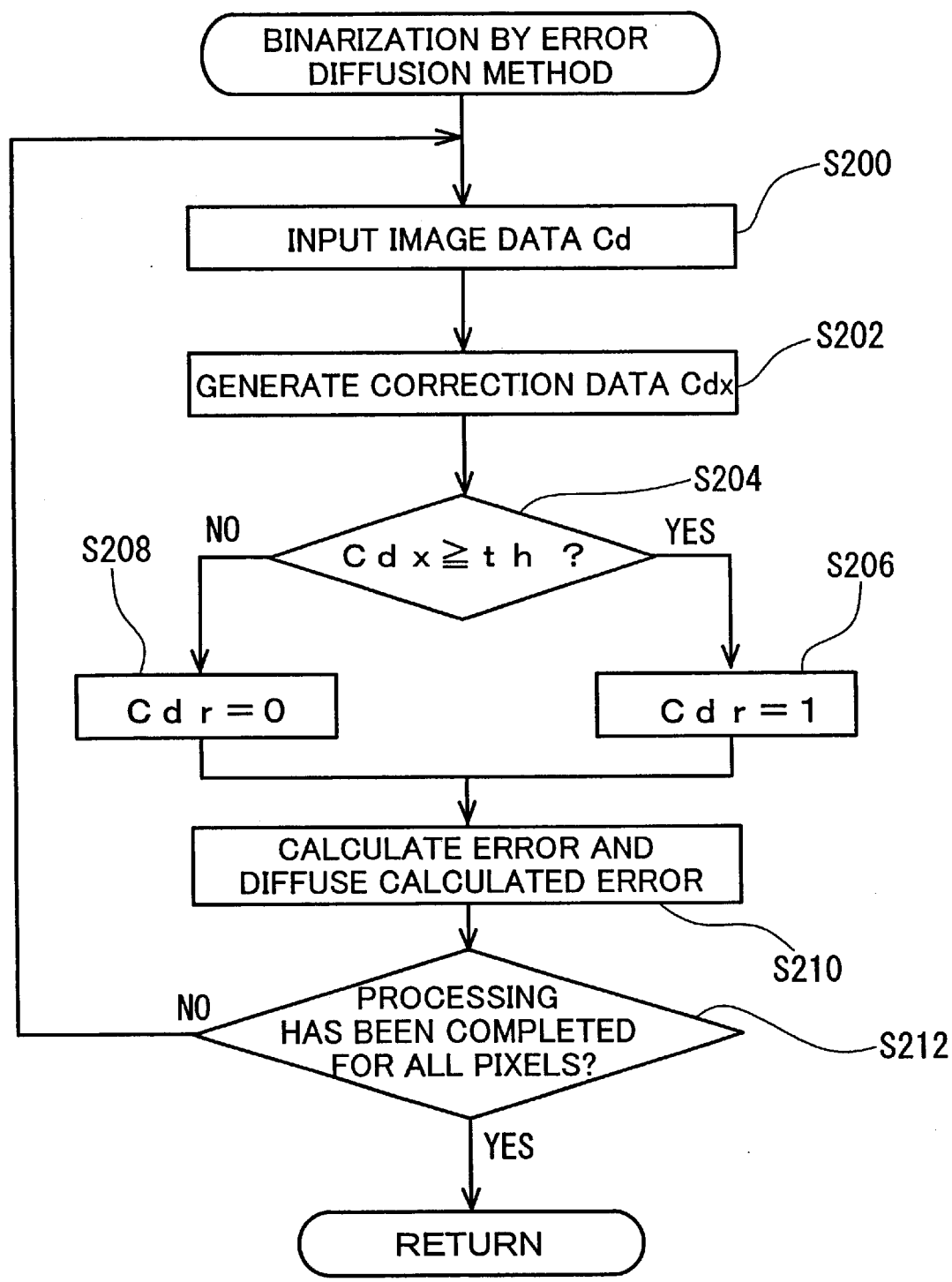
FIG. 22 is a flowchart showing a binarization process by the error diffusion method executed in the embodiment.
Figure 23:
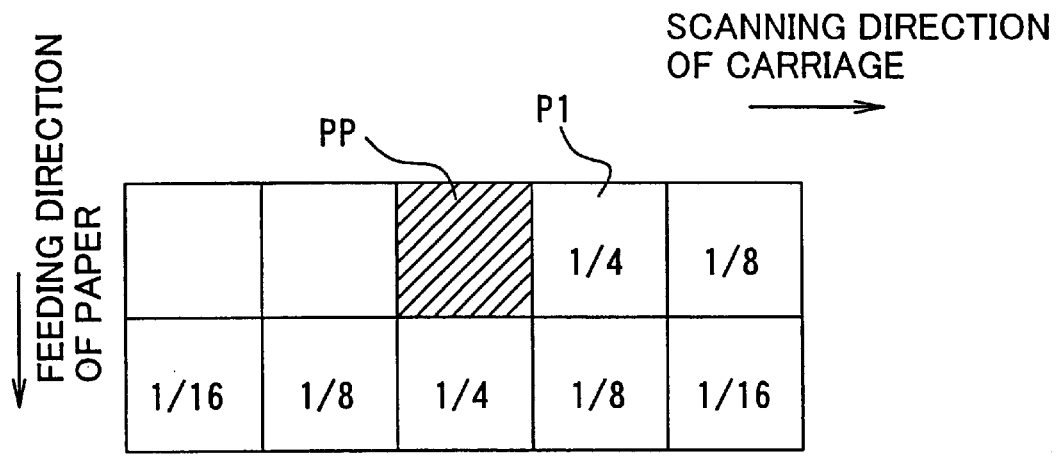
FIG. 23 shows an example of weights added in the process of diffusing the error by the error diffusion method.

FIG. 22 is a flowchart showing a binarization process by the error diffusion method. The technique of the embodiment carries out the binarization process individually with regard to the respective colors C, M, Y, K, LC, LM, and DY after the color conversion. The following description does not specify the color, for the clarity of explanation. When the program enters the binarization process, the CPU 81 reads image data Cd at step S200. The image data Cd have 256 tones with regard to each color after the color conversion. The CPU 81 generates correction data Cdx from the input image data Cd at step S202. The error diffusion method distributes an error of binarization generated with regard to each processed pixel to a plurality of unprocessed pixels in the vicinity of the processed pixel with certain weights. The process of step S202 adds a sum of error portions distributed from the surrounding processed pixels to a pixel of interest, which is currently being processed, to calculate the correction data Cdx. FIG. 23 shows the weights added to the surrounding pixels, to which an error of a pixel of interest PP is distributed. The error of binarization generated in the pixel of interest PP is distributed to several adjoining pixels in the scanning direction of the carriage, as well as to several adjoining pixels in the feeding direction of the printing paper P with predetermined weights, ¼, ⅛, and ¹⁄₁₆. The error diffusion process is described later more in detail. The correction data Cdx thus generated is compared with a predetermined threshold value th set for each color at step S204. In the case where the correction data Cdx is not smaller than the threshold value th, a value '1' representing creation of a dot is set to a resulting value Cdr showing the result of the binarization at step S206. In the case where the correction data Cdx is smaller than the threshold value th, on the other hand, a value '0' representing creation of no dot is set to the resulting value Cdr at step S208. The predetermined threshold value th is a reference value used to determine whether or not a dot is to be created in each pixel.

The CPU 81 then calculates an error of binarization in the pixel of interest and diffuses the calculated error to the peripheral pixels in the vicinity of the pixel of interest at step S210. The error is equal to a difference by subtracting the result of the tone number conversion from the tone value of the original image data. For example, it is assumed that there is a pixel having the tone value '64' in the original image data. When a dot is created in the pixel, the converted result corresponding to a tone value '255' is expressed in the pixel. In this case, there is an error of 64−256=−191. When no dot is created in the pixel, on the contrary, there is an error of 64−0=64.

The error thus calculated is diffused into the peripheral pixels with the certain weights shown in FIG. 23. For example, when the target of pixel PP has the calculated error corresponding to the tone value '64', an error portion corresponding to a tone value '16', which is ¼ of the error, is diffused to an adjoining pixel P1. The total of such diffused errors is reflected on the image data Cd, so as to generate the correction data Cdx at step S202 described above. The series of the processing is repeated with regard to all the pixels at step S212. The image data representing the dot on-off conditions as shown in FIG. 21B are eventually obtained.

The method of performing the color conversion to generate the tone image data of seven colors C, M, Y, K, LC, LM, and DY and carrying out the binarization individually for the respective colors simplifies the contents of the processing with regard to each color and thus enables the quick processing. The independent and simplified processing with regard to each color enables parallel data conversion using an exclusive image processing apparatus. This arrangement ensures the quick binarization even by the error diffusion method.

In the case of the binarization by the error diffusion method, another possible procedure applicable to the color conversion process (step S104 in the flowchart of FIG. 18) generates image data of the four basic colors C, M, Y, and K, and determines the dot on-off conditions of the C and LC dots based on the tone data of C, the dot on-off conditions of the M and LM dots based on the tone data of M, and the dot on-off conditions of Y and DY dots based on the tone data of Y. This method simplifies and speeds up the color conversion process.

B-5. Binarization by Systematic Dither Method

Figure 24:
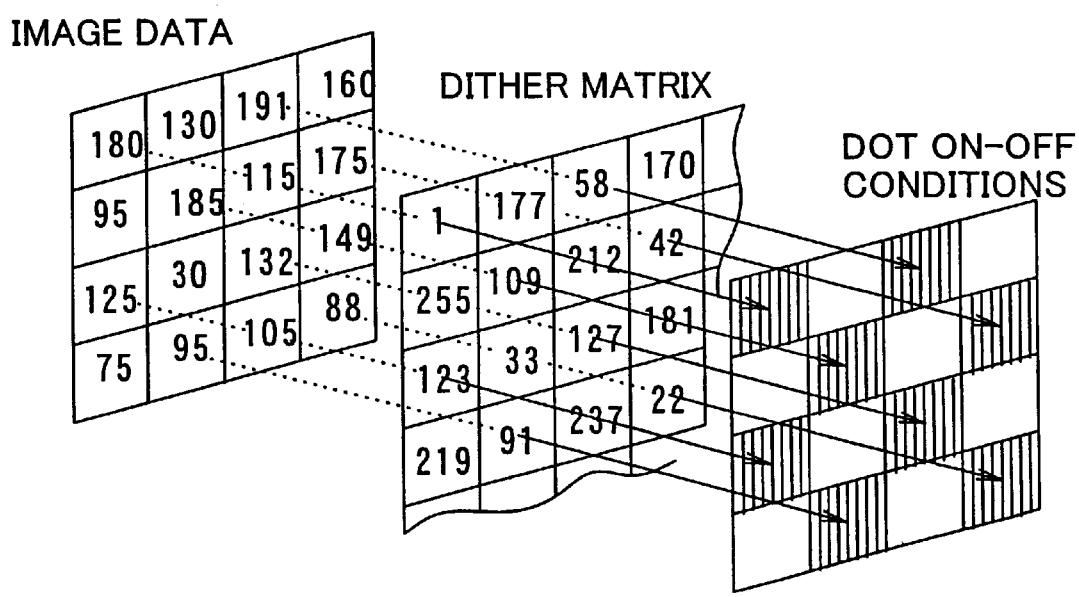
FIG. 24 shows the systematic dither method.

The principle of binarization by the systematic dither method is described with FIG. 24. In this example, it is assumed that the image data Cd may take the value in the range of 0 to 255, and a dither matrix has values in the range of 0 to 254. For simplicity of explanation, the example of FIG. 24 shows only part of the image data corresponding to 4×4 pixels. As shown in FIG. 24, the tone values of the image data Cd in the respective pixels are compared with the corresponding threshold values included in the dither matrix. In the case where the value of the image data Cd is greater than the corresponding threshold value in the dither matrix, the dot is to be created. In the case where the value of the image data Cd is not greater than the corresponding threshold value, on the other hand, the dot is not to be created. The pixels hatched in FIG. 24 represent pixels in which the dot is to be created.

As described above, the binarization by the systematic dither method compares the tone values of the image data in the respective pixels with the corresponding threshold values included in the dither matrix, and determines the dot on-off conditions in all the pixels with regard to the seven colors C, M, Y, K, LC, LM, and DY based on the results of the comparison.

Like in the case of the binarization by the error diffusion method described previously, in the case of the binarization by the systematic dither method, another possible procedure applicable to the color conversion process (step S104 in the flowchart of FIG. 18) generates image data of the four basic colors C, M, Y, and K, and determines the dot on-off conditions of the C and LC dots based on the tone data of C, the dot on-off conditions of the M and LM dots based on the tone data of M, and the dot on-off conditions of Y and DY dots based on the tone data of Y. The color conversion process of this procedure requires the image data generated only with regard to the four colors. This arrangement simplifies the color conversion process. This arrangement also prevents dots of the same color system, for example, a C dot and an LC dot, from being formed in an overlapping manner in one pixel, thereby improving the picture quality.

B-6. Interlace Process

Referring back to the flowchart of FIG. 18, after the completion of the process of converting the number of tones, the CPU 81 starts an interlace process at step S108. The interlace process reorders the image data, which have been converted to the dot on-off conditions by the process of converting the number of tones, in a sequent to be transferred to the color printer 20. As discussed above, the color printer 20 drives the print head 41 to form rows of dots (raster lines) on the printing paper P while repeating the main scan and the sub-scan of the carriage 40. As described previously with FIG. 4, each of the ink ejection heads 44 through 50 has the plurality of nozzles Nz, so that a plurality of raster lines are formed by each pass of the main scan. Each pair of adjoining raster lines formed by the same pass are apart from each other by the nozzle pitch k. Raster lines aligned at the intervals of each pixel are formed according to the following control procedure. The control procedure first forms a plurality of raster lines at the intervals of the nozzle pitch k, slightly shifts the position of each ink ejection head, and forms new raster lines between the existing raster lines. In order to improve the picture quality of the resulting printed image, the control procedure may cause each raster line to be formed by plural passes of the main scan. In order to shorten the printing time, the control procedure may cause dots to be formed by both forward passes and backward passes of the main scan.

After completion of the interlace process, the image data are output as the printable image data FNL to the color printer 20 at step S110.

C. Results of Simulations

In order to confirm the effects of the DY ink on the improvement in picture quality, the simulative computation discussed below was carried out. The following conditions were set for the simulative computation:

Condition 1: The color 'red' is expressed by forming both M dots and Y dots at a dot recording ratio of 100%;

Condition 2: The color 'black' is expressed by forming K dots at a dot recording ratio of 100%;

Condition 3: K dots are equivalently replaceable with a combination of C Dots, M dots, and Y dots at the same density as that of the K dots;

Condition 4: LC dots are equivalently replaceable with C dots at a ¼ dot recording ratio;

Condition 5: LM dots are equivalently replaceable with M dots at a ¼ dot recording ratio; and Condition 6: DY dots are equivalently replaceable with a combination of LC dots, LM dots, and Y dots at the same density as that of the DY dots.

The actual printing operation is performed under more complicated conditions. For example, the rate of replacement of each ink (that is, the rate of each color ink that does not change the output color by replacement) varies in a very complicated manner according to the actual printing conditions, and rarely gives a fixed value as shown by the above conditions. The results of the simulations discussed below do not strictly represent the actual printing results. The qualitative effects of the DY ink on the improvement in picture quality by the simulative computation are, however, sufficiently applicable to the actual printing results.

C-1. Gradation Pattern from Red to Black

Figure 25A:
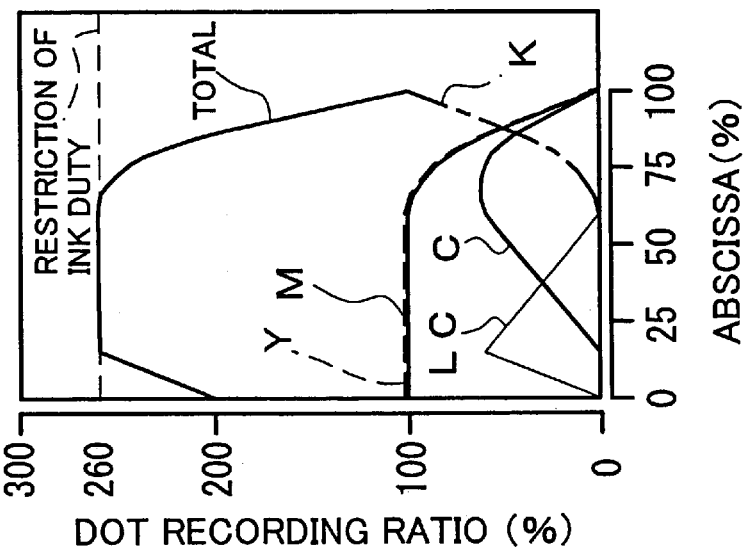
FIGS. 25A, 25B, and 25C show results of simulative computation of the dot recording ratio with regard to each color ink in the case of printing a gradation pattern from red to black with the color printer of the embodiment.
Figure 25B:
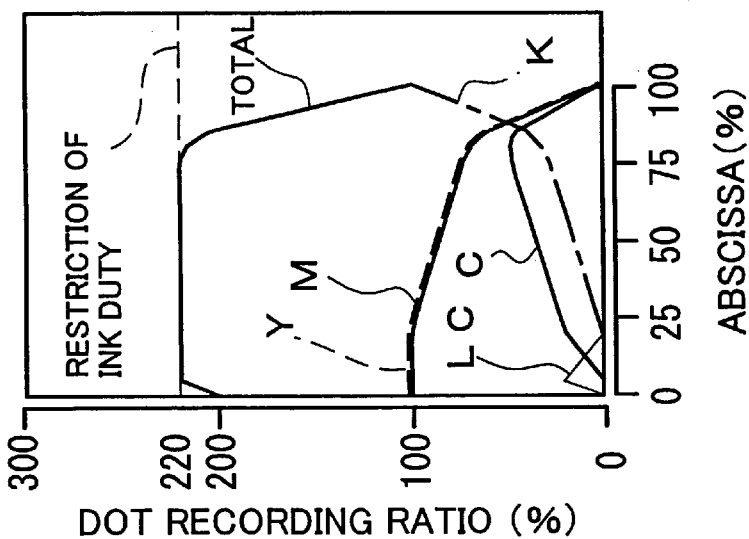
Figure 25C:
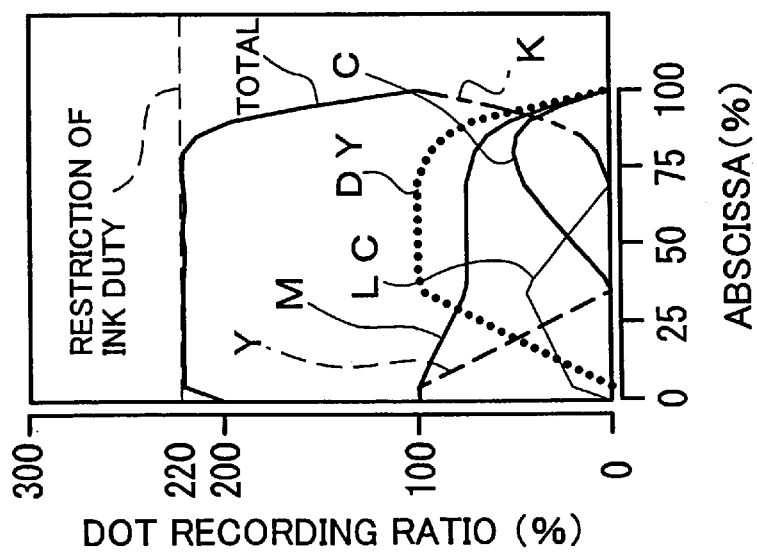

FIGS. 25A, 25B, and 25C show results of simulative computation of the dot recording ratio with regard to each color ink in the case of printing a gradation pattern gradually becoming dark from red to black with the color printer 20 of the embodiment. According to the above conditions, the gradation pattern from red to black is a pattern having the linearly increasing dot recording ratio of C dots from 0% to 100% while keeping a dot recording ratio of 100% with regard to both the M dots and the Y dots.

On the abscissa of each graph, the value of 0% represents the pure color 'red' and the value of 100% represents the pure color 'black'. The color 'red' expressed on the printing paper is gradually darkened with an increase in value on the abscissa. FIG. 25A shows the results of the simulation with the dots of the DY ink in the case of using a sheet of printing paper having a restriction of ink duty equal to 220%.

As shown in FIG. 25A, at the value of 0% on the abscissa (the pure color 'red'), only the M dots and the Y dots are formed at the dot recording ratio of 100% on the printing paper. The lightness of the color is lowered (that is, darkened) with an increase in dot recording ratio of the LC dots while keeping the dot recording ratios of both the M dots and the Y dots at 100%. When the dot recording ratio of the LC dots reaches 20% (approximately 5% on the abscissa), the total recording ratio of the Y, M, and LC dots becomes equal to 220%. The restriction of ink duty set for the printing paper does not allow creation of dots at the greater density. Formation of the DY dots is thus commenced at the value of about 5% on the abscissa, while the dot recording ratio of the Y dots is gradually decreased. The DY dots formed in the hue of red are not so conspicuous, because of the following reason. According to the above condition 6, formation of the DY dots is equivalent to formation of the Y dots, the LM dots, and the LC dots at the same quantity as that of the DY dots. The Y dots or the LM dots formed in an image where both the Y dots and M dots have been formed at the dot recording ratio of 100% are inconspicuous against the background. The conspicuousness of the DY dots formed in the hue of red is as low as that of the LC dots, and the DY dots are thus significantly inconspicuous.

It can be assumed that the DY ink includes the LC ink and the LM ink in addition to the Y ink (condition 6 given above). Formation of the DY dots accordingly decreases the dot recording ratios of both the LC dots and the M dots. The decrease in dot recording ratios of the LC dots and the M dots gives a certain margin for the restriction of ink duty, and thus allows a further increase in dot recording ratio of the LC dots. After the sum of the dot recording ratios of the M, Y, and LC dots reaches the restriction of ink duty, the replacement of the Y dots with the DY dots enables the lightness of the color 'red' expressed on the printing paper to be lowered (that is, the value on the abscissa to be increased). In this stage, no use of the conspicuous C dots desirably prevents the granularity from being worsened.

After the perfect replacement of all the Y dots with the DY dots, no further increase in formation of the DY dots is allowed. The value on the abscissa is accordingly increased by gradually replacing the LC dots with the C dots having the higher density. Formation of the C dots is commenced at the value of about 40% on the abscissa as shown in the graph of FIG. 25A. The C dots have a relatively low lightness and are rather conspicuous in the color of bright red to worsen the granularity. As in the case of FIG. 25A, however, the C dots are not so conspicuous in the color of dark red, which is expressed by the value of bout 40% on the abscissa, thereby not worsening the granularity.

When the sum of the dot recording ratios of the C, M, and DY dots reaches the restriction of ink duty, no further increase in formation of dots is allowed. The dot recording ratios of the respective C, M, and DY dots are thus decreased, while formation of the K dots is commenced. As described previously, the K dots have an extremely low lightness (that is, the K dots are very dark) and are rather conspicuous to significantly worsen the granularity, unless they are formed in the sufficiently dark background. As shown in FIG. 25A, however, formation of the K dots is commenced at the value of about 70% on the abscissa. The color 'red' expressed on the printing paper thus already has a significantly low lightness, so that the K dots are not conspicuous to lower the picture quality. At the final stage, only the K dots are formed at the dot recording ratio of 100%. The gradation pattern printed on the printing paper thus naturally and gradually changes the color from red, where only the M dots and the Y dots are formed at the recording ratio of 100%, to black, where only the K dots are formed at the recording ratio of 100%. Formation of the C dots is commenced at the value of about 40% on the abscissa, and formation of the K dots is commenced at the value of about 70% on the abscissa. These dots are accordingly not conspicuous to lower the picture quality.

FIG. 25B shows the results of the simulative computation of the dot recording ratio with regard to each color ink in the case of printing a gradation pattern from red to black without the DY dots on the sheet of printing paper having the restriction of ink duty equal to 220%. The pure color 'red' (the value of 0% on the abscissa) is gradually darkened with an increase in dot recording ratio of the LC dots. Due to the restriction of ink duty, formation of the C dots should be commenced when the dot recording ratio of the LC dots reaches 20%. In this case, formation of the C dots is required at the value of about 5% on the abscissa, where the color of still bright red is expressed on the printing paper. While the LC dots formed in the color of bright red are not so conspicuous, the C dots, which have a higher density than that of the LC dots, formed in the color of bright red as in the case of FIG. 25B are rather conspicuous and worsen the granularity.

After the perfect replacement of all the LC dots with the C dots, no further increase in formation of dots is allowed due to the restriction of ink duty. Formation of the K dots is accordingly commenced, while the dot recording ratios of the M dots and the Y dots are gradually decreased. This state is at the value of about 25% on the abscissa in the graph of FIG. 25B. Since the K dots have an extremely low lightness (that is, the K dots are very dark), formation of the K dots at the value of about 25% on the abscissa significantly worsens the granularity.

As described above, when the gradation pattern from red to black is printed without using the DY ink on the printing paper having the restriction of ink duty equal to 220%, the C dots are conspicuous in the color of still bright red and the K dots are conspicuous in the color of relatively dark red. This gives an image of the poor granularity. In other words, the use of the DY ink improves the granularity. If the DY dots themselves are rather conspicuous, the use of the DY ink is meaningless even though the DY ink prevents the granularity from being worsened due to the C dots or the K dots. The components of the Y ink and the LM ink included in the DY ink are not conspicuous against the background 'red' color. This means that only the component of the LC ink included in the DY ink has a possibility of conspicuousness. The conspicuousness of the DY dots formed in the red background is thus substantially equivalent to that of the LC dots. The use of the DY ink accordingly gives an image of extremely favorable granularity without any significant conspicuousness of dots.

FIG. 25C shows the results of the simulative computation of the dot recording ratio with regard to each color ink in the case of printing a gradation pattern from red to black without the DY dots on another sheet of printing paper having a restriction of ink duty equal to 260%. The pure color 'red' (the value of 0% on the abscissa) is gradually darkened with an increase in dot recording ratio of the LC dots. Due to the restriction of ink duty, replacement of the LC dots with the C dots should be commenced to further darken the color of red when the dot recording ratio of the LC dots reaches 60% (the value of 15% on the abscissa). When the dot recording ratio of the C dots reaches 60% (the value of 65% on the abscissa), no further formation of the C dots is allowed. Formation of the K dots is thus commenced, while the dot recording ratios of the C, M, and Y dots are gradually decreased. At the final stage, only the K dots are formed at the dot recording ratio of 100% (pure 'black' color). According to the comparison between the graphs of FIGS. 25A and 25C, both the timing of commencing the formation of the C dots and the timing of commencing the formation of the K dots are earlier in the case of FIG. 25C than in the case of FIG. 25A. Namely the dots are more conspicuous to worsen the granularity in the case of FIG. 25C, compared with the case of FIG. 25A. Based on the simulation conditions given previously, the improvement in picture quality by using the DY ink is greater than the improvement in picture quality by changing the printing paper having the restriction of ink duty equal to 220% to the printing paper having the restriction of ink duty equal to 260%.

The above results of the simulations suggest the usage of the DY ink. In the case of printing a gradation pattern from red to black, the formation of dots with the DY ink starts prior to the formation of dots with the C ink. The DY ink has a hue closest to that of the Y ink among the three basic color inks, C, M, and Y. The dots of the M ink and the dots of the Y ink have been created in advance to express the hue of red. The formation of dots with the DY ink is thus not commenced earlier than the formation of dots with the M ink and the Y ink.

There is another suggestion with regard to the usage of the DY ink. In the case of printing a gradation pattern from red to black, formation of the dots with the DY ink starts after the formation of dots with the LC ink. The DY ink has a hue closest to that of the Y ink among the three basic color inks, C, M, and Y. It can thus be thought that the dots of the DY ink are created together with the dots of the LC ink.

In the prior art color printer using the six color inks, C, M, Y, K, LC, and LM, the quantities of consumption of the Y, LC, and LM inks are greater than the quantities of consumption of the C and M inks. As described previously, the C, M, Y, LC, and LM inks are often kept in one ink cartridge 43. According to images to be printed, the Y, LC, and M inks are used up to require a replacement of the ink cartridge 43 that still has the remains of the C and M inks. The color printer 20 of the embodiment uses the DY ink in place of the Y ink in some occasions and thereby decreases the quantity of consumption of the Y ink. Since the DY ink contains the dyes of cyan and magenta, the use of the DY ink also decreases the quantities of consumption of the LC ink and the LM ink. The use of the DY ink thus enables all the other color inks to be consumed in a relatively equal manner and desirably reduces the frequency of replacement of the ink cartridge. The DY ink may be kept together with the LC ink and the LM ink in the same ink cartridge. This enables replacement of only the ink cartridge including the LC, LM, and DY inks having the greater quantities of consumption.

The above description regards the gradation pattern from red to black. The gradation pattern from red to black is only an example of gradation patterns starting from the condition that dots of only two color inks (in this example, the Y dots and the M dots) have already been formed. Similar effects are thus naturally exerted in the case of printing a gradation pattern from green to black with replacement of the M dots with the C dots and the LM dots with the LC dots. The effects of varying the quantities of the cyan dye and the magenta dye added to the DY ink will be described later.

C-2. Gradation Pattern from Magenta to Black

Figure 26A:
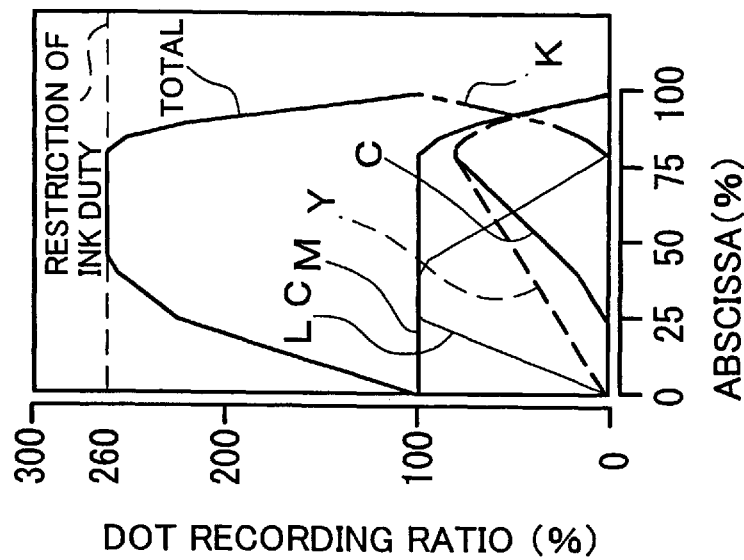
FIGS. 26A, 26B, and 26C show results of simulative computation of the dot recording ratio with regard to each color ink in the case of printing a gradation pattern from magenta to black with the color printer of the embodiment.
Figure 26B:
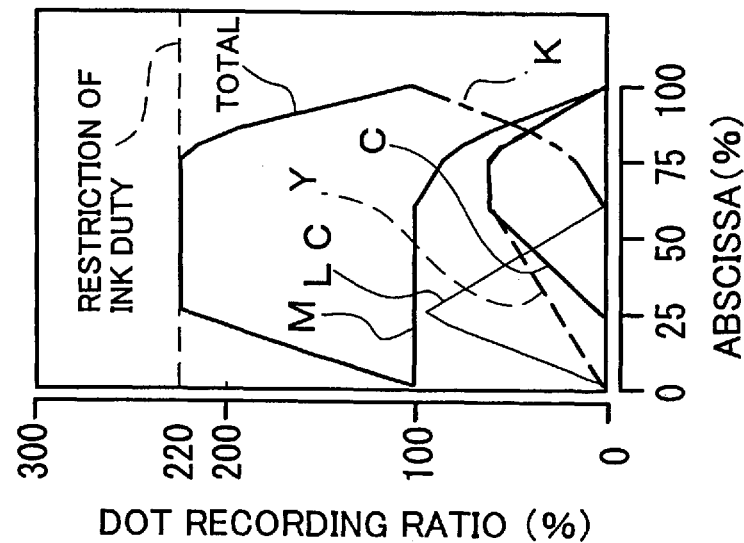
Figure 26C:
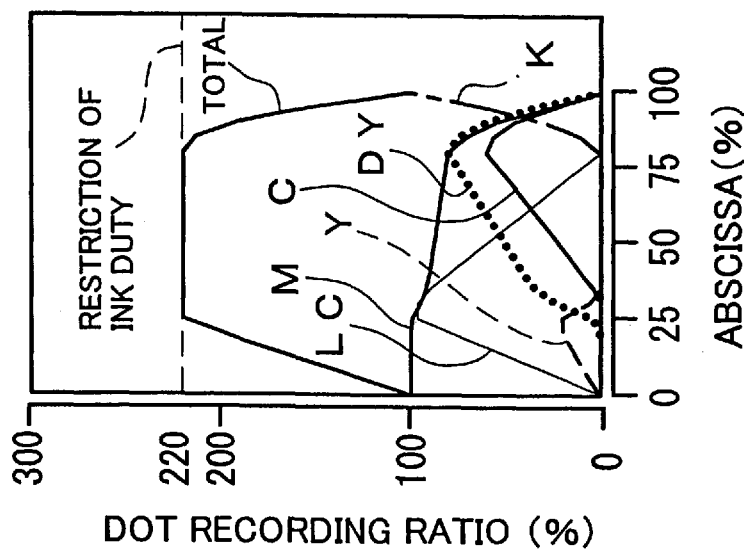

FIGS. 26A, 26B, and 26C show results of simulative computation of the dot recording ratio with regard to each color ink in the case of printing a gradation pattern from magenta to black with the color printer 20 of the embodiment. The conditions set for the simulative computation are identical with the conditions used for the simulation of the gradation pattern from red to black. FIG. 26A shows the results of the simulative computation with the DY dots in the case of the printing paper having the restriction of ink duty equal to 220%. FIG. 26B shows the results of the simulative computation without the DY dots in the case of the printing paper having the restriction of ink duty equal to 220%. FIG. 26C shows the results of the simulative computation without the DY dots in the case of the printing paper having the restriction of ink duty equal to 260%.

As shown in FIG. 26A, in the gradation pattern from magenta to black, the dot recording ratios of the LC dots and the Y dots are gradually increased from the initial state (the value of 0% on the abscissa) in which the M dots have a dot recording ratio of 100%. According to the condition 4 mentioned previously, the dots of the LC ink are equivalent to ¼ dots of the C ink. The rate of increase in dot recording ratio of the LC dots is thus four times the rate of increase in dot recording ratio of the Y dots. When the dot recording ratios of the LC dots and the Y dots increase and the sum of the dot recording ratios of the M dots, the Y dots, and the LC dots reach the restriction of ink duty, replacement of the Y dots with the DY dots is commenced. After the perfect replacement of all the Y dots with the DY dots, replacement of the LC dots with the C dots is commenced. According to the results of the simulation shown in FIG. 26A, the formation of the C dots starts at the value of about 35% on the abscissa. As described previously, the DY ink contains the components of the LM ink and the LC ink, formation of the DY dots is equivalent to formation of the same number of the LM dots and the LC dots (see the condition 6 mentioned above). The increase in dot recording ratio of the DY dots accordingly decreases the dot recording ratio of the M dots and reduces the rate of increase in formation of the C dots.

When the sum of the dot recording ratios of the C, M, and DY dots reaches the restriction of ink duty, formation of the K dots is commenced. According to the results of the simulation shown in FIG. 26A, the formation of the K dots starts at the value of about 80% on the abscissa. The increase in dot recording ratio of the K dots decreases the dot recording ratios of the C, M, and DY dots. At the final stage, only the K dots are formed at the dot recording ratio of 100% (pure 'black' color). The resulting printed image on the printing paper is a gradation pattern having the hues gently changing from magenta to black.

While FIG. 26A shows the results of the simulation with the DY dots, FIG. 26B shows the results of the simulative computation of the dot recording ratio with regard to each color ink in the case of printing a gradation pattern from magenta to black without the DY dots on the printing paper having the restriction of ink duty equal to 220%. Compared with the case with the DY dots shown in FIG. 26A, in the case without the DY dots shown in FIG. 26B, the formation of the C dots is commenced at the slightly earlier timing and the formation of the K dots is commenced at the significantly earlier timing. Starting the formation of the K dots at the value of about 60% on the abscissa like the results of the simulation shown in FIG. 26B drastically worsens the granularity of the resulting printed image. In other words, the use of the DY dots significantly improves the granularity of the resulting printed image. The improvement in granularity is attained by the fact that the DY ink contains the cyan dye and the magenta dye. Formation of the DY dots is equivalent to formation of certain quantities of the C dots and the M dots that correspond to the contents of the dyes. Replacement of the Y dots with the DY dots in a shadow area (for example, in the area having the value of about 75% on the abscissa) decreases the dot recording ratios of the M dots and the C dots. This ensures a certain margin for the restriction of ink duty and thereby delays the timing of starting the formation of the K dots.

As described above, the use of the DY dots significantly delays the timing of starting the formation of the K dots and slightly delays the timing of starting the formation of the C dots. This results in a significant improvement in granularity. If the DY dots that start formation at a relatively early timing are conspicuous, the granularity of the resulting printed image is not actually improved. The conspicuousness of the DY dots is thus a key factor. As described previously, the DY ink includes the components of the LM ink, the LC ink, and the Y ink (see the condition 6 mentioned above). When the dots of the DY ink are formed in the magenta background, the component of the LM ink included in the DY ink is inconspicuous against the background. The dots of the other ink components, that is, the LC dots and the Y dots, are not so conspicuous in the magenta background. Formation of the DY dots is substantially equivalent to formation of the LC dots and the Y dots in an overlapping manner. The dots of both the LC ink and the Y ink are not so conspicuous as the dots of the C ink and the K ink. Formation of the DY dots in the magenta background even at a relatively early timing thus does not significantly worsen the granularity. In the case of printing a gradation pattern from magenta to black, the use of the DY dots desirably delays the timings of starting the formation of the C dots and the K dots and thus significantly improves the granularity of the resulting printed image.

FIG. 26C shows the results of the simulative computation of the dot recording ratio with regard to each color ink in the case of printing a gradation pattern from magenta to black without the DY dots on the printing paper having the restriction of ink duty equal to 260%. The results of the simulative computation shown in FIG. 26C are compared with those shown in FIG. 26A. The timings of starting the formation of the C dots and the K dots in the case of FIG. 26C are almost the same as those in the case of FIG. 26A. When a gradation pattern from magenta to black is printed, substantially similar effects of improvement in picture quality are attained in the case of printing with the DY dots on the printing paper having the restriction of ink duty equal to 220% and in the case of printing without the DY dots on the printing paper having the restriction of ink duty equal to 260%.

As shown in the results of the simulations in FIGS. 26A, 26B, and 26C, in the case of printing a gradation pattern from magenta to black, the use of the DY dots effectively prevents the granularity from being worsened and thereby improves the picture quality of the resulting printed image. Another effect of using the DY ink is reducing the quantities of consumption of the Y ink, the LC ink, and the LM ink.

The above results of the simulations suggest the usage of the DY ink. In the case of printing a gradation pattern from magenta to black, the formation of dots with the DY ink starts prior to the formation of dots with the C ink and after the formation of dots with the Y ink. The DY ink has a hue closest to that of the Y ink among the three basic color inks, C, M, and Y. The dots of the M ink have been created in advance to express the hue of magenta.

There is another suggestion with regard to the usage of the DY ink. In the case of printing a gradation pattern from magenta to black, formation of the dots with the DY ink starts after the formation of dots with the LC ink. The DY ink has a hue closest to that of the Y ink among the three basic color inks, C, M, and Y. It can thus be thought that the dots of the DY ink are created together with the dots of the LC ink.

The above description regards the gradation pattern from magenta to black as an example of gradation patterns starting from the condition that dots of only one color ink have already been formed. Similar effects are thus naturally exerted in the case of printing a gradation pattern from cyan or yellow to black with replacement of the M dots with the C dots or the Y dots.

C-3. Gradation Pattern from White to Black

Figure 27A:
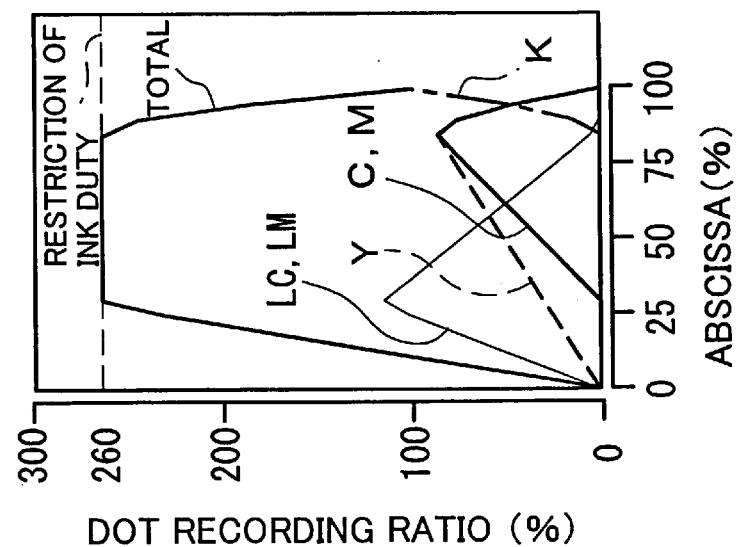
FIGS. 27A, 27B, and 27C show results of simulative computation of the dot recording ratio with regard to each color ink in the case of printing a gradation pattern from white to black with the color printer of the embodiment.
Figure 27B:
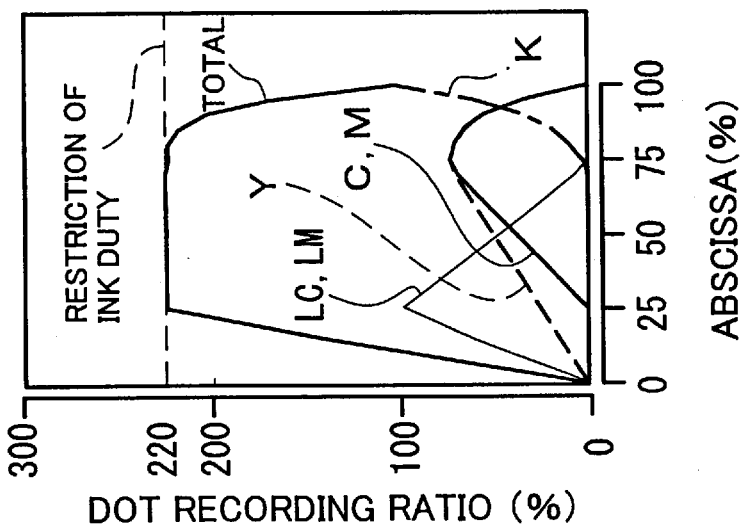
Figure 27C:
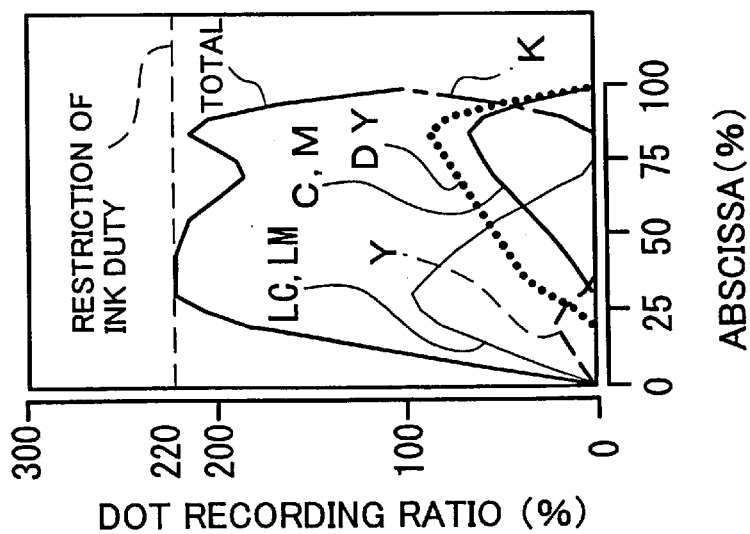

FIGS. 27A, 27B, and 27C show results of simulative computation of the dot recording ratio with regard to each color ink in the case of printing a gradation pattern from white to black with the color printer 20 of the embodiment. The conditions set for the simulative computation are identical with the conditions used for the simulation of the gradation pattern from red to black. FIG. 27A shows the results of the simulative computation with the DY dots in the case of the printing paper having the restriction of ink duty equal to 220%. FIG. 27B shows the results of the simulative computation without the DY dots in the case of the printing paper having the restriction of ink duty equal to 220%. FIG. 27C shows the results of the simulative computation without the DY dots in the case of the printing paper having the restriction of ink duty equal to 260%.

As shown in FIG. 27A, in the case of printing a gradation pattern from white to black, formation of the LC dots, the LM dots, and the Y dots gradually increases from the initial state in which no dots have been formed. When the dot recording ratios of the LC dots and the LM dots approach to 100%, replacement of the LC dots and the LM dots respectively with the C dots and the M dots is commenced. The DY ink contains the components of the LC ink and the LM ink (see the condition 6 given previously). Replacement of the Y dots with the DY dots before the dot recording ratios of the LC dots and the LM dots reach 100% thus effectively delays the timings of starting the formation of the C dots and the M dots. The delay of the timings of starting the formation of the C dots and the M dots desirably makes the dots more inconspicuous and thereby prevents the granularity from being worsened in the resulting printed image.

With an increase in dot recording ratios of the C, M, and DY dots, the lightness of the color expressed on the printing paper is gradually lowered to darker gray. When the sum of the dot recording ratios of the C, M, and DY inks reaches the restriction of ink duty, formation of the K dots is commenced and the dot recording ratios of the C, M, and DY dots are gradually decreased. At the final stage, only the K dots are formed at a dot recording ratio of 100%. The resulting printed image on the printing medium is a gradation pattern having the color gently changing from white to black.

The results of the simulation in the case with the DY dots shown in FIG. 27A are compared with the results of the simulation in the case without the DY dots shown in FIG. 27B. The formation of the DY dots desirably delays the timing of starting the formation of the K dots. According to the condition 6 mentioned previously, the DY ink contains the components of the LC ink, the LM ink, and the Y ink. Replacement of the Y dots with the DY dots thus reduces the formation of the C dots and the M dots. This gives a certain margin for the restriction of ink duty and thereby delays the timing of starting the formation of K dots.

In the case of printing a gradation pattern from white to black, the use of the DY dots desirably delays the timings of starting formation of the C dots and the M dots and starting formation of the K dots, thereby preventing the granularity from being worsened and improving the picture quality of the resulting printed image.

FIG. 27C shows the results of the simulative computation without the DY dots in the case of the printing paper having the restriction of ink duty equal to 260%. As clearly understood from the comparison between the results of FIG. 27C and the results of FIG. 27A, the C dots and the K dots start formation at substantially the same timings. In the case of printing a gradation pattern from white to black, the improvement in picture quality by the use of the DY dots is thus substantially identical with the improvement in picture quality by changing the restriction of ink duty set for the printing paper from 220% to 260%.

The above results of the simulations suggest the usage of the DY ink. In the case of printing a gradation pattern from white to black, the formation of dots with the DY ink starts prior to the formation of dots with the C ink and the M ink. The DY ink has a hue closest to that of the Y ink among the three basic color inks, C, M, and Y. The formation of dots with the DY ink starts after the formation of dots with the Y ink. The dots of the DY ink are more conspicuous than the dots of the Y ink. Formation of the dots of the DY ink in an overlapping manner on the dots of the Y ink gives a printed image of high picture quality with less conspicuousness of dots. The dots of the DY ink may, however, be formed in place of the dots of the Y ink or simultaneously with the dots of the Y ink. The dots of the DY ink are not so conspicuous as the dots of the C ink or the M ink. It is thus not necessary to create the DY dots in an overlapping manner on the Y dots. Any of these arrangements does not cause the DY dots to be made conspicuous and lower the picture quality of the resulting printed image. The use of the DY ink desirably reduces the total quantity of ink consumption.

There is another suggestion with regard to the usage of the DY ink. In the case of printing a gradation pattern from white to black, formation of the dots with the DY ink starts after or simultaneously with the formation of dots with the LC ink and the LM ink. The DY ink has a hue closest to that of the Y ink among the three basic color inks, C, M, and Y. It can thus be thought that the dots of the DY ink are created together with the dots of the LC ink and the dots of the LM ink.

The simulations discussed above aim at preventing the deterioration of the granularity and improving the picture quality of the resulting printed image. When there is a margin for the restriction of ink duty, the dots of the ink having less conspicuousness are thus selectively created. As long as there is no problem in granularity, however, the replacement of the LC dots with the C dots, the LM dots with the M dots, and the Y dots with the DY dots may be commenced at the earlier timings than those discussed in the simulations. This makes the points of starting formation of the C dots, the M dots, the DY dots, and the K dots closer to the value of 0% on the abscissa. According to the condition 6 given above, it is possible to replace the same quantities of the Y dots, the LC dots, and the LM dots with the DY dots. The replacement with the DY dots at the earlier timing thus favorably reduces the total quantity of ink consumption.

The use of the DY ink gives an image of better granularity under the condition of a fixed quantity of total ink consumption or prints an image of equivalent picture quality with a less quantity of total ink consumption. The appropriate setting can thus be selected for the use of the DY ink based on the priority to the picture quality, the priority to the less quantity of total ink consumption, or the compatibility of these two effects.

As described above, the use of the DY ink improves the granularity, which may be worsened by the conspicuousness of the cyan dots, the magenta dots, or the black dots in a gradation pattern to the shadow area.

Dark cyan ink and dark magenta ink may also be used for the dark ink. Like the dark yellow ink, these dark inks have the effects of improving the granularity based on the margin for the restriction of ink duty and saving the total quantity of ink consumption. The use of the dark cyan ink improves the granularity, which is worsened by the yellow dots and the magenta dots. Similarly the use of the dark magenta ink improves the granularity, which is worsened by the yellow dots and the cyan dots. The yellow dots having a high lightness are, however, originally inconspicuous and are not the main factor of the worsened granularity. The use of the dark cyan ink thus improves the worsened granularity mainly due to the magenta dots. Similarly the use of the dark magenta ink improves the worsened granularity mainly due to the cyan dots. The use of the dark yellow ink, on the other hand, improves the worsened granularity due to both the cyan dots and the magenta dots, and is thus most effective. The dark yellow ink having the yellow dye as the main component is less inconspicuous than the dark cyan ink or the dark magenta ink. From the viewpoint of the improved granularity, the use of the dark yellow ink is most desirable.

C-4. Application to Printer with Four Color Inks

The above description regards the effects of the use of the DY ink in the color printer using the six color inks C, M, Y, K, LC, and LM. The use of the DY ink, however, exerts the similar effects in the color printer using only the four color inks C, M, Y, and K and the color printer using only the three color inks C, M and Y.

Figure 28A:
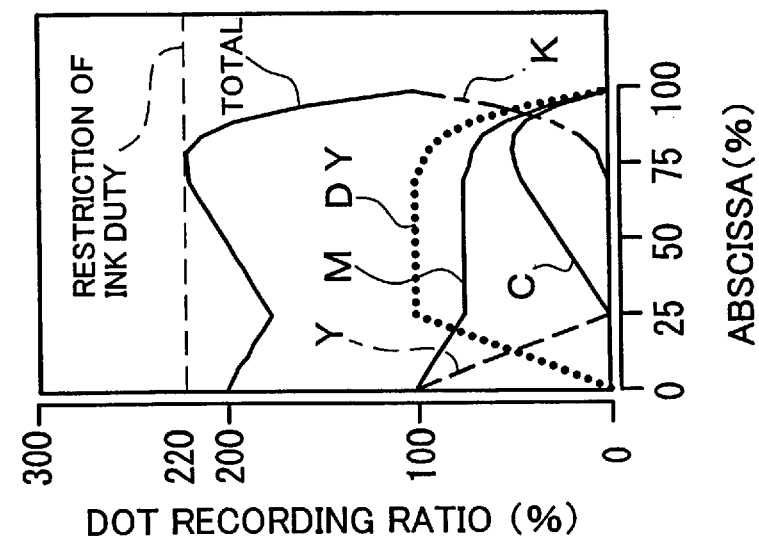
FIGS. 28A, 28B, and 28C show results of simulative computation of the dot recording ratio with regard to each color ink in the case of printing a gradation pattern from red to black with the color printer using only the four color inks C, M, Y, and K.
Figure 28B:
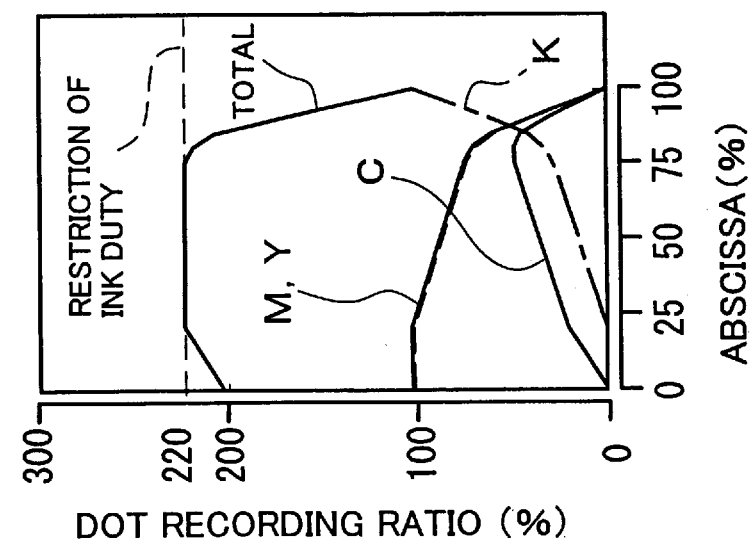
Figure 28C:
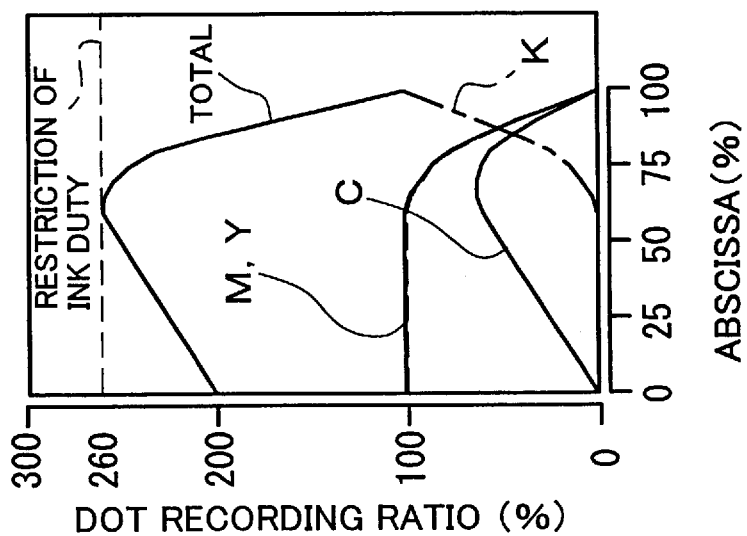

FIGS. 28A, 28B, and 28C show results of simulations for confirming the effects of the use of the DY ink in the case of printing a gradation pattern from red to black with the color printer using only the four color inks C, M, Y, and K. FIG. 28A shows the results of simulative computation of the dot recording ratio with regard to each color ink in the case of printing with the DY dots on the printing paper having the restriction of ink duty equal to 220%. FIG. 28B shows the results of simulative computation of the dot recording ratio with regard to each color ink in the case of printing without the DY dots on the printing paper having the restriction of ink duty equal to 220%. FIG. 28C shows the results of simulative computation of the dot recording ratio with regard to each color ink in the case of printing without the DY dots on the printing paper having the restriction of ink duty equal to 260%.

The following effects are expected from the results of the simulative computation shown in FIG. 28A. In the color printer using only the four color inks, since the LC ink is not used, it is required to start formation of the C dots at an early timing. As discussed previously, the C dots formed in the color of bright red are rather conspicuous and significantly worsen the granularity. In the case with the use of the DY ink as shown in FIG. 28A, the color of red is gradually darkened by replacing the Y dots with the DY dots. The conspicuousness of the DY dots formed in the red background is as low as that of the LC dots. The replacement of the Y dots with the DY dots thus does not worsen the granularity.

After the perfect replacement of all the Y dots with the DY dots, it is required to create the C dots. The formation of the DY dots has already lowered the lightness of the color 'red' to some extent (to the value of about 25% on the abscissa). Formation of the C dots thus does not significantly lower the granularity. The use of the DY ink delays the timing of starting formation of the C dots and thereby improves the granularity.

In this simulative computation, since the DY ink contains the components of the Y ink, the LC ink and the LM ink (see the condition 6 given above), the formation of the DY dots decreases the dot recording ratio of the M dots. This gives a certain margin for the restriction of ink duty and delays the timing of starting formation of the K dots, thus preventing the granularity from being worsened. As clearly understood from the comparison between the results of the simulative computation with the DY ink shown in FIG. 28A and the results of the simulative computation without the DY ink shown in FIG. 28B, the use of the DY ink significantly delays the timing of starting formation of the K dots from the value of about 25% on the abscissa to the value of about 75%. This means that the use of the DY ink remarkably prevents the granularity from being worsened.

FIG. 28C shows the results of the simulative computation without the DY ink in the case of changing the restriction of ink duty set for the printing paper from 220% to 260%. As clearly understood from the comparison between FIG. 28B and FIG. 28C, the increase in restriction of ink duty delays the timing of starting formation of the K dots. The comparison between FIG. 28A and FIG. 28C, however, shows that the effects attained by increasing the restriction of ink duty are less than the effects attained by the use of the DY ink. Even in the case of the printing paper having the restriction of ink duty equal to 260%, the C dots should start formation at the value of 0% on the abscissa. The use of the dark ink, on the other hand, delays the timing of starting formation of the C dots to the value of about 25% on the abscissa. As described previously, cyan is complementary to red. The C dots are thus rather conspicuous in the red background, although the degree of conspicuousness is not so high as that of the K dots. The delayed timing of starting formation of the C dots to the value of about 25% on the abscissa by the use of the DY ink thus significantly improves the granularity in the bright area (that is, the highlighted area).

As described above, in the process of printing a gradation pattern from red to black, the change to the printing paper having the higher restriction of ink duty improves the picture quality only in the shadow area (that is, the area having large values on the abscissa). The use of the DY ink, on the other hand, improves the picture quality over the whole range from the highlighted area to the shadow area.

C-5. Application to Printer with Three Color Inks

FIGS. 29A and 29B show the results of simulative computation in the case of printing a gradation pattern from white to black with the color printer using only the C, M, and Y inks and not using the K ink. Unlike the 'black' color expressed by the K ink, the 'black' color expressed by a combination of the C, M, and Y inks does not have a sufficiently low lightness and gives an impression of dimness. In the case of printing the 'black' color with the C, M, and Y inks, all the C dots, the M dots, and the Y dots should have dot recording ratios of 100%. FIG. 29A shows the results of the simulative computation of the dot recording ratio with regard to each color ink in this state. The sum of the dot recording ratios of the respective color inks naturally exceeds the restriction of ink duty, and such settings of the dot recording ratios are not practical. In other words, only the dim black color can be expressed by the color printer using the three color inks, as long as the practical dot recording ratios are set by taking into account the restriction of ink duty.

FIG. 29B shows the results of the simulative computation of the dot recording ratio with regard to each ink in the case of using the DY dots in addition to the C, M, and Y dots. In this simulative computation, since the DY ink contains the components of the LC ink, the LM ink, and the Y ink (see the condition 6 given previously), replacement of the Y dots with the DY dots desirably decreases the dot recording ratios of the C dots and the M dots. The use of the DY dots accordingly enables the expression of the color of sufficiently clear black even when the practical dot recording ratios are set by taking into account the restriction of ink duty.

As described above, the use of the DY ink enables the expression of the color of sufficiently clear black even without the K ink. The use of the DY ink instead of the K ink ensures the expression of the color of sufficiently clear black and enables the image of high picture quality to be printed with the color printer using the four color inks C, M, Y, and K and in the color printer using the six color inks including the LC and LM inks in addition to the above four color inks. In the prior art color printer using the four color inks or the six color inks, attachment of the ink cartridge for the DY ink in place of the ink cartridge for the K ink with the required operations, for example, rewriting the printer driver to a special printer driver for the DY ink, enables formation of the DY dots and prints an image of high picture quality including the sufficiently clear black color.

As described above with the results of the simulative computation, the use of the DY ink enhances the degree of freedom in dot formation and thus improves the picture quality under a variety of printing conditions. The enhanced degree of freedom with the use of the DY ink enables images of low lightness but high saturation to be printed adequately. In many cases, the desired color can not be expressed in such images because of the restriction of ink duty. The use of the DY ink relieves the restriction of ink duty and thereby enables the color expressed on the printing paper to be closer to the desired color.

In the simulative computation discussed above, the DY ink satisfying the above condition 6 was used as the DY ink. This DY ink is similar to the DY1 ink shown in FIG. 14D. The use of another DY ink similar to the DY2 ink also exerts the similar effects as discussed below.

Based on the theory of subtractive mixture of colors, it is assumed that the K ink is equivalent to the combination of identical quantities of the C ink, the M ink, and the Y ink. According to the above conditions 4 through 6, it is thought that the DY ink is obtained by adding ¼ quantities of the C ink and the M ink to the Y ink. Since the K ink is equivalent to the combination of identical quantities of the C ink, the M ink, and the Y ink, the DY ink is thought to be the mixture of ¾ quantity of the Y ink and ¼ quantity of the K ink. The ink thus obtained is similar to the DY2 ink shown in FIG. 14E. The effects described above with the DY ink under the above conditions are thus also exerted by the DY2 ink.

In the actual printing operation, the condition that the K ink is equivalent to the combination of identical quantities of the C ink, the M ink, and the Y ink is not strictly fulfilled. The DY2 ink is, however, expected to have the qualitatively similar effects to those of the DY1 ink. The DY3 ink having the significantly different spectroscopic characteristics in the area of the low sensitivity of vision to the color may also be used as the DY ink.

The simulative computation discussed above is carried out under the condition 6 that the DY ink is equivalent to the ink including the identical quantities of the LC ink and the LM ink in addition to the Y ink. The rates of the LC ink and the LM ink added to the Y ink are, however, not restricted to this condition. As shown in FIG. 12, the contents of the cyan dye and the magenta dye included in the DY ink are approximately one quarter the contents of the cyan dye and the magenta dye included in the C ink and the M ink, respectively. The contents of the dyes included in the DY ink are, however, not restricted to this composition. Possible modification may vary the contents of the cyan dye and the magenta dye or change the ratio of the cyan dye to the magenta dye.

The decrease in rates of the dyes included in the DY ink increases the lightness of the DY ink. In this case, starting formation of the DY dots even in the state of a relatively high lightness (that is, the state of a small value on the abscissa in the graphs of FIGS. 25 through 29) does not make the DY dots conspicuous, thus not worsening the granularity. The increase in rates of the dyes included in the DY ink, on the other hand, enables reduction of the greater numbers of the other color dots by the formation of the DY dots. This accordingly enhances the effects of improving the granularity based on the margin for the restriction of ink duty and saving the total quantity of ink consumption.

The present invention is not restricted to the above embodiment or its modifications, but there may be many other modifications, changes, and alterations without departing from the scope or spirit of the main characteristics of the present invention. For example, the software or application programs that actualize the above functions may be supplied through a communication line to the main memory of the computer system or an external storage device.

The scope and spirit of the present invention are limited only by the terms of the appended claims.

What is claimed is:

1. A printing system comprising a printer that creates dots with a plurality of different inks, so as to print an image on a printing medium, and a print controller that supplies control information to said printer, so as to control the creation of dots with the plurality of different inks, wherein said print controller comprises:
a dot on-off condition specification unit that specifies dot on-off conditions with regard to a plurality of basic color inks and a dark ink based on input image data, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and
a control information output unit that outputs the control information to specify the dot on-off conditions with regard to the plurality of basic color inks and the dark ink to said printer,
said printer comprising:
a control information input unit that receives the control information to specify the dot on-off conditions with regard to the plurality of basic color inks and the dark ink, which is output from said control information output unit; and
a dot formation unit that creates dots with the plurality of basic color inks and the dark ink, based on the input control information.

2. A print controller that supplies control information to a printer, which creates dots with a plurality of different inks, in order to control the creation of dots with the plurality of different inks, said printer creating dots with a plurality of basic color inks as well as with a dark ink, the plurality of basic color inks being combined with one another to express achromatic color, the dark ink having a main wavelength region of light absorption substantially identical with that of one basic color ink selected out of the plurality of basic color inks but a lower lightness than that of the selected basic color ink, said print controller comprising:
a dot on-off condition specification unit that specifies dot on-off conditions with regard to the plurality of basic color inks and the dark ink, based on input image data; and a control information output unit that outputs the control information to specify the dot on-off conditions with regard to the plurality of basic color inks and the dark ink to said printer.

3. A print controller in accordance with claim 2, wherein said dot on-off condition specification unit comprises:
 a memory which stores a color conversion table, in which each tint used to express a color image is mapped to a combination of the plurality of basic color inks and the dark ink to represent the tint,
 said dot on-off condition specification unit specifying the dot on-off conditions with regard to the plurality of basic color inks and the dark ink by referring to said color conversion table.

4. A print controller in accordance with claim 2, wherein said dot on-off condition specification unit specifies the dot on-off conditions with regard to the plurality of basic color inks and the dark ink, based on a preset proportion regarding dots of the plurality of basic color inks and dots of the dark ink.

5. A print controller in accordance with claim 2, wherein the dark ink has lower lightness and saturation than those of one basic color ink selected out of the plurality of basic color inks.

6. A print controller in accordance with claim 2, wherein the dark ink has a main wavelength region for most strongly absorbing a ray in a visible range, which is substantially identical with that of one basic color ink selected out of the plurality of basic color inks, and a greater integral of light absorptivity in a wavelength region of the visible range than that of the selected basic color ink.

7. A print controller in accordance with claim 6, wherein the dark ink has the main wavelength region, which is mostly included in a wavelength region of 400 nm to 500 nm, and a smaller light absorptivity in the vicinity of 700 nm than a mean light absorptivity in a wavelength region of 600 nm to 700 nm.

8. A print controller in accordance with claim 6, wherein the dark ink has the main wavelength region, which is mostly included in a wavelength region of 400 nm to 500 nm, and a greater light absorptivity in the vicinity of 700 nm than a mean light absorptivity in a wavelength region of 600 nm to 700 nm.

9. A print controller in accordance with claim 2, wherein the dark ink has:
 (A) a characteristic wavelength region for strongly absorbing a ray in a visible range to mainly determine the hue of the dark ink, which is substantially identical with a characteristic wavelength region of one basic color ink selected out of the plurality of basic color inks;
 (B) a mean value of light absorptivity that is greater than or substantially identical with a mean value of light absorptivity of the selected basic color ink in the characteristic wavelength region of the dark ink; and
 (C) a mean value of light absorptivity that is greater than a mean value of light absorptivity of the selected basic color ink in a wavelength region of visible light except the characteristic wavelength region of the dark ink.

10. A print controller in accordance with claim 9, wherein the dark ink has the characteristic wavelength region, which is mostly included in a wavelength region of 400 nm to 500 nm, and a smaller light absorptivity in the vicinity of 700 nm than a mean light absorptivity in a wavelength region of 600 nm to 700 nm.

11. A print controller in accordance with claim 9, wherein the dark ink has the characteristic wavelength region, which is mostly included in a wavelength region of 400 nm to 500 nm, and a greater light absorptivity in the vicinity of 700 nm than a mean light absorptivity in a wavelength region of 600 nm to 700 nm.

12. A print controller in accordance with claim 2, wherein the dark ink has a hue in a specific hue range interposed between a red hue zone and a green hue zone on a Munsell hue circle, and a lower lightness than that of a basic color ink out of the plurality of basic color inks, which has a hue in the specific hue range.

13. A print controller in accordance with claim 12, wherein the dark ink has a hue in the specific hue range that includes a yellow hue zone and extends to a boundary between the yellow hue zone and the green hue zone on the Munsell hue circle.

14. A print controller in accordance with claim 12, wherein the dark ink has a hue in the specific hue range that includes a yellow hue zone and extends to a boundary between the yellow hue zone and the red hue zone on the Munsell hue circle, and a smaller saturation than that of flesh color.

15. A print controller in accordance with claim 2, wherein the dark ink has a hue included in a specific range of 10R to 10GY on a Munsell hue circle, and a lower lightness than that of a basic color ink out of the plurality of basic color inks, which has a hue in the specific range.

16. A print controller in accordance with claim 15, wherein the dark ink has a saturation of smaller than 3.5C on a Munsell chroma when the hue of the dark ink is in a range of 2.5YR to 7.5YR on the Munsell hue circle.

17. A print controller in accordance with claim 15, wherein the hue of the dark ink is in a range of 10YR to 10GY on the Munsell hue circle.

18. A print controller in accordance with claim 15, wherein the dark ink has the hue in a range of 10Y to 10R on the Munsell hue circle and a saturation of smaller than 3.5C on a Munsell chroma.

19. A print controller in accordance with claim 2, wherein said printer creates dots with the plurality of basic color inks and the dark ink, as well as dots with at least one light ink, the at least one light ink having a hue substantially identical with that of at least one basic color ink selected out of the plurality of basic color inks but a lower density than that of the at least one basic color ink,
 said dot on-off condition specification unit specifies the dot on-off conditions with regard to the plurality of basic color inks and the dark ink, as well as dot on-off conditions with regard to the at least one light ink, and
 said control information output unit outputs the specification of the dot on-off conditions with regard to the plurality of basic color inks, the dark ink, and the at least one light ink.

20. A print controller in accordance with claim 19, wherein the plurality of basic color inks include at least cyan ink, magenta ink, and yellow ink,
 the dark ink having a hue that is closest to the hue of the yellow ink among the cyan ink, the magenta ink, and the yellow ink,
 specification of the dot on-off conditions with regard to the dark ink being carried out to enable dots with the dark ink to be created after creation of dots with the light ink when an image to be printed has hues varying from yellow to black.

21. A print controller in accordance with claim 20, wherein the light ink is light cyan ink having a hue substantially identical with that of the cyan ink but a lower density than that of the cyan ink.

22. A print controller in accordance with claim 20, wherein the light ink is light magenta ink having a hue substantially identical with that of the magenta ink but a lower density than that of the magenta ink.

23. A print controller in accordance with claim 20, wherein the dark ink having a hue that is closest to the hue of the yellow ink among the cyan ink, the magenta ink, and the yellow ink, specification of the dot on-off conditions with regard to the dark ink being carried out to enable dots with the dark ink to be created after creation of both dots with light cyan ink, which has a hue substantially identical with that of the cyan ink but a lower density than that of the cyan ink, and dots with light magenta ink, which has a hue substantially identical with that of the magenta ink but a lower density than that of the magenta ink, when an image to be printed has hues varying from yellow to black.

24. A print controller in accordance with claim 2, wherein said printer creates at least two variable-size dots having different sizes with the plurality of different inks, said dot on-off condition specification unit specifies the dot on-off conditions with regard to the plurality of different inks and sizes of respective dots to be created by said printer, and said control information output unit outputs the specification of the dot on-off conditions and the sizes of dots with regard to the plurality of different inks.

25. A print controller in accordance with claim 2, wherein said printer creates dots with the plurality of basic color inks including at least yellow ink, as well as dots with dark yellow ink that has a main wavelength region of light absorption substantially identical with that of the yellow ink but a lower lightness than that of the yellow ink, said dot on-off condition specification unit specifies dot on-off conditions with regard to the plurality of basic color inks and the dark yellow ink, and said control information output unit outputs the specification of the dot on-off conditions with regard to the plurality of basic color inks and the dark yellow ink.

26. A print controller in accordance with claim 2, wherein the plurality of basic color inks include at least cyan ink, magenta ink, and yellow ink, the dark ink having a hue that is closest to the hue of the yellow ink among the cyan ink, the magenta ink, and the yellow ink, specification of the dot on-off conditions with regard to the dark ink being carried out to enable dots with the dark ink to be created together with dots of at least one of the basic color inks when an image to be printed has hues varying from red to green on a Munsell hue circle.

27. A print controller in accordance with claim 2, wherein the plurality of basic color inks include at least cyan ink, magenta ink, and yellow ink, the dark ink having a hue that is closest to the hue of the yellow ink among the cyan ink, the magenta ink, and the yellow ink, specification of the dot on-off conditions with regard to the dark ink being carried out to enable dots with the dark ink to be created prior to creation of dots with either one of the cyan ink and the magenta ink when an image to be printed has hues varying from yellow to black.

28. A print controller in accordance with claim 2, wherein the plurality of basic color inks include at least cyan ink, magenta ink, and yellow ink, the dark ink having a hue that is closest to the hue of the yellow ink among the cyan ink, the magenta ink, and the yellow ink, and a lower lightness than that of the yellow ink, specification of the dot on-off conditions with regard to the dark ink being carried out to enable dots with the dark ink to be created prior to creation of dots with either one of the cyan ink and the magenta ink when an image to be printed has hues varying from color of the either one of the cyan ink and the magenta ink to black.

29. A print controller in accordance with claim 2, wherein the plurality of basic color inks include at least cyan ink, magenta ink, and yellow ink, the dark ink having a hue that is closest to the hue of the yellow ink among the cyan ink, the magenta ink, and the yellow ink, and a lower lightness than that of the yellow ink, specification of the dot on-off conditions with regard to the dark ink being carried out to enable dots with the dark ink to be created after creation of dots with the yellow ink when an image to be printed has hues varying from color of either one of the cyan ink and the magenta ink to black.

30. A print controller that supplies control information to a printer, which creates dots with a plurality of different inks, in order to control the creation of dots with the plurality of different inks, said printer creating dots with a plurality of basic color inks, which include at least cyan ink, magenta ink, and yellow ink, as well as with dark yellow ink, the dark yellow ink having a main wavelength region of light absorption substantially identical with that of the yellow ink but a lower lightness than that of the yellow ink, said print controller comprising:

a dot on-off condition specification unit that specifies dot on-off conditions with regard to the plurality of basic color inks and the dark yellow ink, based on input image data; and a control information output unit that outputs the specification of the dot on-off conditions with regard to the plurality of basic color inks and the dark yellow ink to said printer as the control information.

31. A printing apparatus that has a print head to create dots with a plurality of different inks on a printing medium, receives control information to control the creation of dots with the plurality of different inks, and actually creates dots with the plurality of different inks, based on the input control information, so as to print an image, said printing apparatus comprising:

a basic color ink supply unit that supplies a plurality of basic color inks to said print head, the plurality of basic color inks being combined with one another to express achromatic color;

a dark ink supply unit that supplies a dark ink to said print head, the dark ink having a main wavelength region of light absorption substantially identical with that of one basic color ink selected out of the plurality of basic color inks but a lower lightness than that of the selected basic color ink;

a control information input unit that receives the control information with regard to dots of the plurality of basic color inks and the dark ink; and a dot formation unit that drives said print head based on the input control information, so as to create dots with the plurality of basic color inks and the dark ink.

32. A printing apparatus in accordance with claim 31, wherein the plurality of basic color inks include at least cyan ink, magenta ink, and yellow ink.

33. A printing apparatus in accordance with claim 31, wherein the plurality of basic color inks include at least cyan ink, magenta ink, yellow ink, and black ink and the dark ink is dark yellow ink having a main wavelength region of light absorption substantially identical with that of the yellow ink but a lower lightness than that of the yellow ink.

34. A printing apparatus in accordance with claim 31, said printing apparatus comprising:

a light ink supply unit that supplies at least one light ink to said print head, the at least one light ink having a hue substantially identical with that of at least one basic color ink selected out of the plurality of basic color inks but a lower density than that of the at least one basic color ink, wherein said control information input unit receives the control information with regard to dots of the at least one light ink, as well as with regard to the dots of the plurality of basic color inks and the dark ink, and said dot formation unit creates dots with the at least one light ink as well as the plurality of basic color inks and the dark ink, based on the input control information.

35. A printing apparatus in accordance with claim 31, wherein said print head enables at least two variable-size dots having different sizes to be created, said control information input unit receives pieces of information regarding dot on-off conditions and sizes of dots to be formed by said print head with regard to the plurality of different inks as the control information, and said dot formation unit creates the at least two variable-size dots with the plurality of different inks, based on the input control information.

36. A printing apparatus in accordance with claim 31, said printing apparatus having an ink reservoir unit, in which the plurality of basic color inks and the dark ink are kept independently.

37. A printing apparatus in accordance with claim 36, wherein said ink reservoir unit keeps a greater quantity of the dark ink than a quantity of the one basic color ink corresponding to the dark ink.

38. A printing apparatus that has a print head to create dots with a plurality of different inks on a printing medium, receives control information to control the creation of dots with the plurality of different inks, and actually creates dots with the plurality of different inks, based on the input control information, so as to print an image, said printing apparatus comprising:

a basic color ink supply unit that supplies a plurality of basic color inks to said print head, the plurality of basic color inks including at least cyan ink, magenta ink, and yellow ink;

a dark yellow ink supply unit that supplies dark yellow ink to said print head, the dark yellow ink having a main wavelength region of light absorption substantially identical with that of the yellow ink inks but a lower lightness than that of the yellow ink;

a control information input unit that receives the control information with regard to dots of the plurality of basic color inks and the dark yellow ink; and a dot formation unit that drives said print head based on the input control information, so as to create dots with the plurality of basic color inks and the dark yellow ink.

39. A printing apparatus in accordance with claim 38, said printing apparatus having an ink reservoir unit, in which at least the cyan ink, the magenta ink, the yellow ink, and the dark yellow ink are kept independently, said ink reservoir unit keeping a greater quantity of the dark yellow ink than a quantity of the yellow ink.

40. A method of creating dots with a plurality of different inks, so as to print an image on a printing medium, said method comprising the steps of:

specifying dot on-off conditions with regard to a plurality of basic color inks and a dark ink based on input image data, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and creating dots with the plurality of basic color inks and the dark ink, based on the specification of the dot on-off conditions with regard to the plurality of basic color inks and the dark ink, so as to print an image.

41. A method of supplying control information to a printer, which creates dots with a plurality of different inks on a printing medium, in order to control the creation of dots with the plurality of different inks and thereby controlling a printing operation of said printer, said method comprising the steps of:

(a) specifying dot on-off conditions with regard to a plurality of basic color inks and a dark ink based on input image data, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and (b) outputting the specification of the dot on-off conditions with regard to the plurality of basic color inks and the dark ink to said printer as the control information, so as to control the printing operation of said printer.

42. A method in accordance with claim 41, said method further comprising the step of:

(c) storing in advance mappings of tints used to express a color image to combinations of the plurality of basic color inks and the dark ink to represent the tints, wherein said step (b) specifies the dot on-off conditions with regard to the plurality of basic color inks and the dark ink, based on the mappings stored in advance.

43. A method of supplying control information to a printer, which creates dots with a plurality of different inks on a printing medium, in order to control the creation of dots with the plurality of different inks and thereby controlling a printing operation of said printer, said method comprising the steps of:

(a) specifying dot on-off conditions with regard to a plurality of basic color inks and dark yellow ink based on input image data, the plurality of basic color inks including at least cyan ink, magenta ink, and yellow ink, the dark yellow ink having a main wavelength region of light absorption substantially identical with that of the yellow ink but a lower lightness than that of the yellow ink; and (b) outputting the specification of the dot on-off conditions with regard to the plurality of basic color inks and the dark yellow ink to said printer as the control information, so as to control the printing operation of said printer.

44. A method of receiving control information to control creation of dots with a plurality of different inks and driving a print head, which creates dots with the plurality of different inks on a printing medium, based on the control information, so as to print an image, said method comprising the steps of:
(a) supplying a plurality of basic color inks and a dark ink to said print head, the plurality of basic color inks being combined with one another to express achromatic color, the dark ink having a main wavelength region of light absorption substantially identical with that of one basic color ink selected out of the plurality of basic color inks but a lower lightness than that of the selected basic color ink;
(b) receiving the control information with regard to dots of the plurality of basic color inks and the dark ink; and
(c) driving said print head based on the input control information to create dots with the plurality of basic color inks and the dark ink, thereby printing an image.

45. A method of receiving control information to control creation of dots with a plurality of different inks and driving a print head, which creates dots with the plurality of different inks on a printing medium, based on the control information, so as to print an image, said method comprising the steps of:
(a) supplying a plurality of basic color inks and dark yellow ink to said print head, the plurality of basic color inks including at least cyan ink, magenta ink, and yellow ink, the dark yellow ink having a main wavelength region of light absorption substantially identical with that of the yellow ink but a lower lightness than that of the yellow ink;
(b) receiving the control information with regard to dots of the plurality of basic color inks and the dark yellow ink; and
(c) driving said print head based on the input control information to create dots with the plurality of basic color inks and the dark yellow ink, thereby printing an image.

46. An ink cartridge detachably attached to a printing apparatus, which prints an image with at least one ink, said ink cartridge keeping therein at least one ink to be supplied to said printing apparatus, said ink cartridge comprising:
a dark yellow ink reservoir that keeps therein dark yellow ink, the dark yellow ink having:
(A) a characteristic wavelength region that is mostly in a wavelength range of 400 nm to 500 nm, the characteristic wavelength region strongly absorbing a ray in a visible range to mainly determine the hue of the dark yellow ink; and
(B) a mean value of absorptivity of the ray in the visible range except the characteristic wavelength region, which ranges from 10% to 60%.

47. An ink cartridge in accordance with claim 46, said ink cartridge further comprising:
a storage device that stores information regarding a quantity of ink in each of the ink reservoirs in a readable, writeable and volatile manner.

48. An ink cartridge in accordance with claim 47, wherein said storage device has an ink quantity information storage area, which is accessed to be written first by said printing apparatus and in which the information regarding the quantity of ink in each of the ink reservoirs is stored.

49. An ink supplier that feeds a supply of ink to an ink cartridge, said ink cartridge being detachably attached to a printing apparatus and keeping therein at least one ink used by said printing apparatus, said ink supplier comprising:
a sealed ink reservoir that keeps an ink in a sealing manner; and
an ink supply unit that feeds a supply of the sealed ink to said ink cartridge,
wherein the ink sealed in said sealed ink reservoir has:
(A) a characteristic wavelength region that is mostly included in a wavelength range of 400 nm to 500 nm, the characteristic wavelength region strongly absorbing a ray in a visible range to mainly determine the hue of the ink; and
(B) a mean value of absorptivity of the ray in the visible range except the characteristic wavelength region, which ranges from 10% to 60%.

50. A recording medium, in which a specific program is recorded in a computer readable manner, said specific program actualizing a method of creating dots with a plurality of different inks, so as to print an image on a printing medium, said specific program causing a computer to attain the functions of:
specifying dot on-off conditions with regard to a plurality of basic color inks and a dark ink based on input image data, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and
controlling creation of dots with the plurality of basic color inks and the dark ink, based on the specification of the dot-on-off conditions with regard to the plurality of basic color inks and the dark ink.

51. A recording medium, in which a specific program is recorded in a computer readable manner, said specific program actualizing a method of supplying control information to a printer, which creates dots with a plurality of different inks on a printing medium, in order to control the creation of dots with the plurality of different inks and thereby controlling a printing operation of said printer, said specific program causing a computer to attain the functions of:
specifying dot on-off conditions with regard to a plurality of basic color inks and a dark ink based on input image data, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and
outputting the specification of the dot on-off conditions with regard to the plurality of basic color inks and the dark ink to said printer as the control information, so as to control the printing operation of said printer.

52. A recording medium in accordance with claim 51, wherein said specific program further causes the computer to attain the function of:
storing in advance mappings of tints used to express a color image to combinations of the plurality of basic color inks and the dark ink to represent the tints, and the dot on-off conditions with regard to the plurality of basic color inks and the dark ink are specified, based on the mappings stored in advance.

53. A recording medium, in which a specific program is recorded in a computer readable manner, said specific program actualizing a method of supplying control information to a printer, which creates dots with a plurality of different inks on a printing medium, in order to control the creation of dots with the plurality of different inks and thereby controlling a printing operation of said printer, said specific program causing a computer to attain the functions of:

specifying dot on-off conditions with regard to a plurality of basic color inks and dark yellow ink based on input image data, the plurality of basic color inks including at least cyan ink, magenta ink, and yellow ink, the dark yellow ink having a main wavelength region of light absorption substantially identical with that of the yellow ink but a lower lightness than that of the yellow ink; and outputting the specification of the dot on-off conditions with regard to the plurality of basic color inks and the dark yellow ink to said printer as the control information, so as to control the printing operation of said printer.

54. A recording medium, in which a specific program is recorded in a computer readable manner, said specific program actualizing a method of receiving control information to control creation of dots with a plurality of different inks and driving a print head, which creates dots with the plurality of different inks on a printing medium, based on the control information, so as to print an image, said specific program causing a computer to attain the functions of:

receiving the control information to control creation of dots with a plurality of basic color inks and a dark ink, the plurality of basic color inks being combined with one another to express achromatic color, the dark ink having a main wavelength region of light absorption substantially identical with that of one basic color ink selected out of the plurality of basic color inks but a lower lightness than that of the selected basic color ink; and driving said print head based on the input control information to create dots with the plurality of basic color inks and the dark ink, thereby printing an image.

55. A recording medium, in which a specific program is recorded in a computer readable manner, said specific program actualizing a method of receiving control information to control creation of dots with a plurality of different inks and driving a print head, which creates dots with the plurality of different inks on a printing medium, based on the control information, so as to print an image, said specific program causing a computer to attain the functions of:

receiving the control information to control creation of dots with a plurality of basic color inks and dark yellow ink, the plurality of basic color inks including at least cyan ink, magenta ink, and yellow ink, the dark yellow ink having a main wavelength region of light absorption substantially identical with that of the yellow ink but a lower lightness than that of the yellow ink; and driving said print head based on the input control information to create dots with the plurality of basic color inks and the dark yellow ink, thereby printing an image.

* * * * *